Oct. 9, 1956

A. LESTI 2,766,327

INTERCOMMUNICATION SYSTEMS

Filed March 28, 1951

GENERAL SCHEMATIC OF SYSTEM

INVENTOR.
ARNOLD LESTI
BY
ATTORNEY

Oct. 9, 1956
A. LESTI
2,766,327
INTERCOMMUNICATION SYSTEMS
Filed March 28, 1951
29 Sheets-Sheet 2
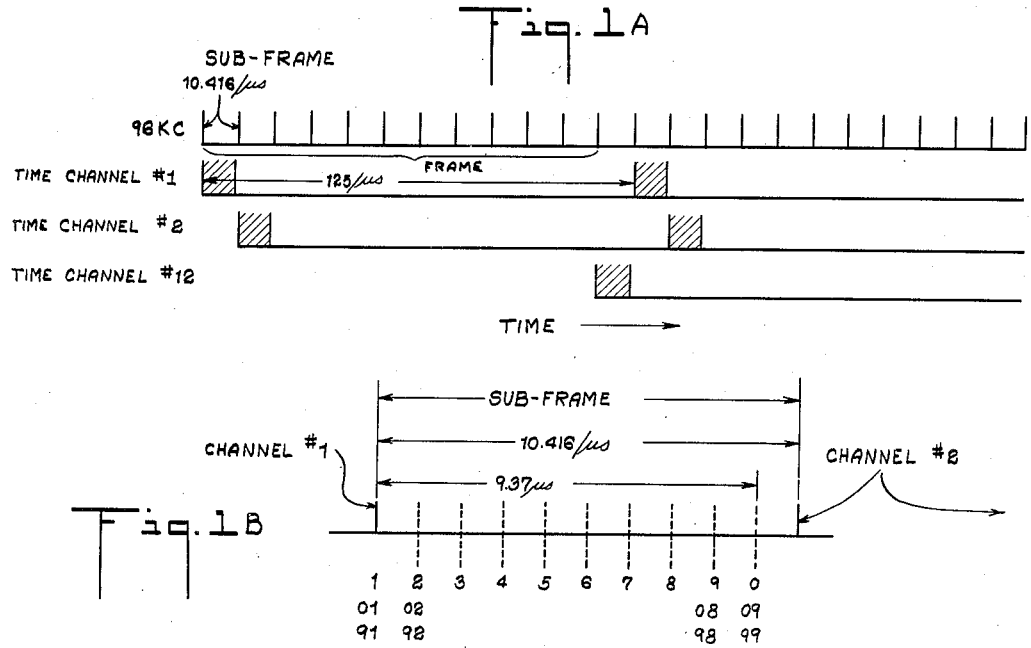
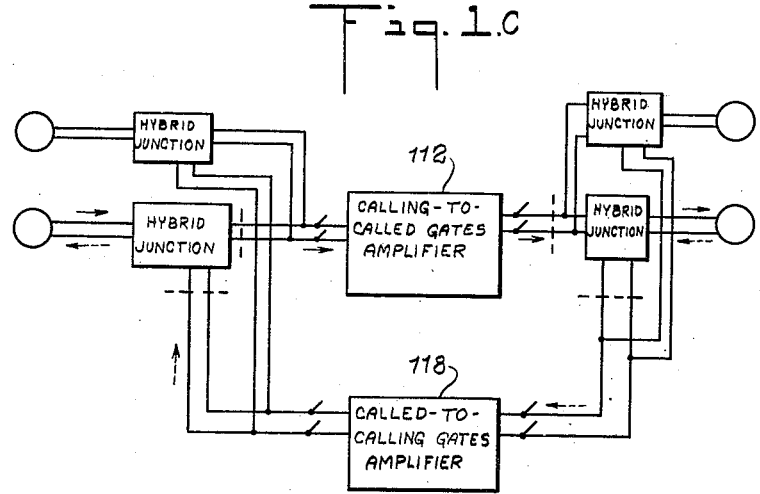
INVENTOR.
ARNOLD LESTI
BY
*Percy P. Lantzy*
ATTORNEY

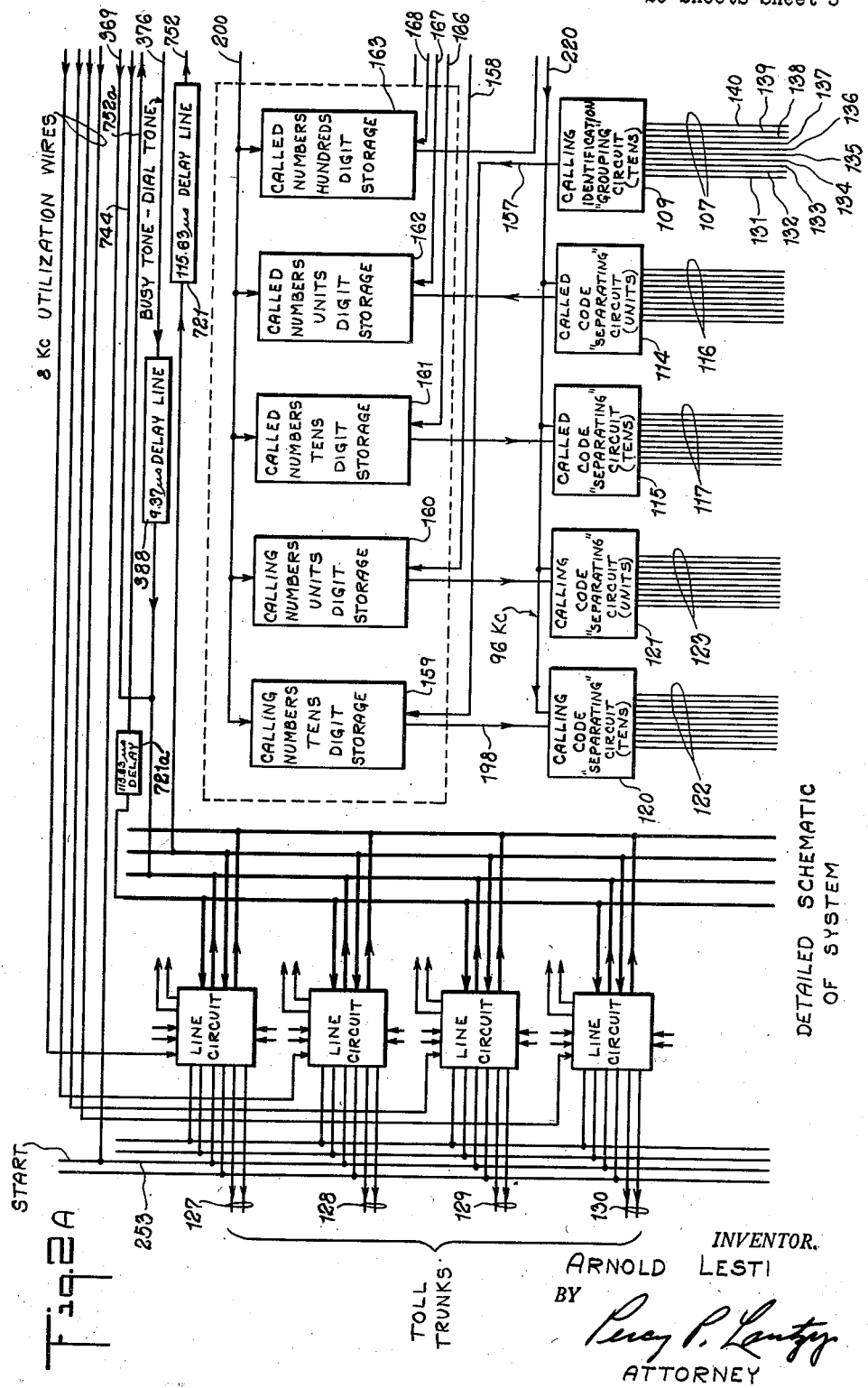

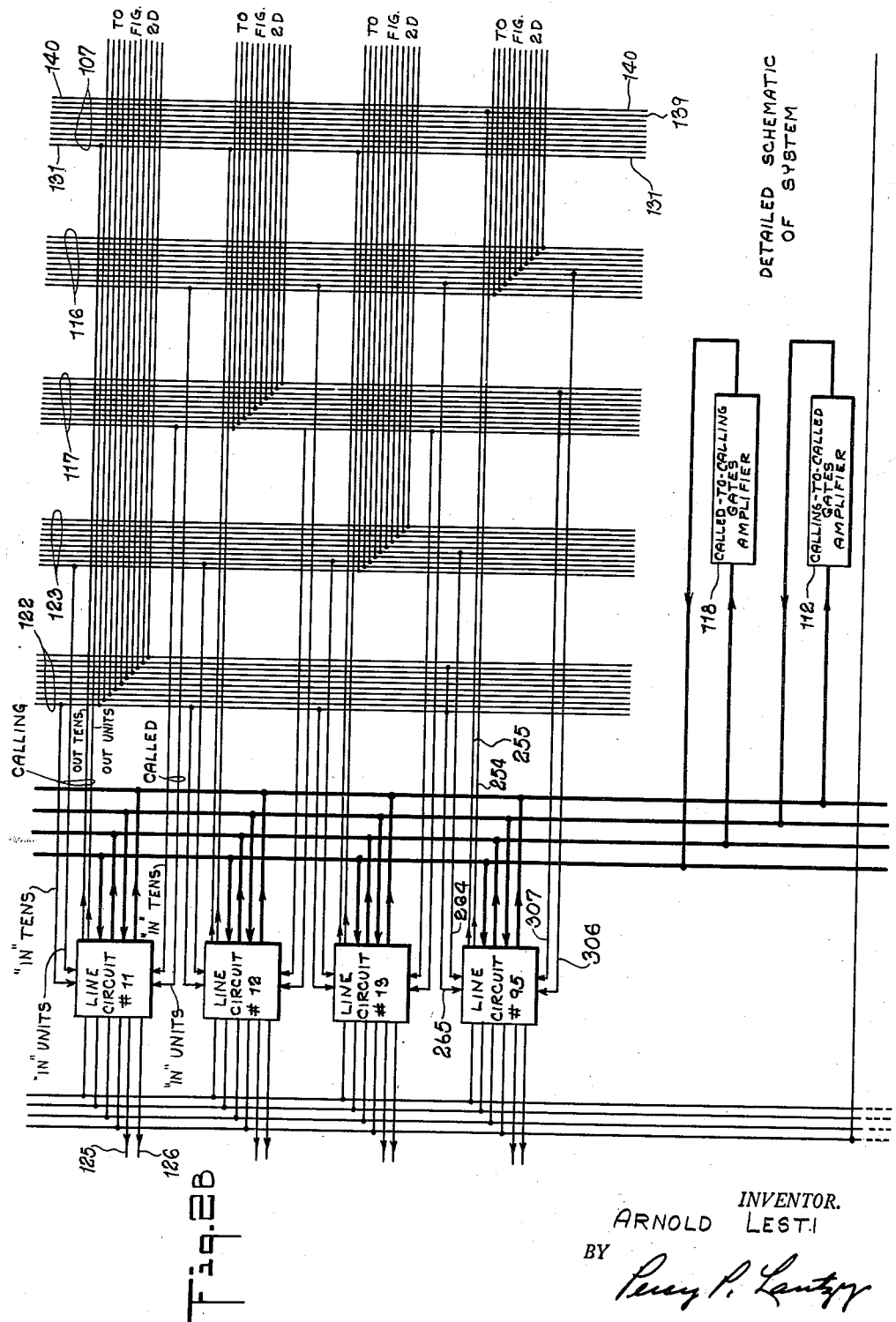

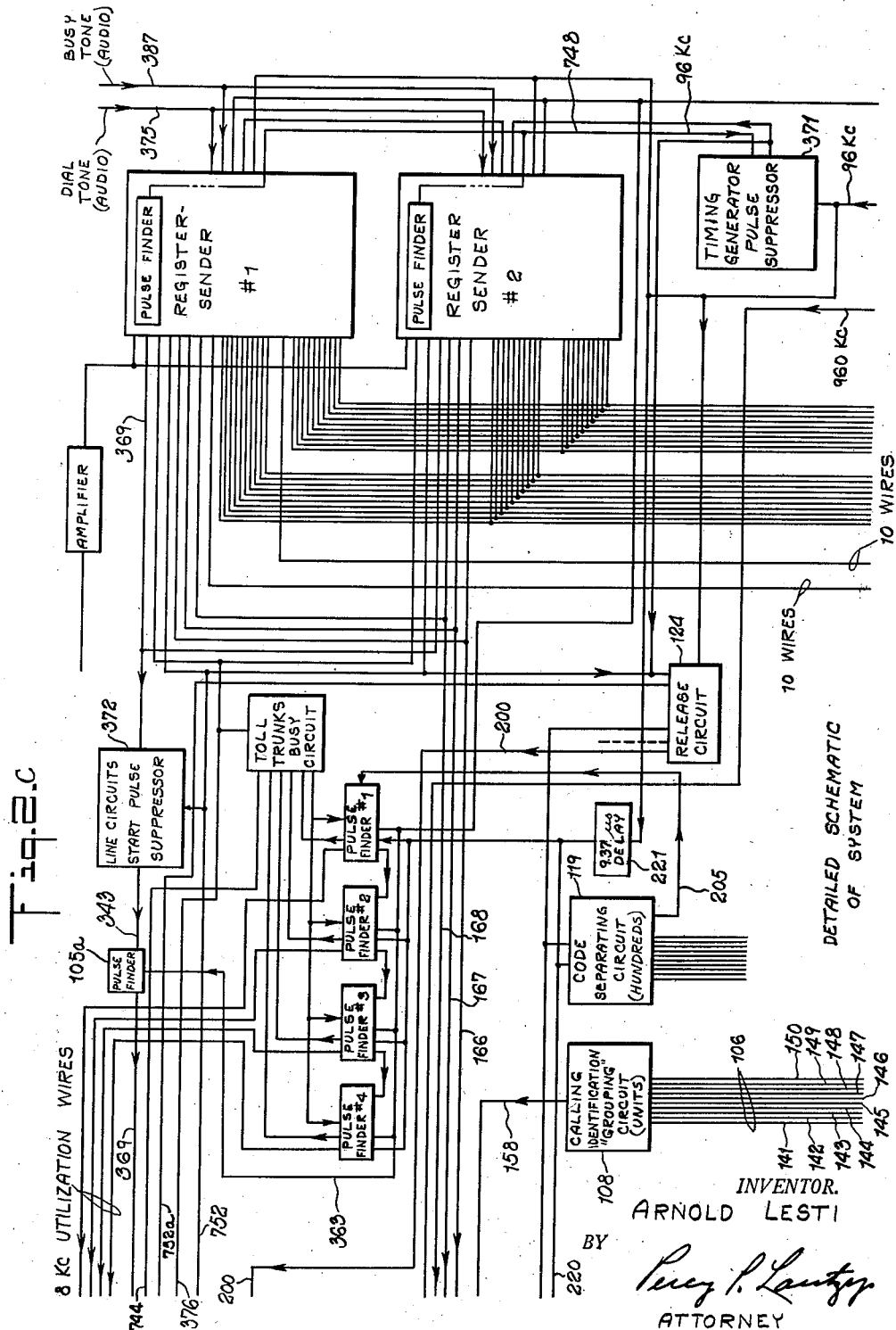

Oct. 9, 1956 A. LESTI 2,766,327
INTERCOMMUNICATION SYSTEMS
Filed March 28, 1951 29 Sheets-Sheet 6
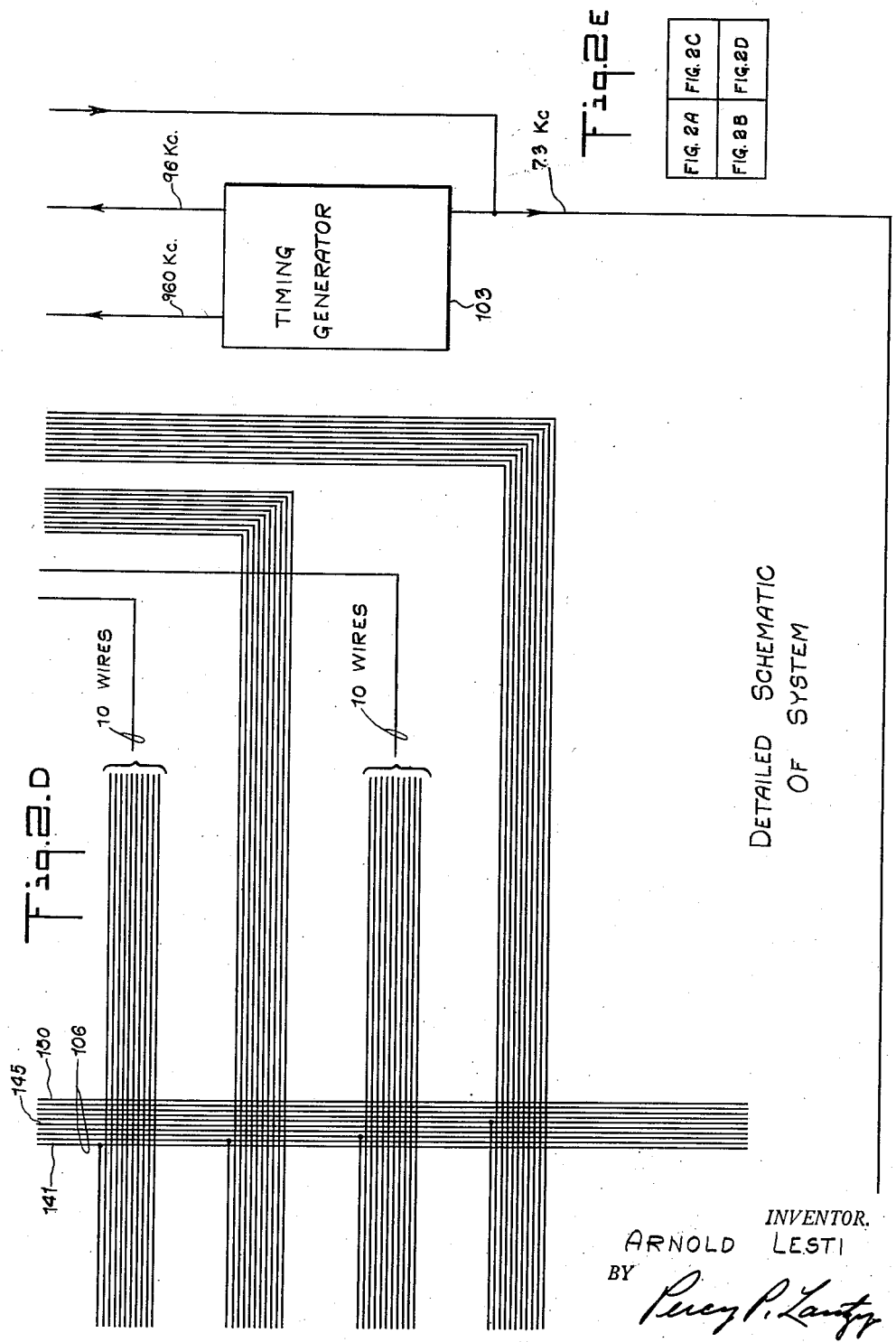
INVENTOR.
ARNOLD LESTI
BY
ATTORNEY Oct. 9, 1956

A. LESTI 2,766,327

INTERCOMMUNICATION SYSTEMS

Filed March 28, 1951

INVENTOR.
ARNOLD LESTI
BY
*Percy P. Lautzy*
ATTORNEY

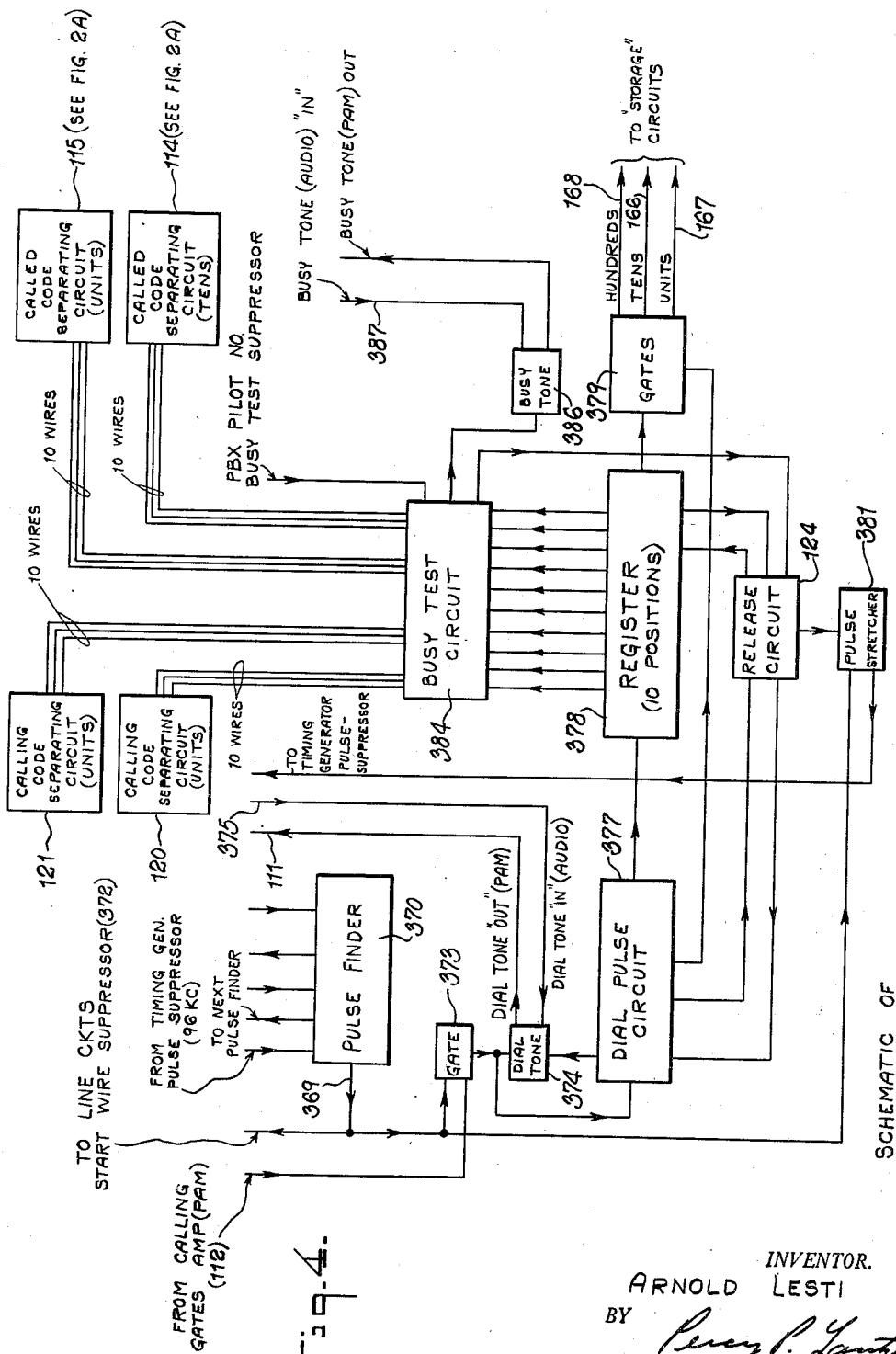

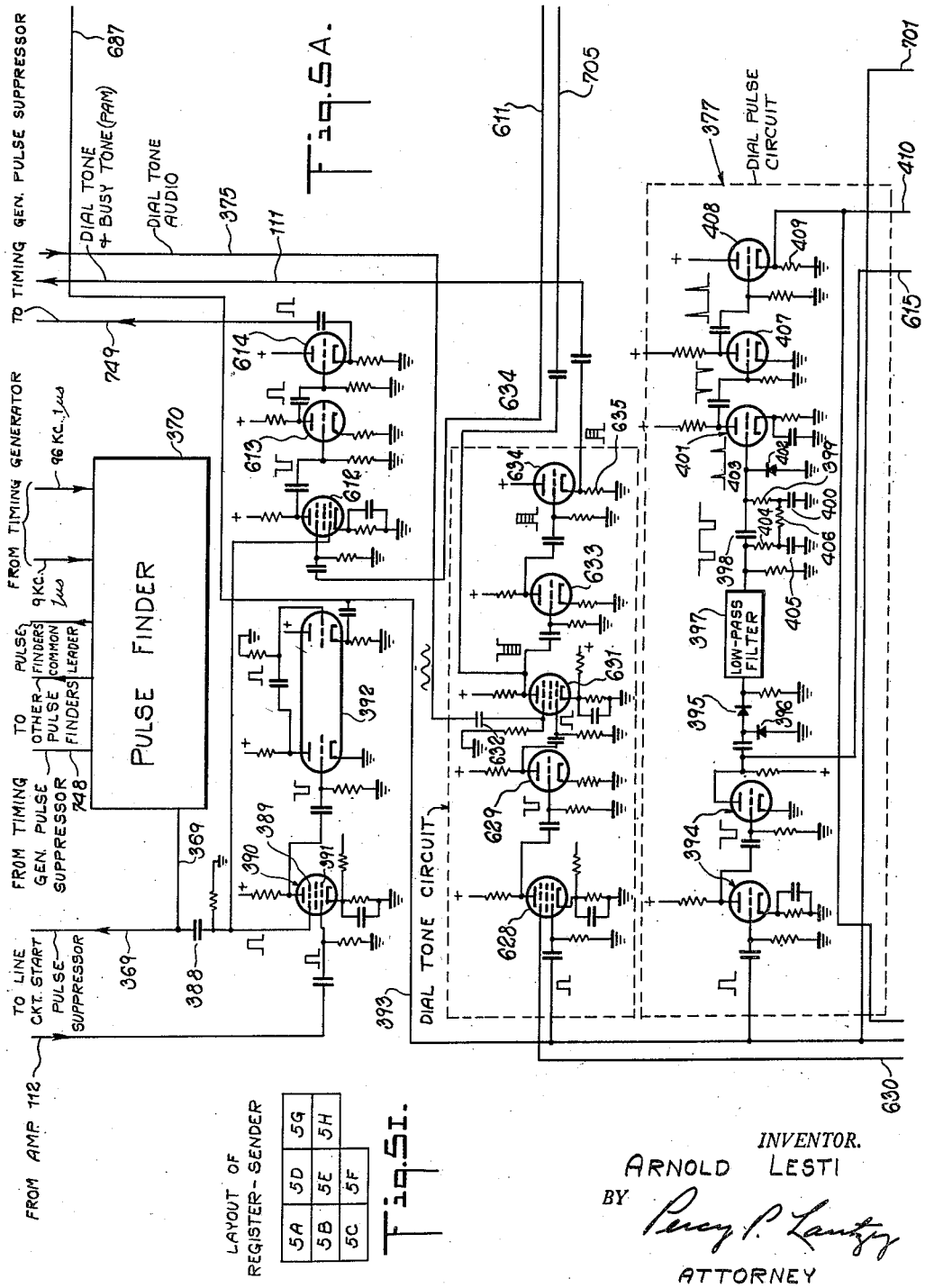

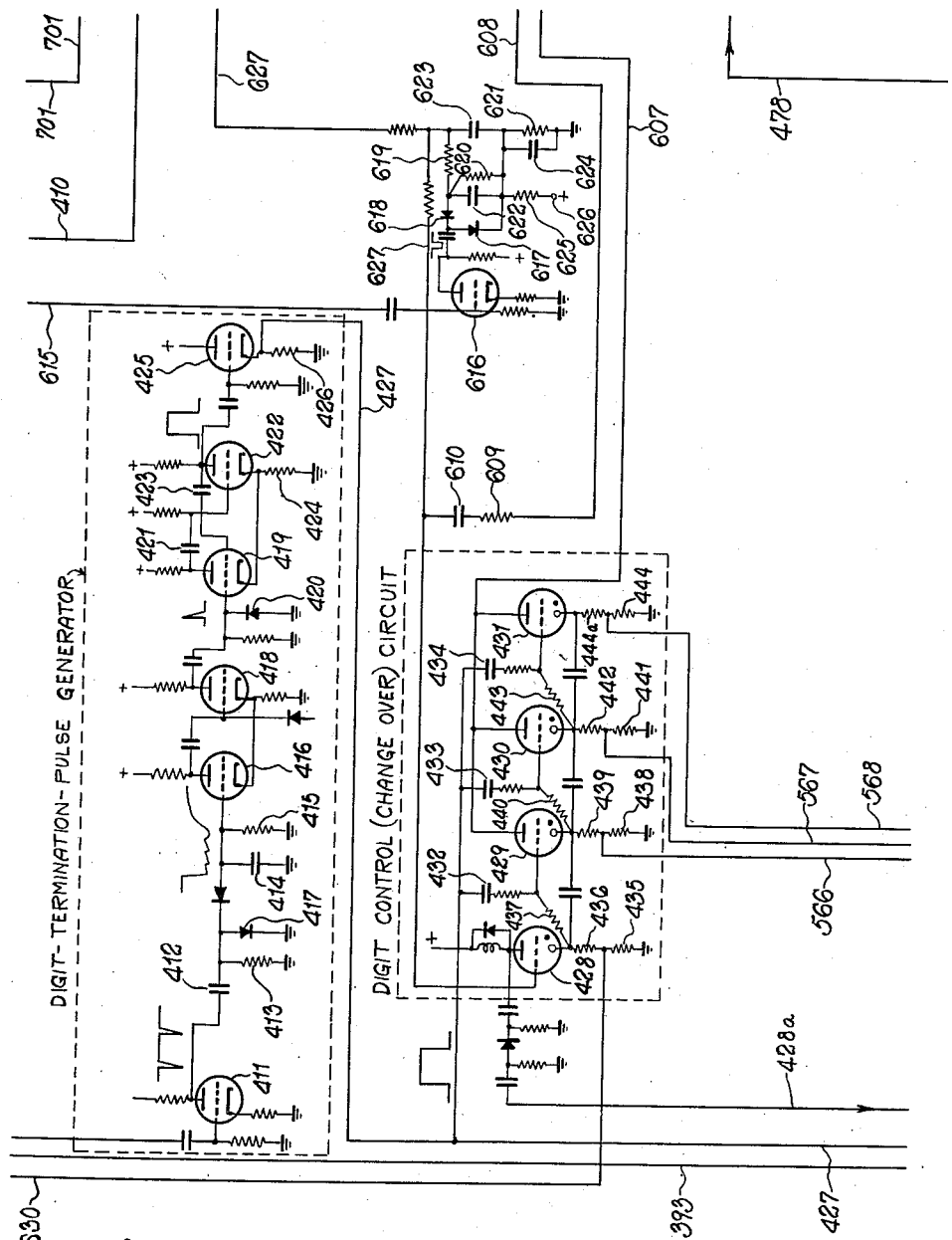

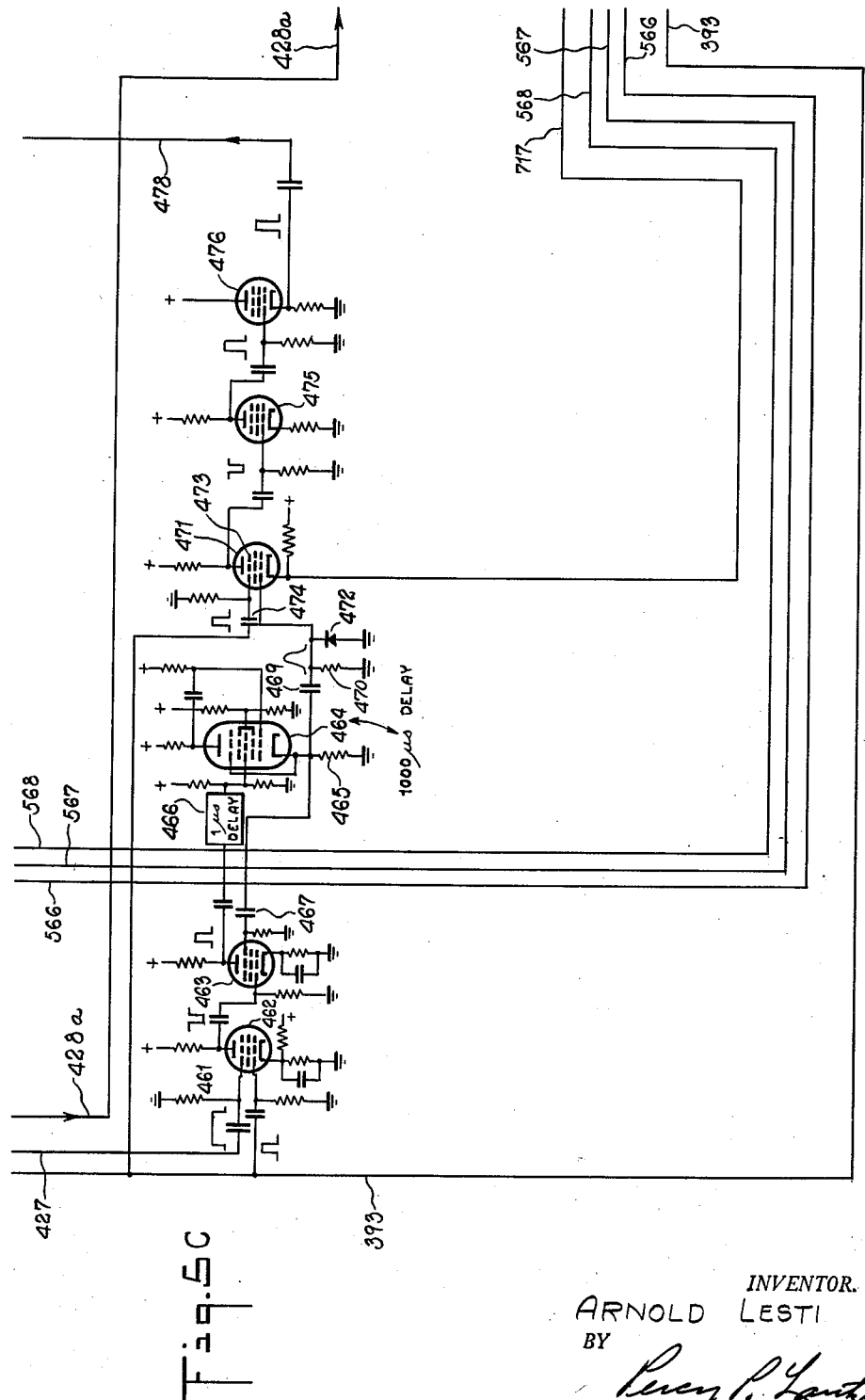

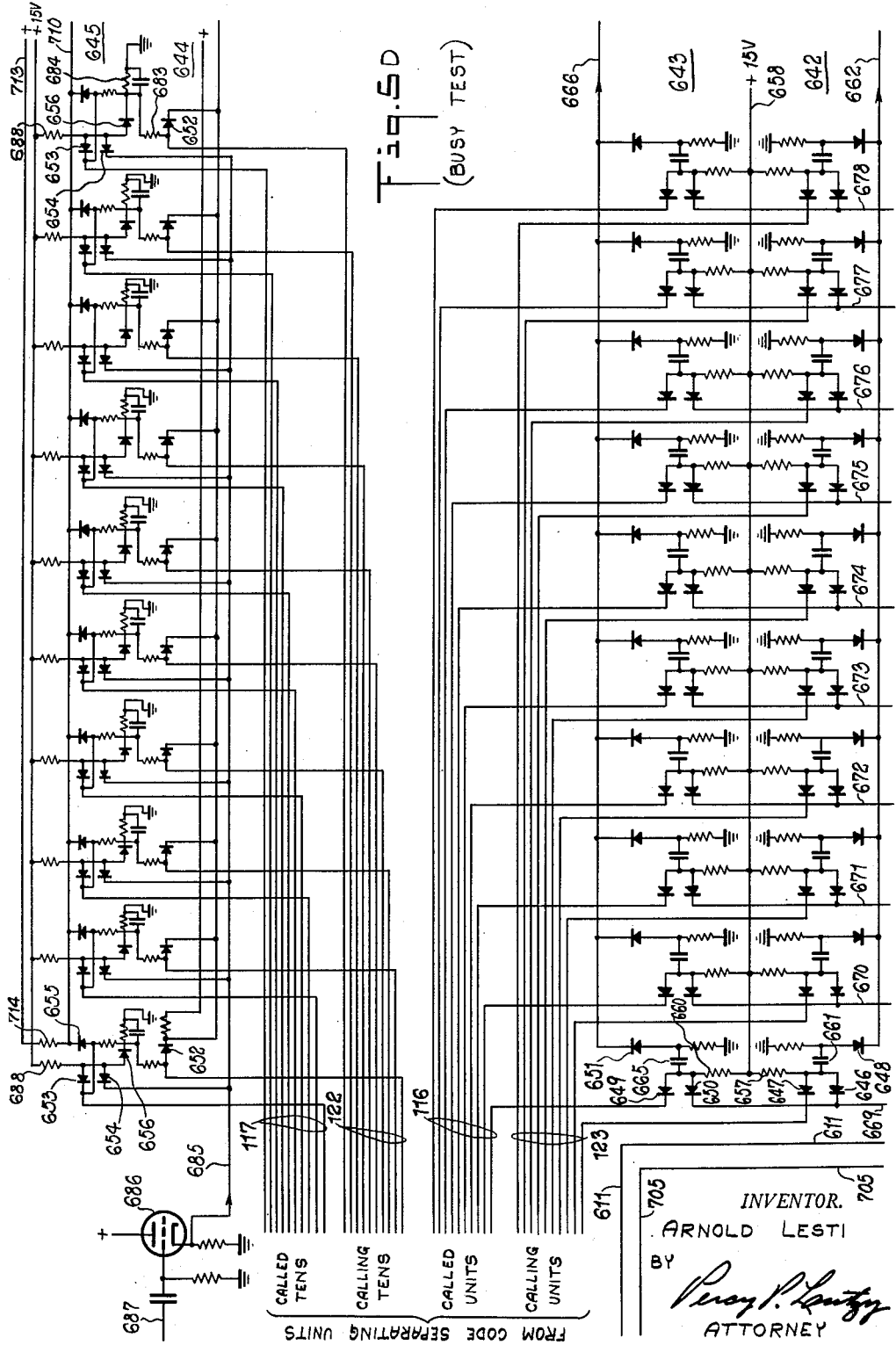
Oct. 9, 1956 — A. LESTI — 2,766,327
INTERCOMMUNICATION SYSTEMS
Filed March 28, 1951 — 29 Sheets-Sheet 12
Fig. 5D (BUSY TEST)
INVENTOR.
ARNOLD LESTI
BY
ATTORNEY

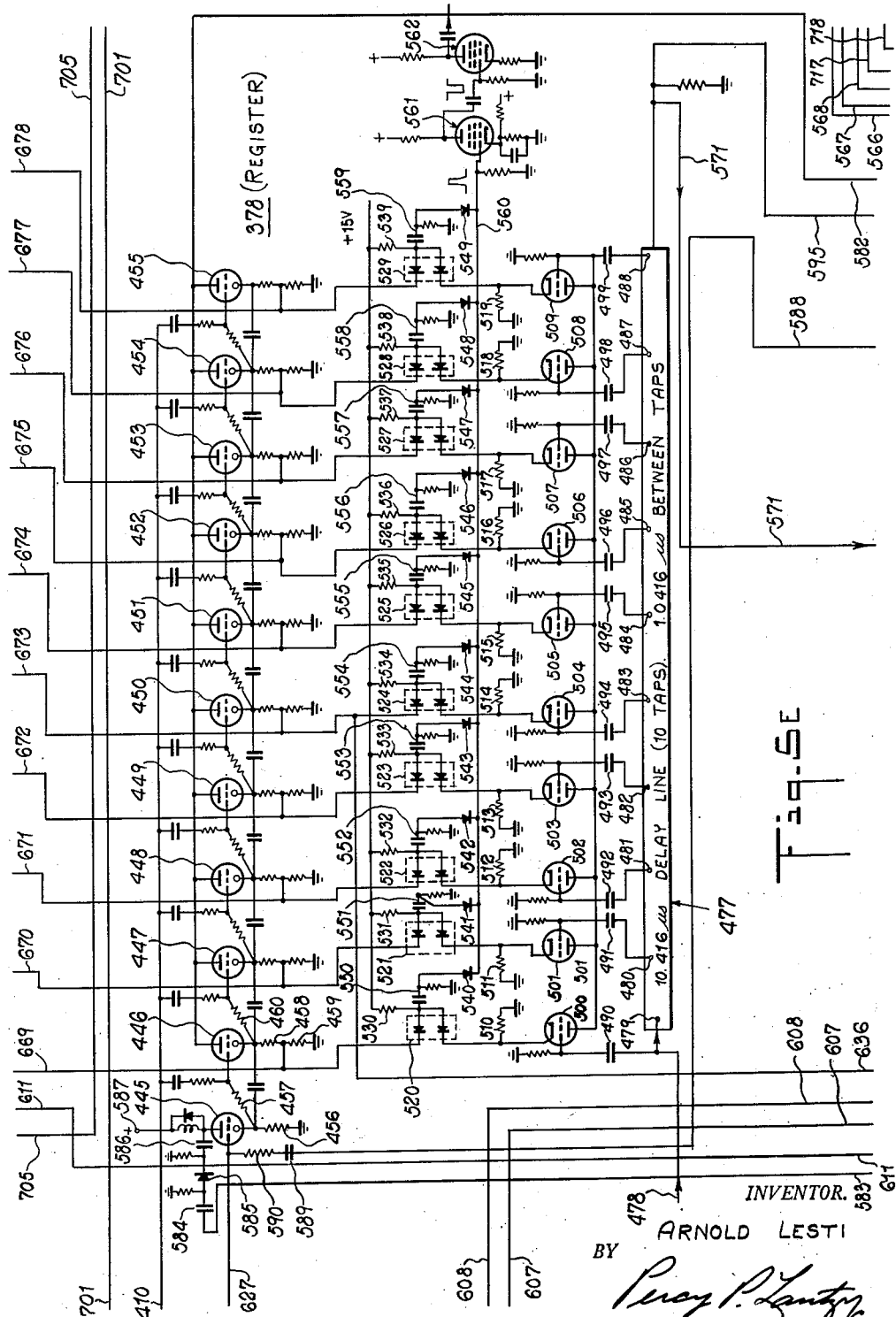

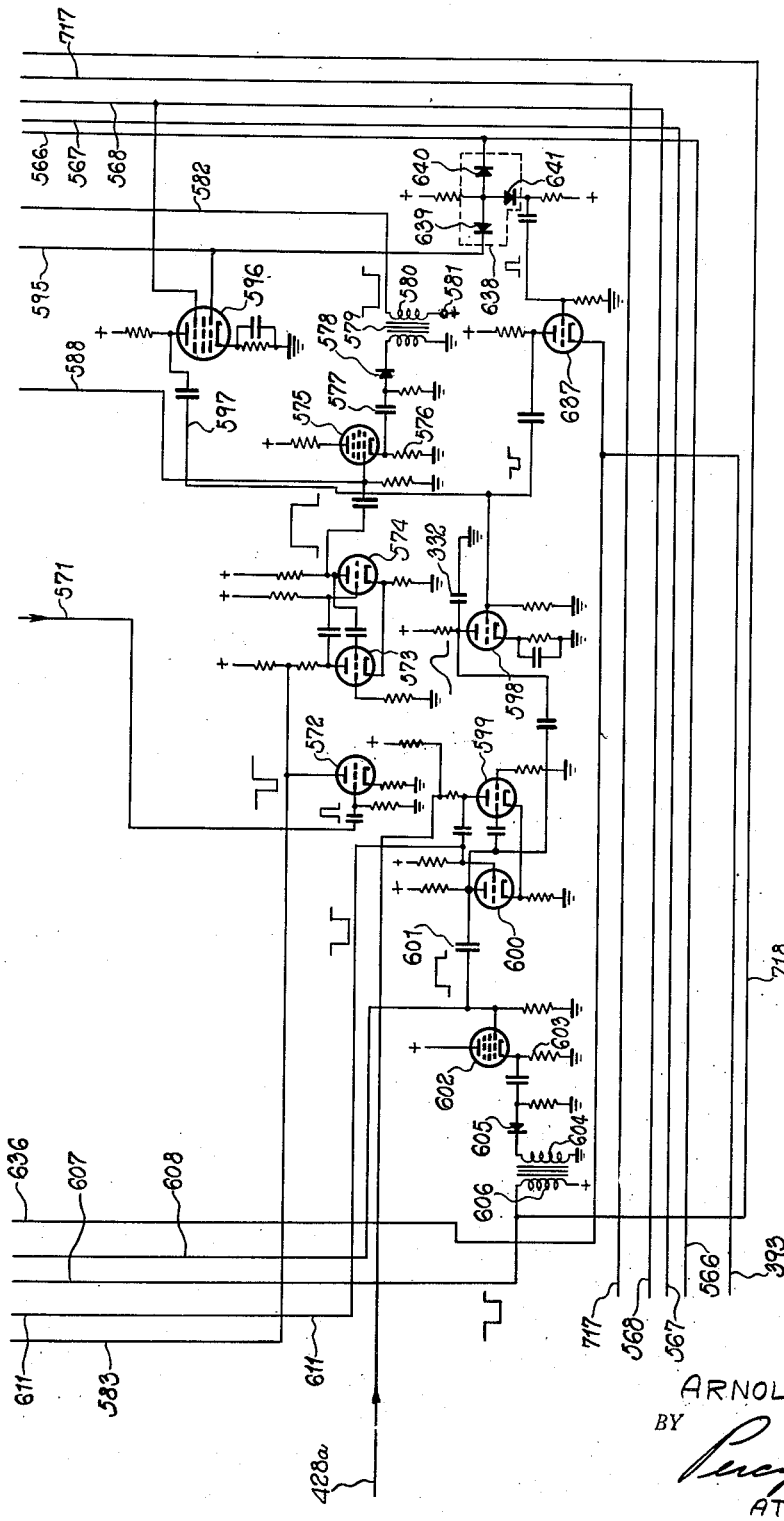

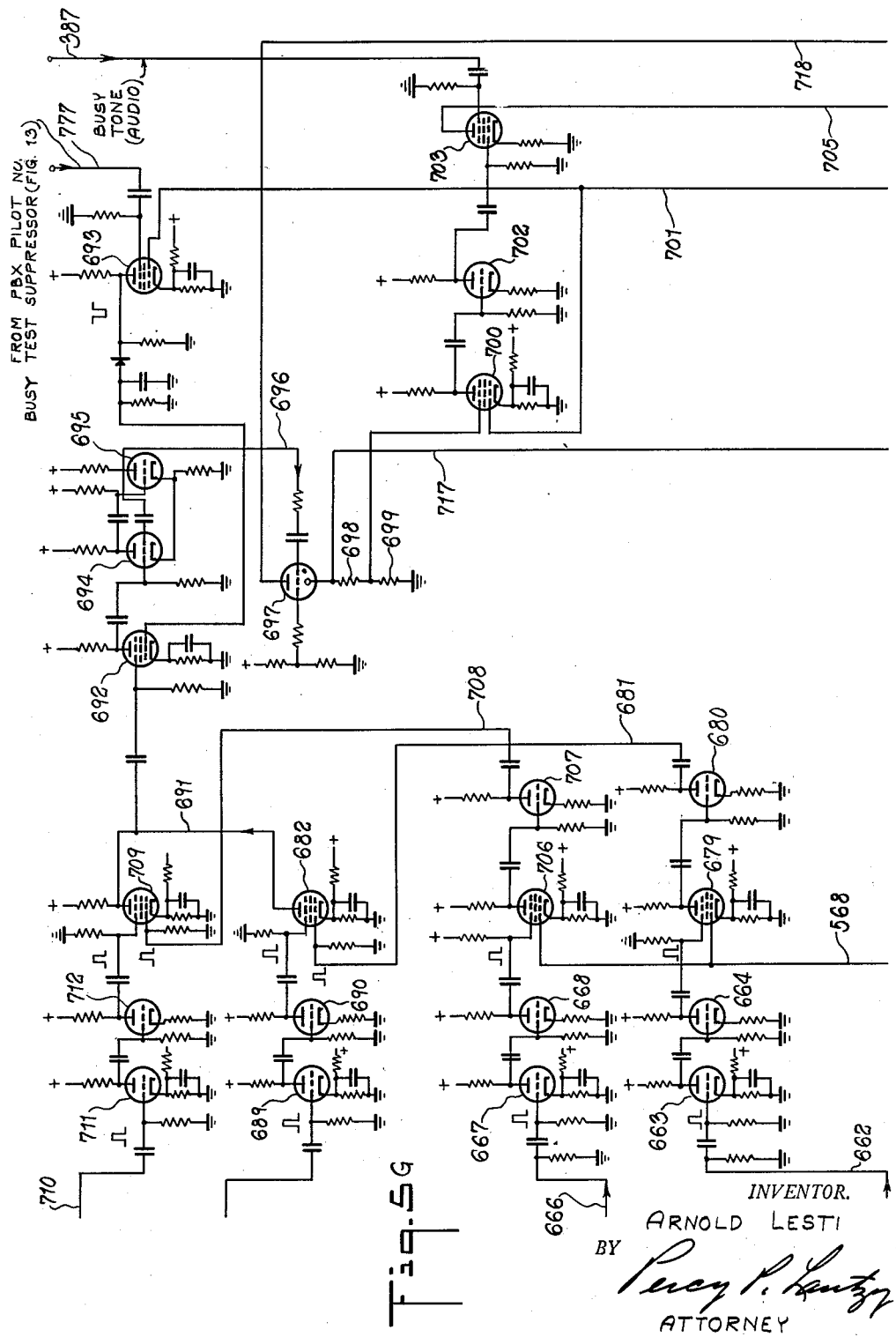

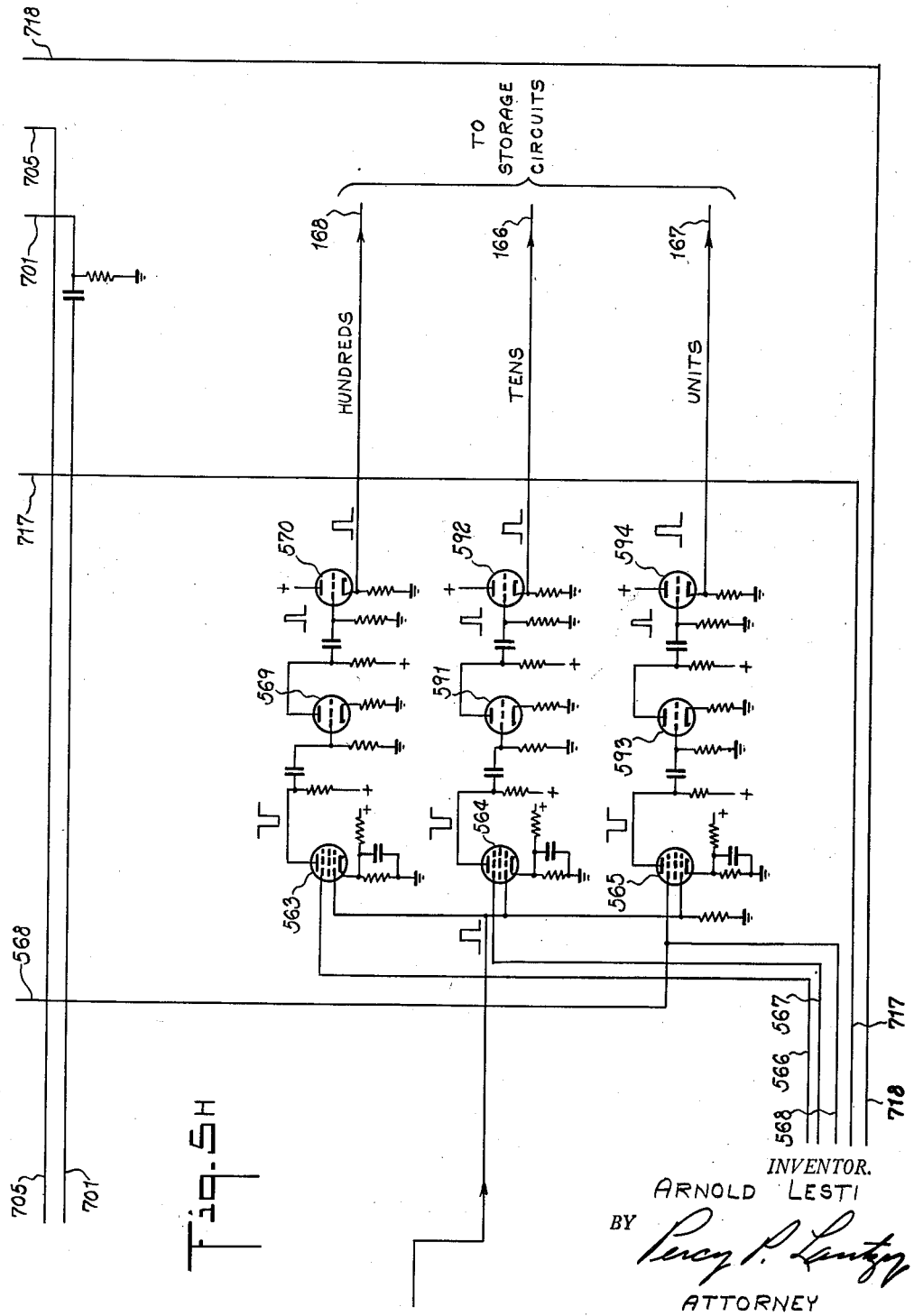

SUBSCRIBERS LINE CIRCUIT

PULSE FINDER

INVENTOR.
ARNOLD LESTI

Oct. 9, 1956

A. LESTI 2,766,327

INTERCOMMUNICATION SYSTEMS

Filed March 28, 1951

RELEASE CIRCUIT

INVENTOR.
ARNOLD LESTI
BY
Percy P. Lantry
ATTORNEY

Oct. 9, 1956        A. LESTI        2,766,327
INTERCOMMUNICATION SYSTEMS
Filed March 28, 1951        29 Sheets—Sheet 22
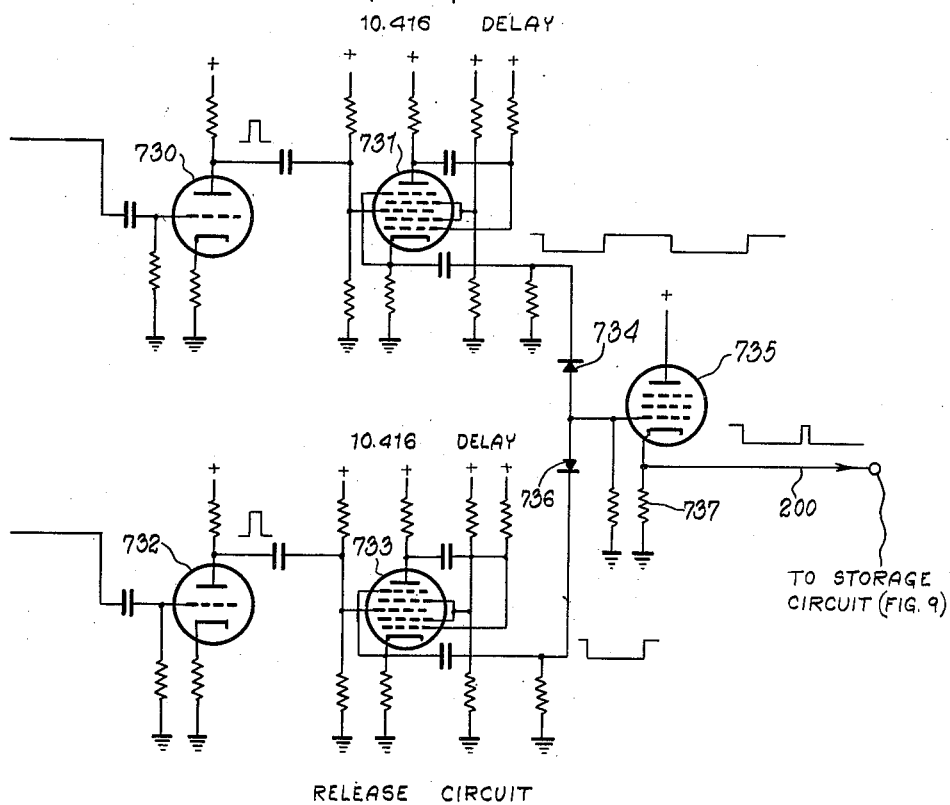
INVENTOR.
ARNOLD LESTI
BY
ATTORNEY Oct. 9, 1956

A. LESTI 2,766,327

INTERCOMMUNICATION SYSTEMS

Filed March 28, 1951

INVENTOR.
ARNOLD LESTI
BY
*Percy P. Lantzy*
ATTORNEY

OPERATORS TRUNK CIRCUIT

Oct. 9, 1956

A. LESTI 2,766,327

INTERCOMMUNICATION SYSTEMS

Filed March 28, 1951

PBX TRUNK HUNTING AND
PILOT NUMBER BUSY-TEST
SUPPRESSION CIRCUIT

INVENTOR.
ARNOLD LESTI
BY
ATTORNEY

Oct. 9, 1956 — A. LESTI — 2,766,327
INTERCOMMUNICATION SYSTEMS
Filed March 28, 1951 — 29 Sheets-Sheet 26

INVENTOR.
ARNOLD LESTI
BY
ATTORNEY

CALLING LINES IDENTIFICATION
GROUPING CIRCUIT

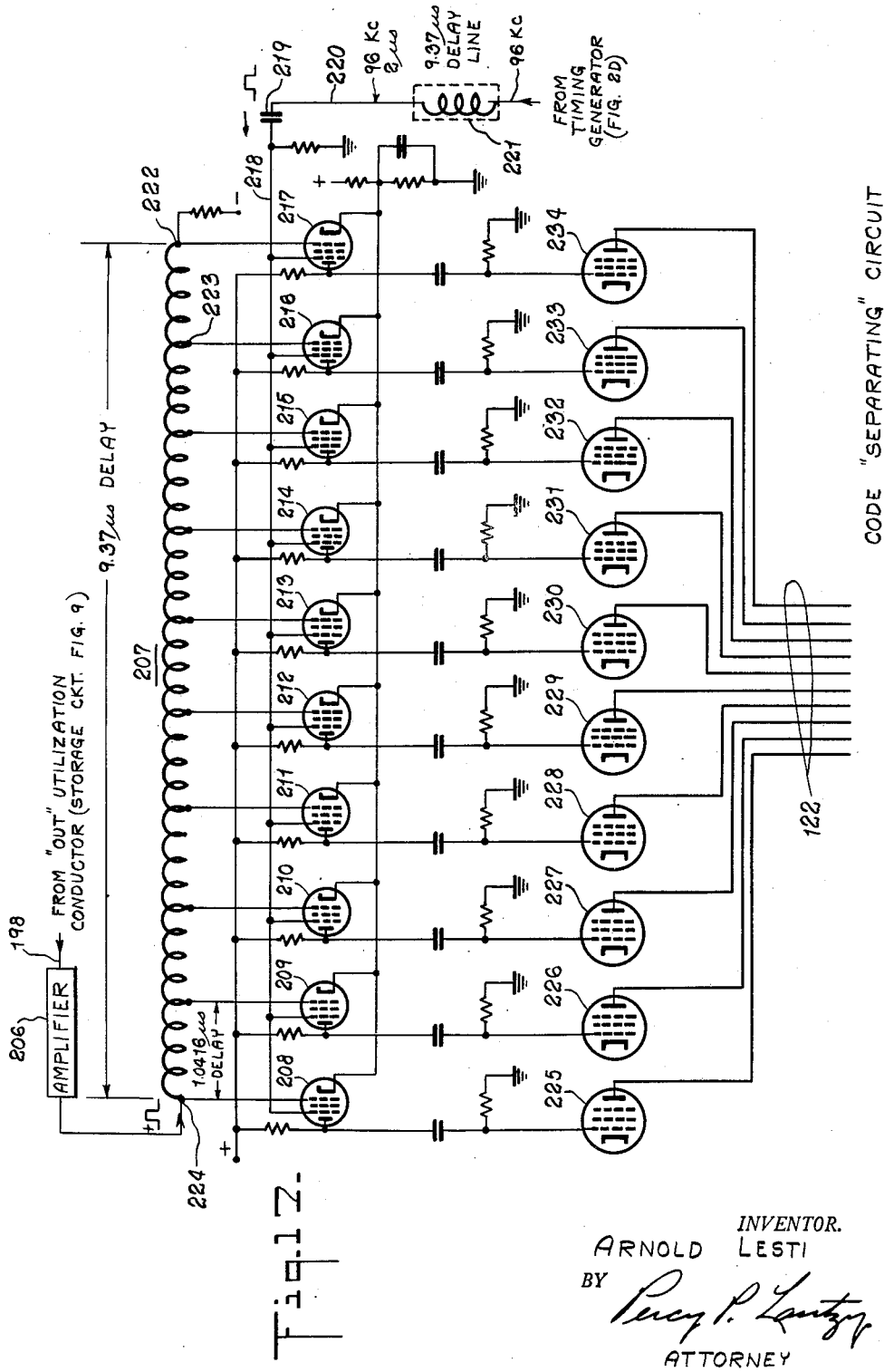

United States Patent Office 2,766,327
Patented Oct. 9, 1956

2,766,327

INTERCOMMUNICATION SYSTEMS

Arnold Lesti, Nutley, N. J., assignor to International Telephone and Telegraph Corporation, a corporation of Maryland Application March 28, 1951, Serial No. 217,922

63 Claims. (Cl. 179—18)

This invention relates to intercommunication systems, and more especially it relates to improved arrangements for selectively interconnecting stations or lines such as telephone subscribers' lines by electronic means.

A principal object of the invention is concerned with providing an improved telephone or similar communication switching system of the dial-controlled electronic switching kind.

Another principal object is to provide an improved automatic telephone switching system of the all-electronic switching kind, as distinguished from the well-known electromechanical or similar switching systems.

Another principal object is to provide an improved automatic telephone switching system of the kind employing time division multiplex operation.

Another object relates to an automatic telephone switching system wherein each line is electrically marked by a plurality of simultaneous pulses applied to respective digital pulses multiplied to lines of the same decimal digital designation.

A feature of the invention relates to an automatic switching system employing time division pulse multiplexed channels derived from a common train of superaudible pulses, wherein an idle channel pulse train is seized by a calling line under control of an all-electronic register sender which is engaged only during the establishment of the switching connection and which is releasable thereafter for use by other calling lines.

Another feature relates to an automatic switching system employing time division pulse multiplexed channels and a series of all-electronic register senders whose total number is only a small fraction of the number of lines to be interconnected; each register sender having individual thereto a pulse finder for enabling a calling line to seize an available pulse train or time position, which train is made unavailable to other calling lines until released by the first-mentioned calling line.

Another feature relates to an automatic switching system employing time division pulse multiplexed channels or time-positions, wherein all the calling line circuits are provided with a common start wire which is momentarily effective in response to the initiation of a call by a calling line to cause all available time-position pulses to be supplied to the calling line circuit, and for causing an idle register sender to seize one of such available time-positions for use by the calling line, and whereupon the said start wire is rendered ineffective to transmit to the said calling line circuit any further time-position channel pulses.

Another feature relates to an automatic switching system of the time division multiplexed pulse train kind, wherein a pulse generator is provided in common to all calling lines whereby any calling line can have seizure-access to any available time-position; the said access being controlled by a seized idle register sender in conjunction with electronic apparatus for storing the numerical identification code of the calling line and for providing a feed-back check from the said storage apparatus to the respective line circuit preparatory to the seizure of said available time-position.

Another feature relates to a telephone system of the kind employing pulse-amplitude-modulated time division multiplexed trains of pulses, wherein each line circuit is provided with four coincidence gates, two of which are rendered effective when a call is originating from a line, and the other two of which are rendered effective when a call is being established to said line.

Another feature relates to an automatic telephone system of the time division multiplexed pulse kind for establishing a plurality of non-interfering simultaneous two-way telephone connections, and wherein electronic storage apparatus is provided for storing digital designations of telephone lines, and wherein a single storage circuit is rendered successively effective to store the successively dialed digits of a called line designation. Preferably, although not necessarily, the storage apparatus employs a single pulse recirculating delay line which continues to recirculate pulses in a selected time-position determined by the receipt of a single respective time-position identifying pulse.

Another feature relates to an electronic translator for pulse storage systems, wherein pulses of a code are stored in time series, and channels or time positions are also stored in time series.

Another feature relates to an electronic translator for pulse time-position switching control systems, wherein a series of pulse delay lines are provided in conjunction with a corresponding plurality of code identifying input circuits, whereby simultaneous spacial marking of two or more pulses is translated into corresponding serially related time pulses in a common output circuit.

Another feature relates to an electronic translator for a pulse position switching control system, wherein a series of serially related time-position pulses received from a common input circuit are translated by pulse delay into respective but simultaneous marking of a corresponding plurality of output circuits.

Another feature relates to a novel release arrangement for an all-electronic telephone switching system employing electronic storage circuits for both calling and called line digital designations, and wherein the storage is in the form of continuously recirculating time-position pulses, and the release of the established connection and of the corresponding stored pulses is effected by a momentary pulse suppression under control of either the calling line or the called line.

Another feature relates to an automatic telephone switching system of the time division multiplexed pulse transmission kind employing a register sender of the all-electronic kind and a timing generator for generating a pulse series from which individual connection-maintaining trains are seized by a calling line and are suppressed against seizure by other calling lines; in conjunction with means to prevent such suppression until the register sender has received and registered the complete digital designation code of the called line.

Another feature relates to a register sender for seizable association with any one of a number of calling lines, and which includes a ten-point all-electronic register for registering "units", "tens" and "hundreds" digital designations, and having a restoring circuit for enabling the register to respond first to the higher order digit, for example "hundreds", and then successively to the lower order digits, for example "tens" and "units."

Another feature relates to a system of the type described having a register sender which includes therein electronic apparatus for effecting a busy test of called lines, and for automatically suppressing such busy test when the dialed digital designation represents a toll trunk or a P. B. X line.

Another feature relates to a novel form of busy test arrangements for a register sender, which arrangement employs a multiplicity of coincidence diodes, one for each numerical digit that is dialed and in conjunction with a digitally controlled stepping circuit employing a corresponding series of gaseous conduction tubes.

Another feature relates to a pulse finder for use in a system for seizing an idle channel-defining pulse train from a series of timed pulses, which finder is of the type having an input circuit upon which all the trains are arranged to be impressed, and an output circuit for producing corresponding trains but delayed by a predetermined amount, which delay is effected by a plurality of serially related phantastrons or similar devices.

Another feature relates to a system of the kind described, employing a register sender which is seizable by any one of a number of calling lines to register electronically the digital designation of a called subscriber's line, in conjunction with a novel coincidence circuit which responds when the first dialed digit represents a connection to a toll line to cause automatic release of the register sender.

Another feature relates to a system of the kind described, having a register sender which is seizable by any one of a number of calling lines, and including means to prevent release of the register sender if a called line is busy by the action of the busy circuit on the register-sender release circuit.

Another feature relates to a novel idle trunk hunting arrangement for toll trunks and P. B. X. trunks employing a series of pulse finders in a common chain circuit.

Another feature relates to a novel trunk hunting arrangement for use in a system of the type described, and employing a series of pulse finders interconnected in a chain circuit, and which circuit is also used to effect an all-trunks-busy condition.

Another feature relates to a system of the kind described, having a pulse grouping circuit which has a series of digitally-representing input pulse channels each multipled to all lines having the same decimal digit and having a single output pulse channel converted to a storage circuit and upon which are produced a series of time displaced pulses whose relative time displacement represents successive decimal digits; and a pulse separating circuit having a single pulse input channel fed from the single output channel of the grouping circuit and having a series of digit-representing output pulse channels each multipled to all said lines having the same decimal digit, said separating circuit acting to translate the time displaced pulses from the storage circuit into simultaneous pulses on respective ones of the pulse output channels from said separating circuit.

Another feature relates to a system of the kind described, having an electronic register sender which is seizable by any one of a number of calling lines, the sender having a dial-tone control circuit for sending back to the calling line a distinctive dialing tone, the sender including a register stepping circuit formed of a series of gaseous conduction tubes which are effective after receiving a first dialed digit to cut off the said dial tone to the calling line.

In the drawing which represents one preferred embodiment of the invention and the various features thereof, Fig. 1 is a skeletonized schematic of the system.

Figs. 2A, 2B, 2C and 2D, when assembled as shown in Fig. 2E, provide a detail schematic of the system.

Fig. 2E is a layout showing how the sheets of Figs. 2A–2D are arranged side-by-side to form a single schematic drawing.

Figure 3:
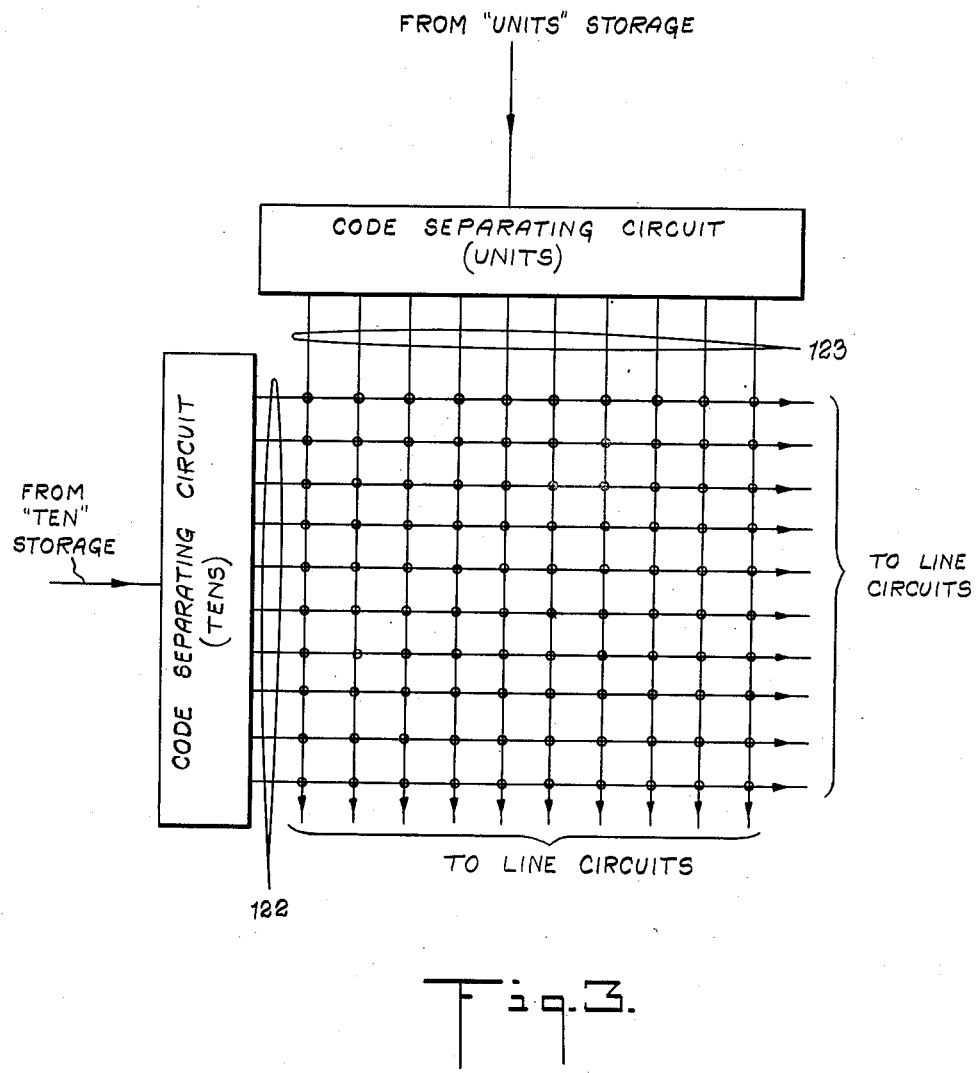

Fig. 3 is a schematic diagram illustrating the coding of the subscriber's lines.

Fig. 4 is a schematic block diagram of the register-sender.

Figs. 5A through 5F are detailed schematic wiring diagrams of the register sender.

Fig. 5I is a layout showing the manner in which the sheets of Figs. 5A–5H are arranged side-by-side to provide the complete diagram of the register-sender.

Figure 6:
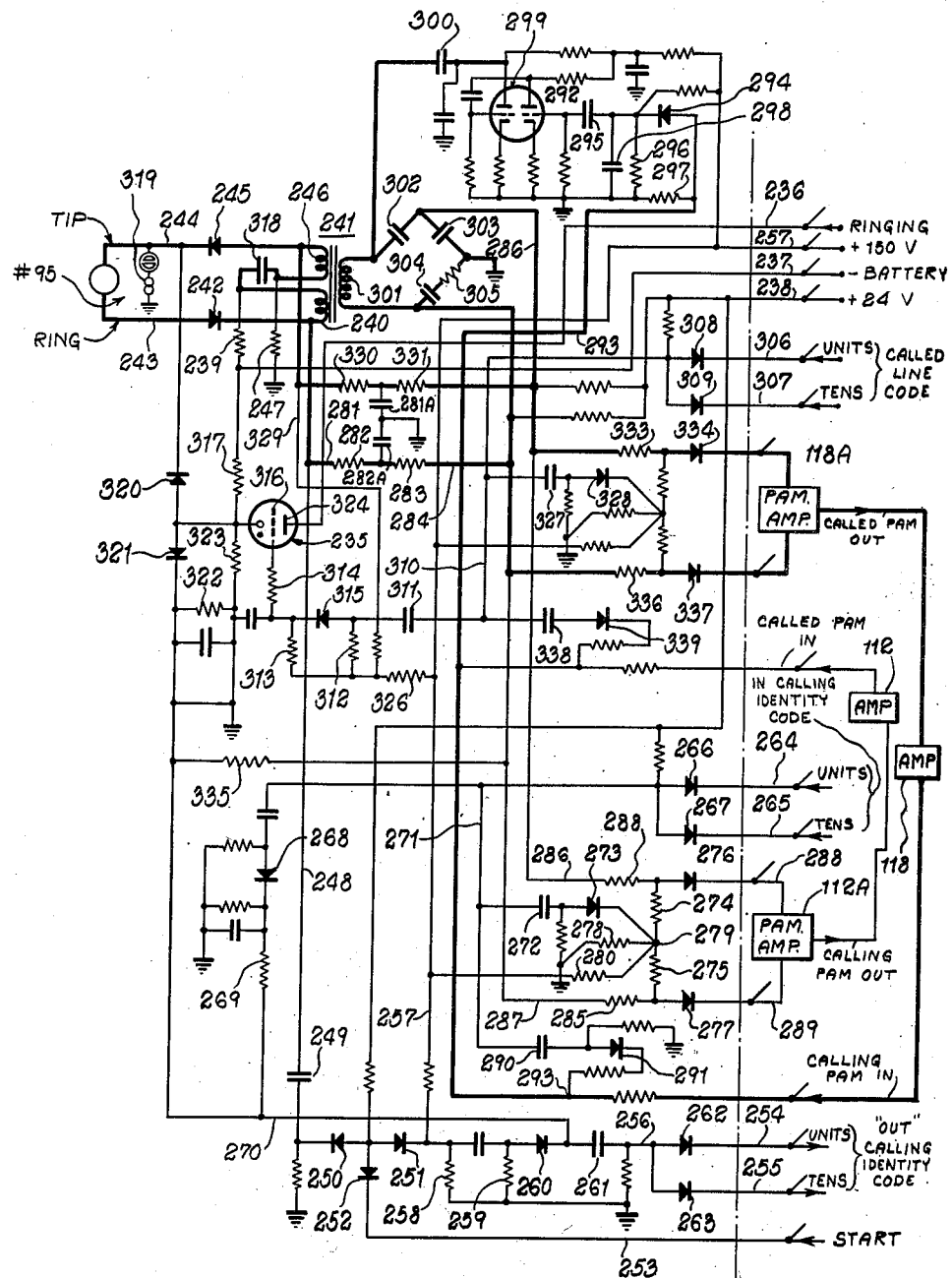

Fig. 6 is a detailed schematic wiring diagram of the subscriber's line circuit.

Figure 7:
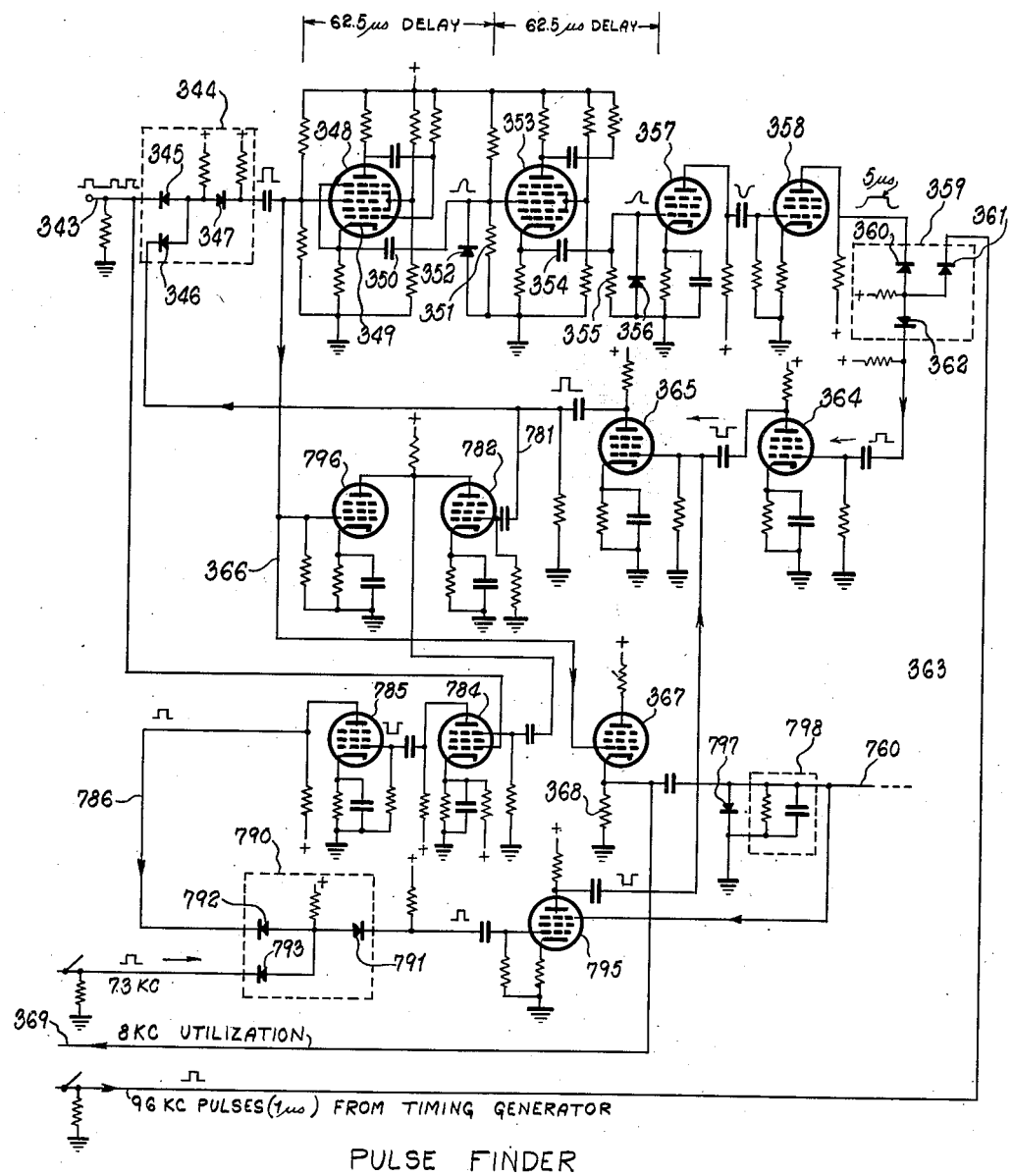

Fig. 7 is a detailed schematic wiring diagram of the pulse finder.

Figure 8:
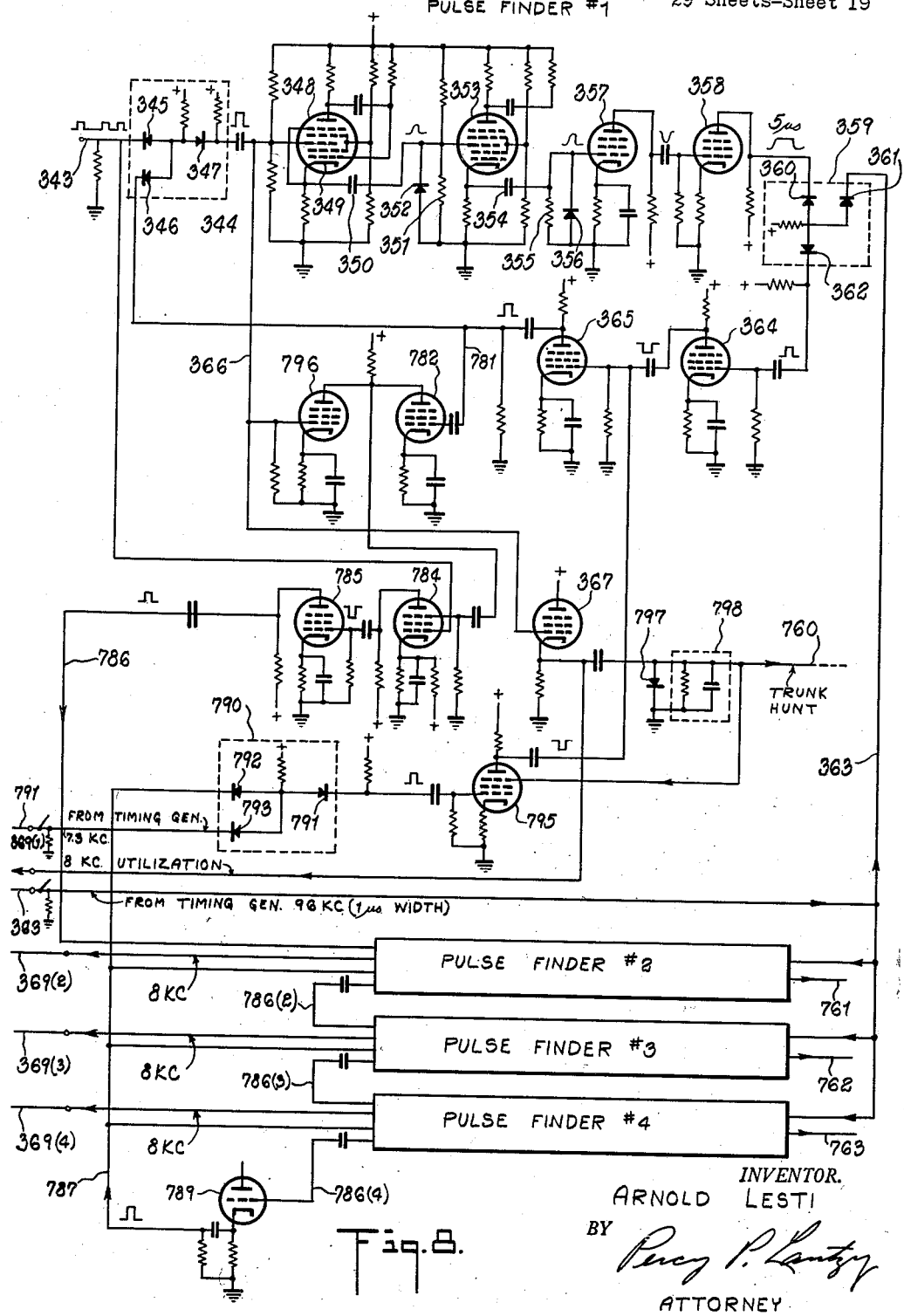

Fig. 8 is a detailed schematic diagram of a series of pulse finders with interconnecting chain control.

Figure 9:
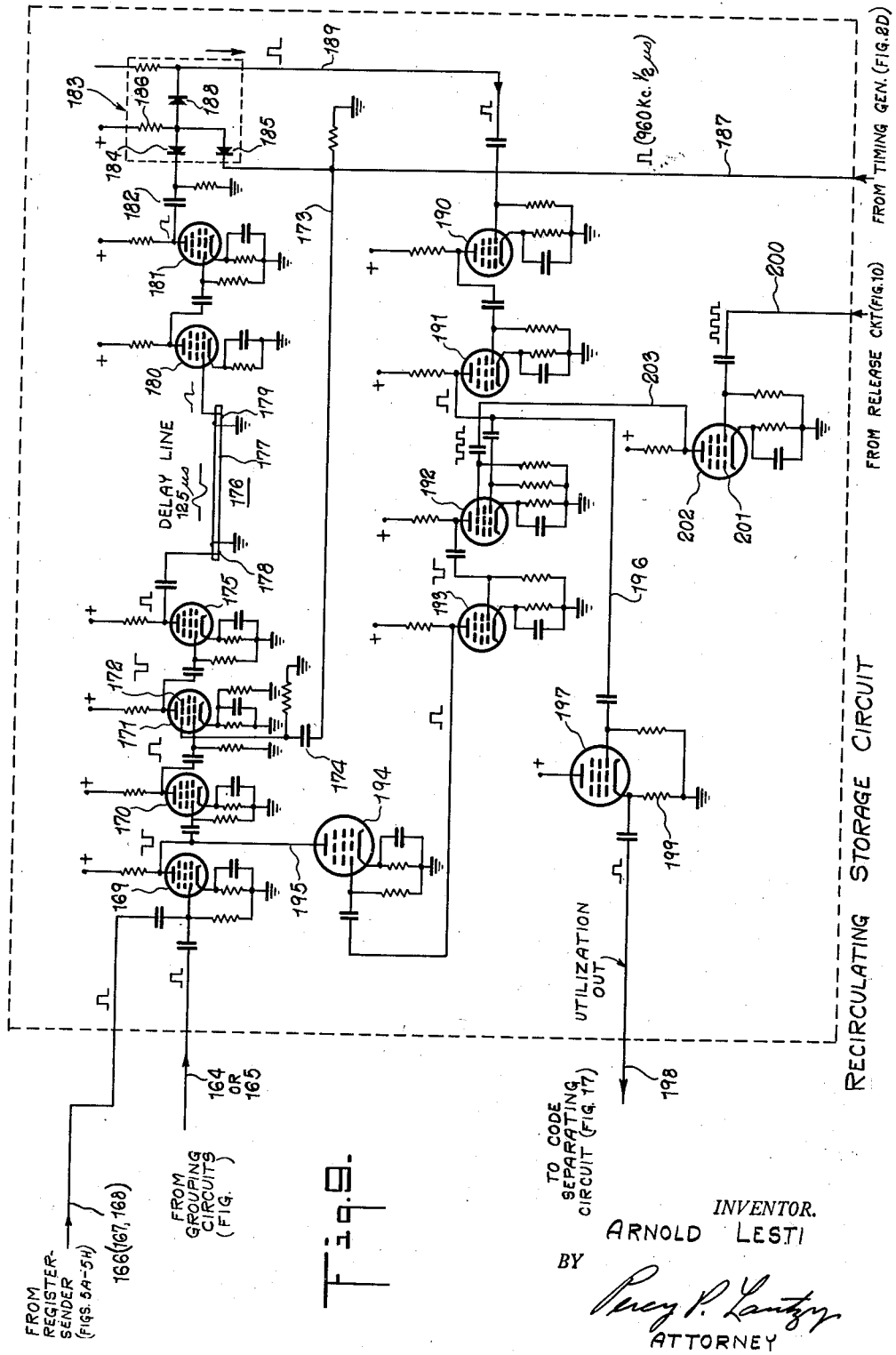

Fig. 9 is a schematic diagram of one of the recirculating storage circuits.

Figure 10:
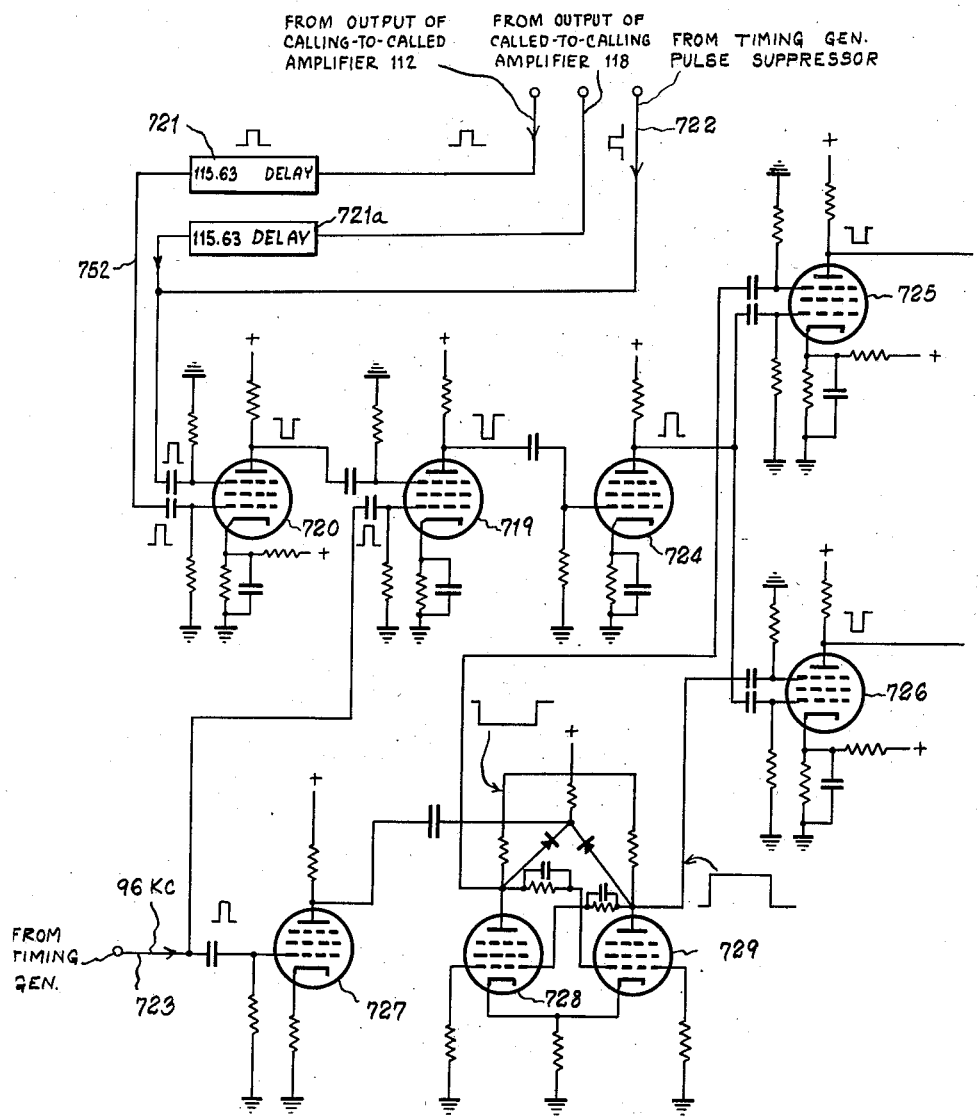

Figs. 10 and 10A together form a detailed schematic wiring diagram of the release circuit.

Fig. 10B is a layout showing the manner of positioning Figs. 10 and 10A side-by-side.

Figure 11:
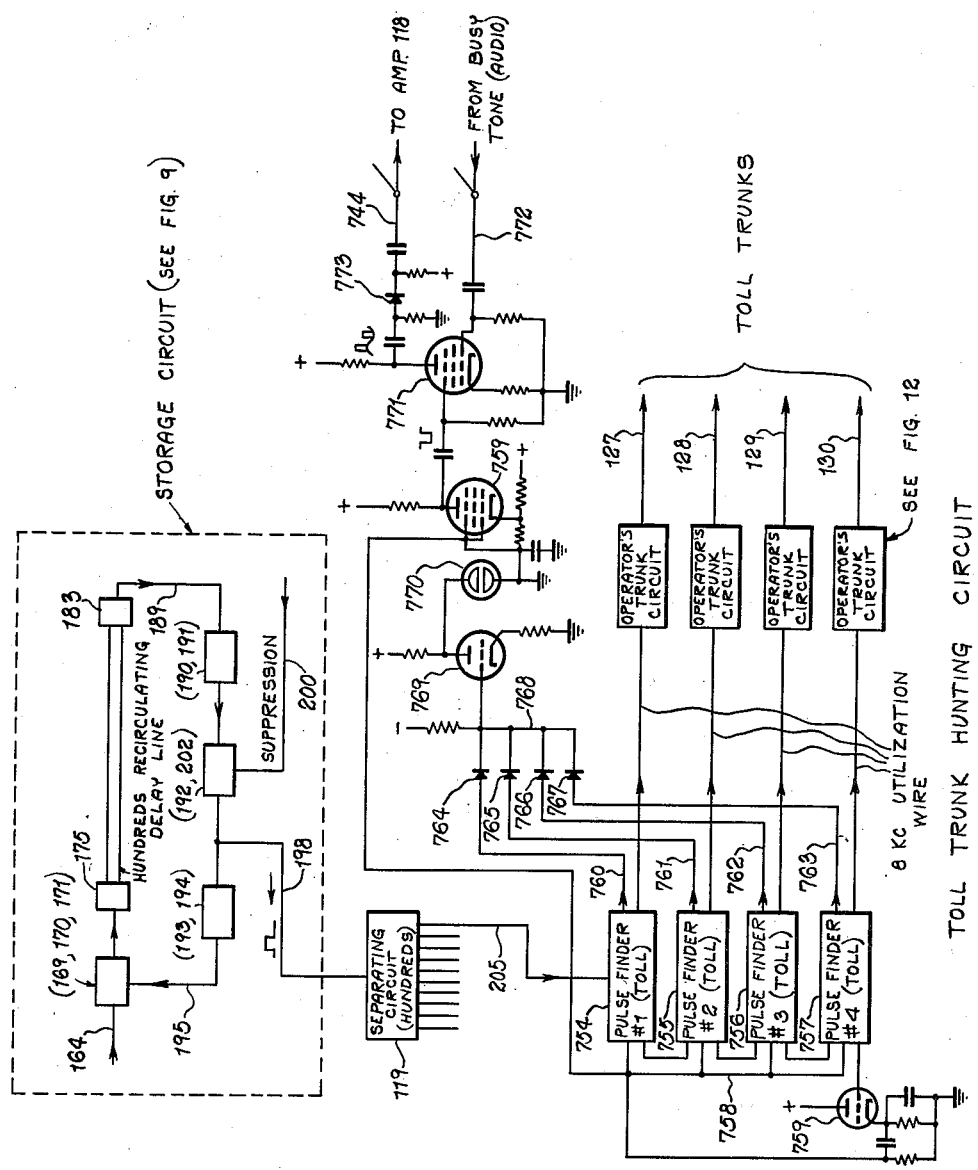

Fig. 11 is a schematic diagram of the toll trunk hunting circuits.

Figure 12:
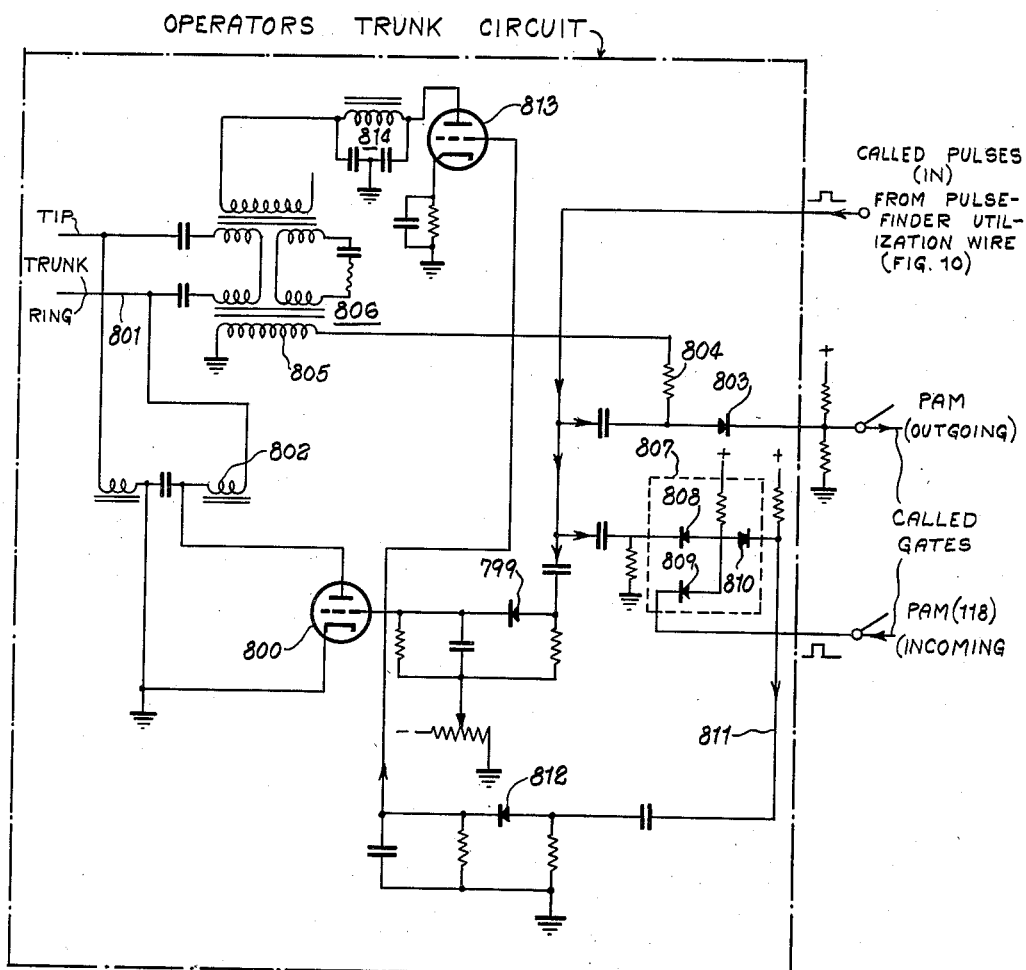

Fig 12 is a schematic diagram of the operator's trunk circuits.

Figure 13:
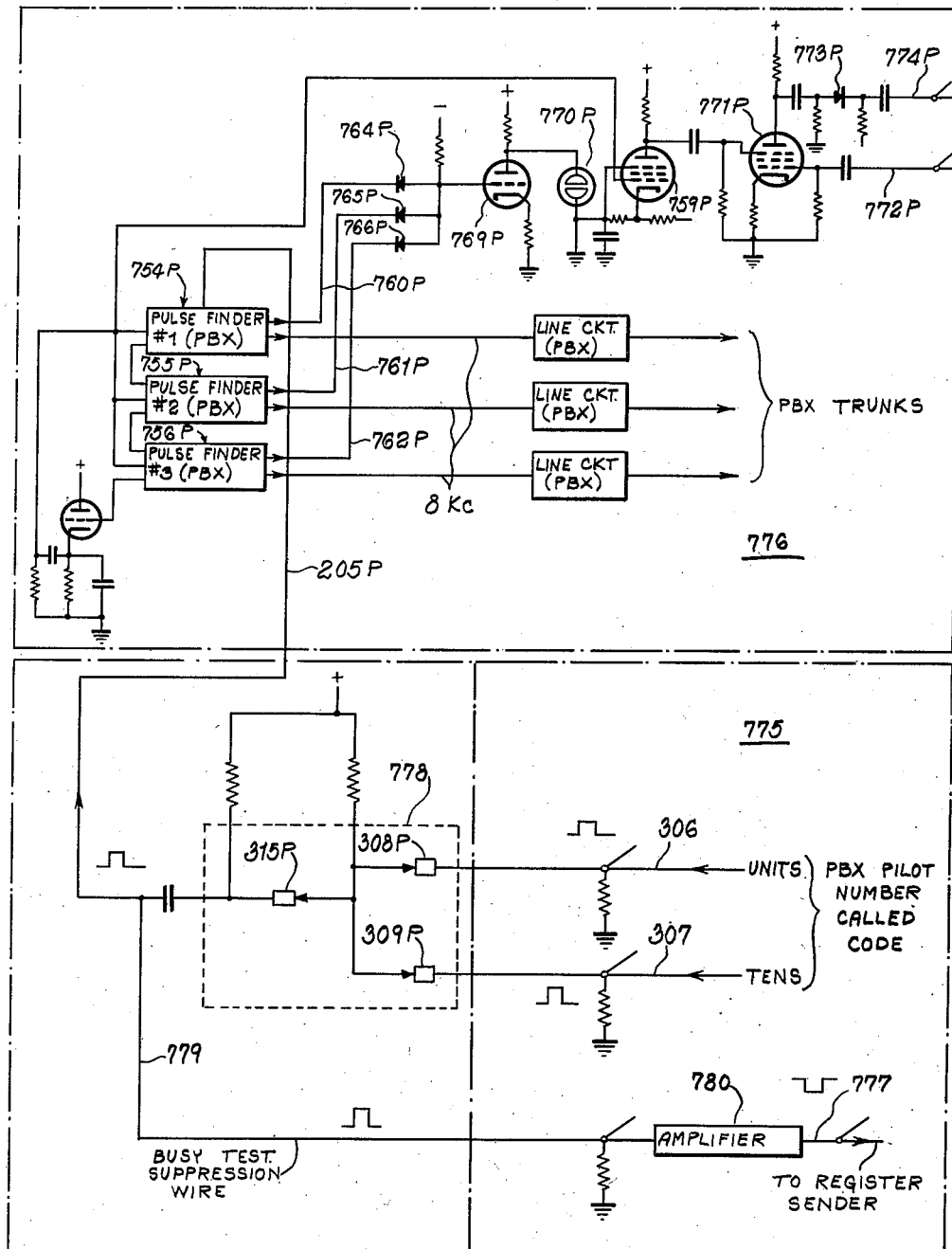

Fig. 13 is a schematic diagram of the P. B. X trunk hunting and pilot-number busy-test suppression circuit.

Figure 14:
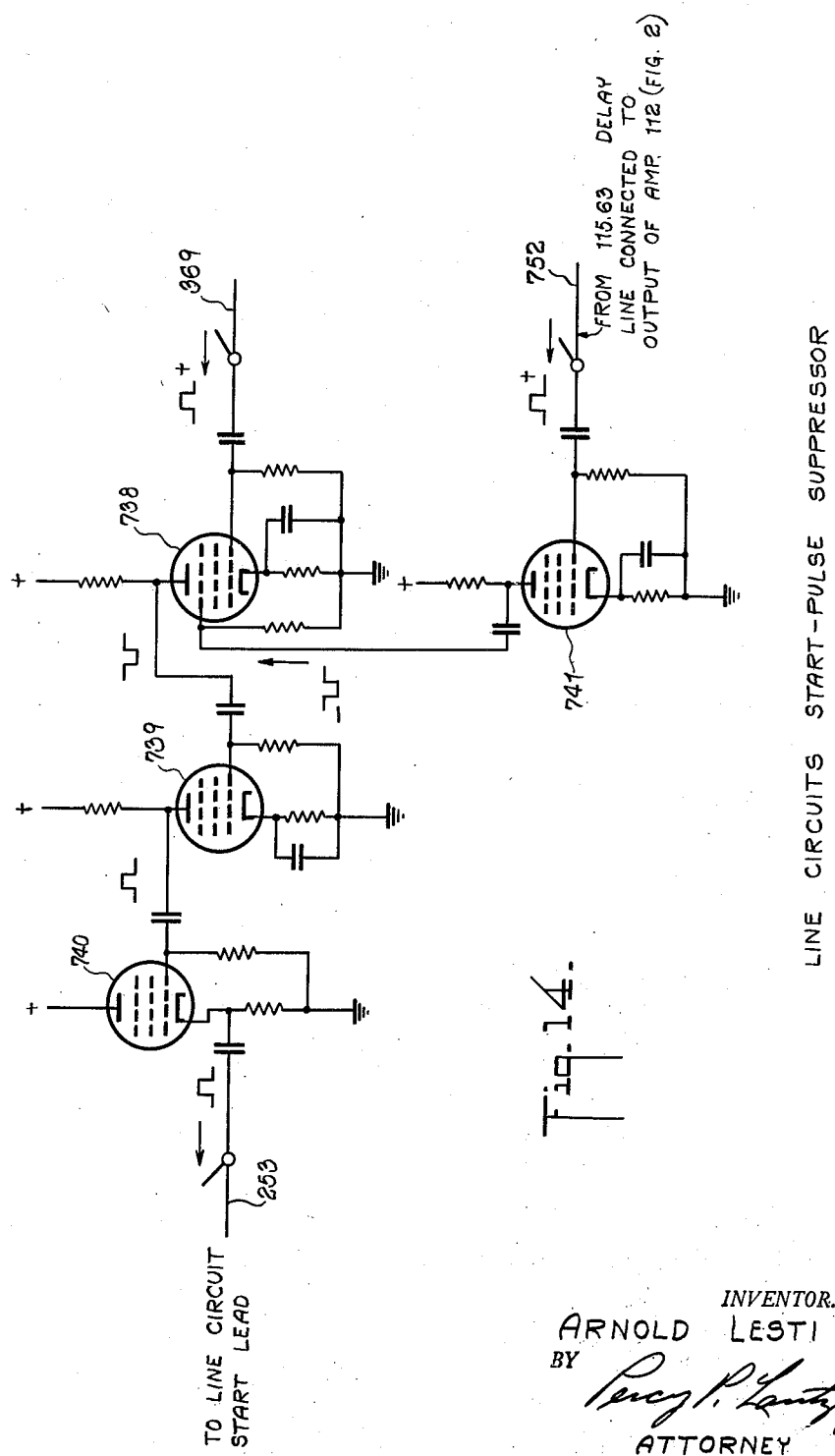

Fig. 14 is a schematic diagram of the line circuits start-pulse suppressor circuit.

Figure 15:
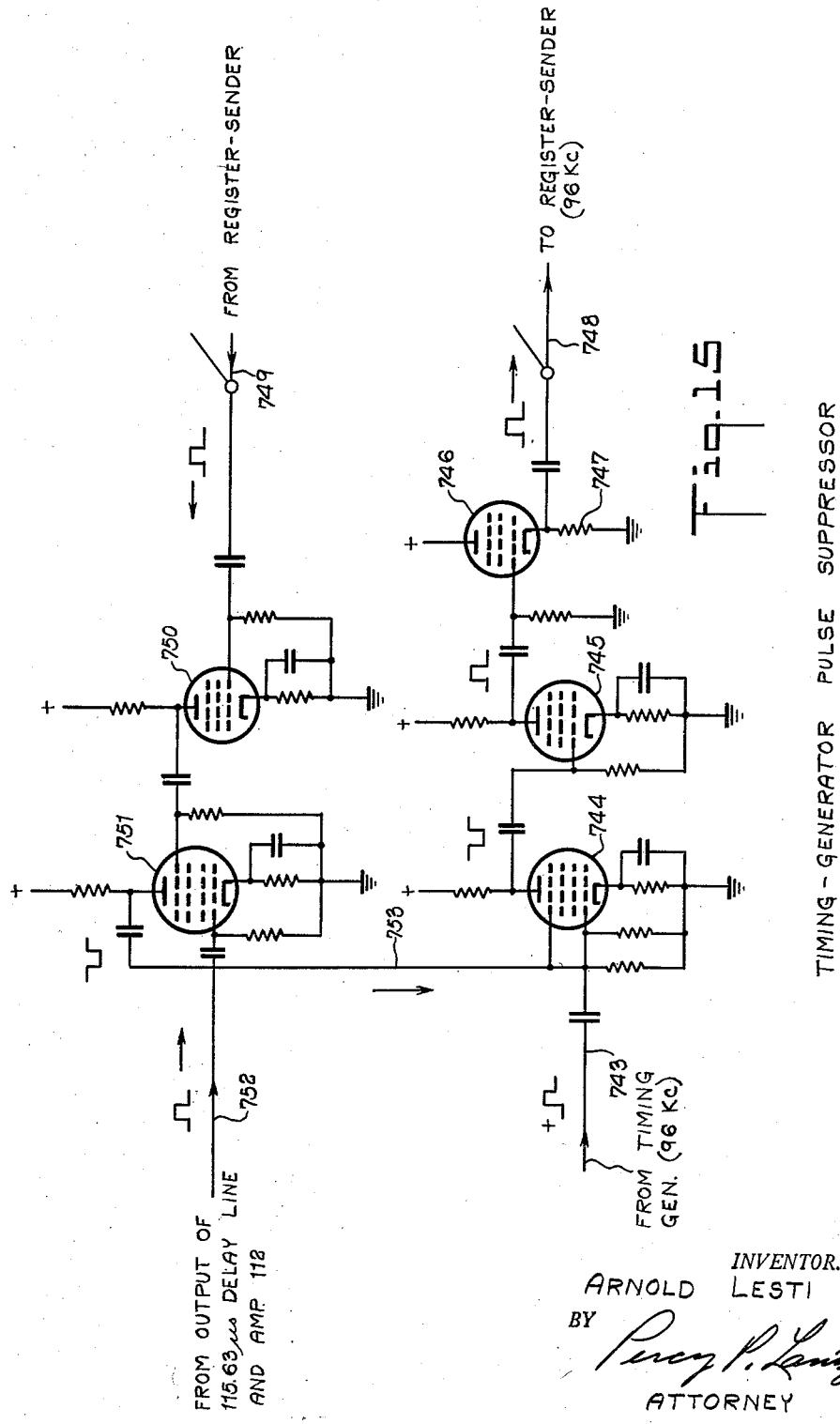

Fig. 15 is a schematic diagram of the timing-generator pulse suppressor circuit.

Figure 16:
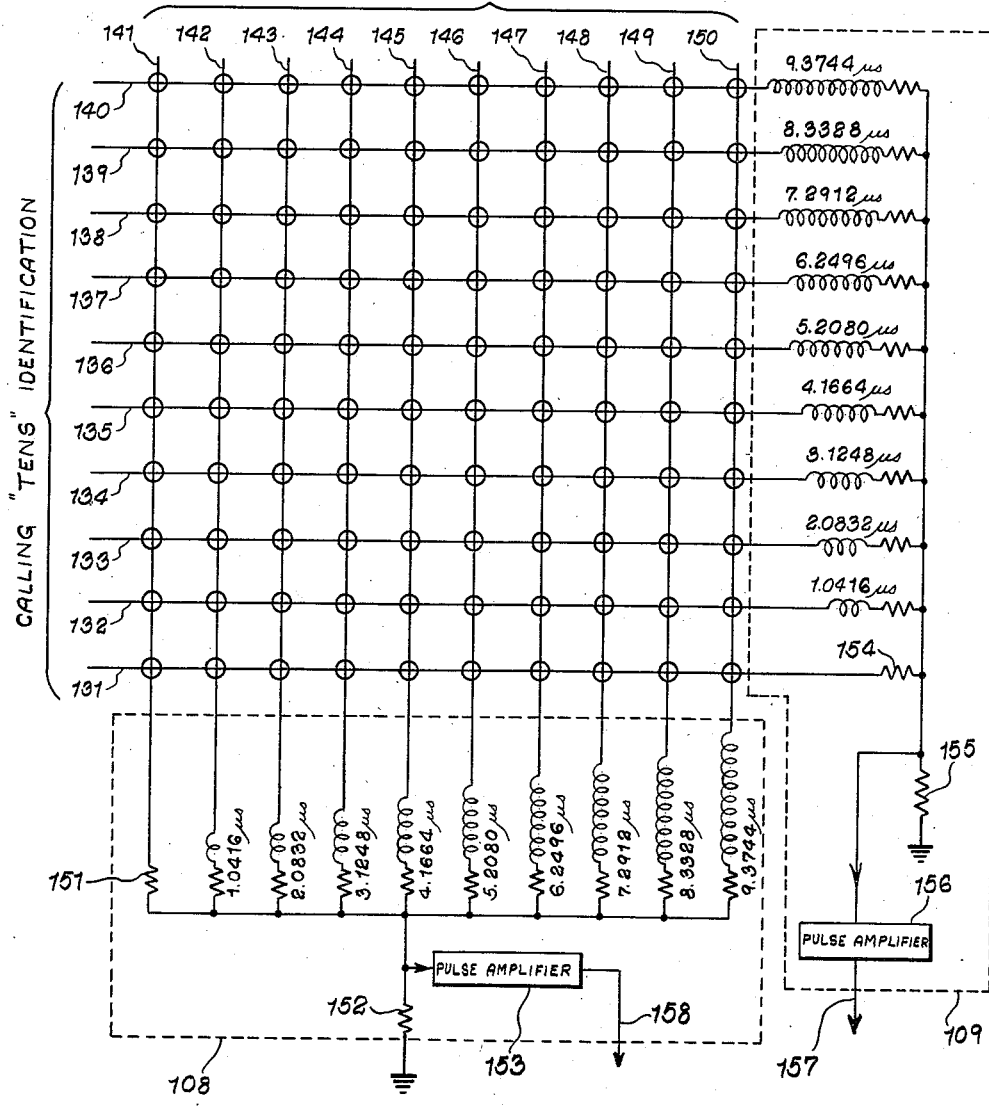

Fig. 16 is a schematic diagram of the calling lines identification grouping circuits.

Fig. 17 is a schematic diagram of a code separating circuit.

*General description*

This invention is concerned with a fully electronic automatic telephone switching system, wherein the various switching and switching control functions are carries out by pulse-time position code selection in a decimal arrangement. Merely for simplicity of explanation, but without limitation of its actual scope, the invention will be described in connection with a one-hundred line exchange, and on the assumption that the traffic will not require more than twelve simultaneous but separate conversational channels. The talking circuit which preferably, although not necessarily, is of the four-wire type, is multiplexed by modulated pulse time-position-division, to provide the required number of simultaneous conversational channels. The system being entirely electronic, requires no relays or other mechanically moving parts.

The various channelizing, switching and related functions are primarily controlled by a timing generator, which generates, for example, a basic pulse rate of 96 kilocycles per second. The pulses of the basic pulse rate are, for example, of 1 $\mu$s. duration. Throughout this specification, the symbol $\mu$s. represents microsecond. For various functions to be described, the generator also delivers the following additional pulse rates: 960 kc., ½ $\mu$s.; 9 kc.; 1 $\mu$s.; 4 kc., 125 $\mu$s. On the assumption of a maximum of twelve simultaneous calls, the 96 kc. signal is arranged to provide twelve pulse time-position channels, each of 10.416 $\mu$s. width and of 8 kc. repetition rate as shown diagrammatically in Fig. 1A and Fig. 1B. An available one of these time-positions is seized by a calling subscriber under control of a pulse finder; and at any given time short of an all paths busy condition there is available an idle time-position channel. When a calling subscriber initiates a call by releasing the telephone switch hook or button, his individual line circuit becomes associated with or seizes one of the twelve 8 kc. time-positions which remains associated with his line during the establishment of, and also during the entire conversational connection.

When a subscriber releases the connection, the time-position which his line circuit had previously seized, becomes available for any other calling subscriber.

Figure 1:
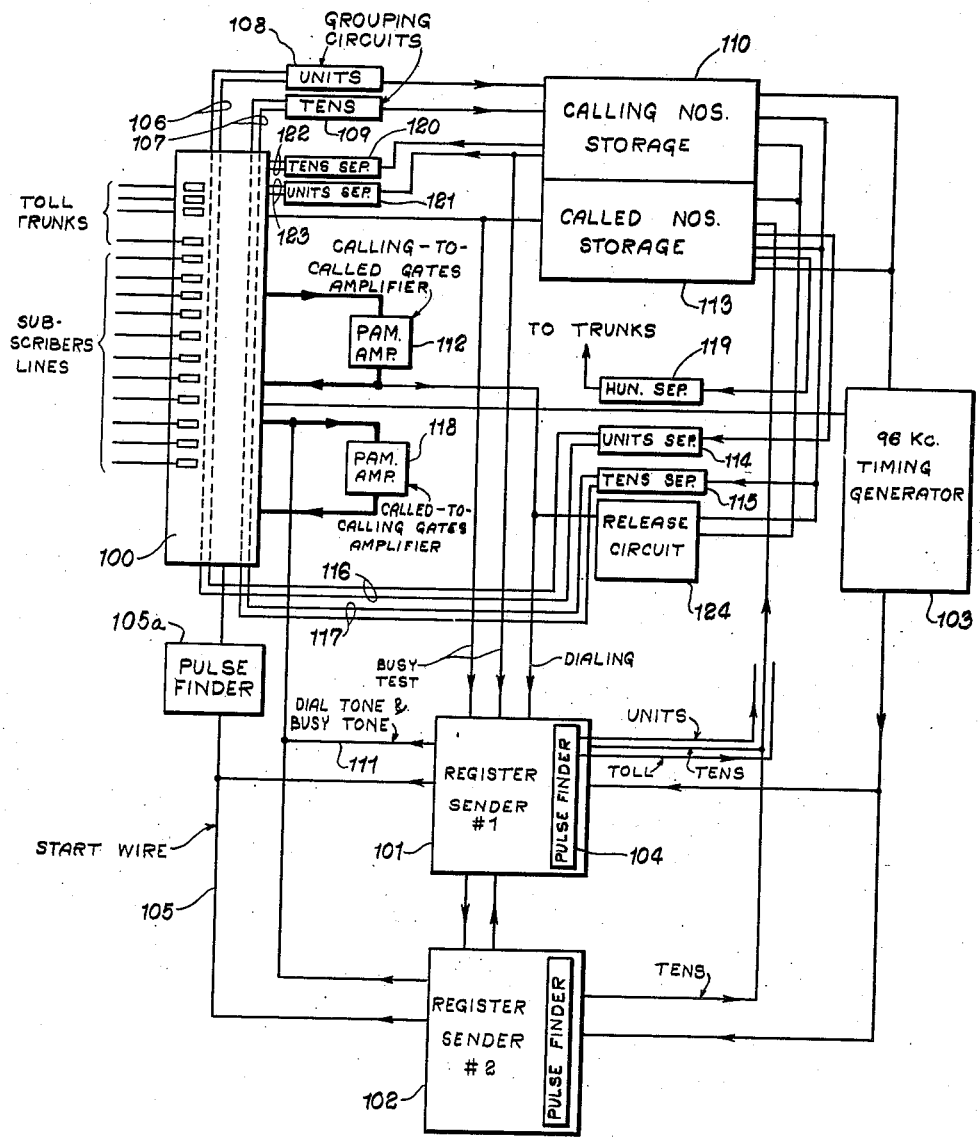
Fig. 1A is an explanatory pulse-time diagram.
Fig. 1B is an enlarged section of the diagram of Fig. 1A.
Fig. 1C is a schematic diagram of the talking paths and amplifiers of the system according to the invention.

The invention will first be described in connection with the simplified skeletonized schematic diagram of Fig. 1, and then in connection with the complete schematic diagram of Figs. 2A–2D and the detailed wiring diagrams referred to schematically in Fig. 2. Referring to Fig. 1, there is shown a number of subscribers' lines, and a number of outgoing trunk lines. Each subscriber's line terminates at the exchange in an individual line circuit illustrated schematically within the block 100. Associated with the line circuits and in common thereto, are two register senders 101, 102. The number of these senders will of course depend upon the traffic conditions, since a sender is associated with the calling line only during the time the calling subscriber is dialling the wanted subscriber's number, or until the calling subscriber hangs up as a result of receiving a busy signal. The register senders are arranged to supply dial tone and busy tone to the calling subscriber's line. Therefore when the calling subscriber finishes dialing or when he hangs up after receiving a busy tone, the seized register sender will restore to normal and will make itself ready for the next subscriber to place a call. Because of the very short "holding time" of a register sender, two senders can handle the traffic for one-hundred lines, if the calling rate is not excessive.

Pulses at the 96 kc. rate are applied to all the register senders from a 96 kc. timing generator 103. In each register sender there is a pulse finder 104 which seizes and "locks" to an available 8 kc. train of pulses from the generator 103, and this seized 8 kc. train is applied to a pulse finder and then to the start wire 105 which is common to all the line circuits. It should be observed that when two or more register senders are available, the 8 kc. train delivered by any one sender is different from that delivered by the remaining senders. A line circuit whose subscriber is initiating a call will seize the 8 kc. train appearing on the start wire; the pulse finder 105a will exclude other 8 kc. trains from entering that line circuit. The line circuits are multipled on a "units" and "tens" or decimal basis to a respective set of ten units wires 106; and also to a set of ten tens wires 107 which are multipled to respective units and tens grouping circuits 108, 109. For simplicity only two units and two tens wires are shown in Fig. 1. The 8 kc. start pulse applied to the input of a grouping circuit is translated into a respective time-position displaced pulse code, for example by means of a tapped pulse-delay line, so that each calling line is identified at the output of its units and tens grouping circuit by a pair of individual time-position coded pulses. This will be clear from Figs. 1A and 1B. As shown in Fig. 1A, each time-position channel which carries a conversational connection, consists of regularly recurring pulses separated by 125 $\mu$s. In accordance with terminology well-known in the pulse time-position modulation art, each complete series of twelve trains of 8 kc. pulses is known as a frame. On the assumption of twelve channels per frame, then the total time spacing or recurrence rate between successive pulses of any given channel will be 125 $\mu$s. Since according to the invention it is necessary to identify each and every calling line to a calling number storage circuit 110, and since the sub-frame duration is only 10.416 $\mu$s. with the pulses having a width of 1 $\mu$s., it is not feasible to identify the one-hundred calling numbers by a time-position displacement of more than 1.0416 $\mu$s. Thus, as shown in Fig. 1B, the time spacing between the pulses of successive channels is 10.416 $\mu$s. In accordance with one feature of this invention, the ten lines having the same units digit, for example lines 01, 11, 21 . . . 91, are connected to the units grouping circuit 108 having respective delay lines of different delay, so that the lines having successively higher units digits, have their identifying pulses, time-position shifted to a correspondingly successive greater extent. For example, all lines having the #1 units digit, will be identified by the #1 pulse (Fig. 1B) which is undelayed. Similarly, the remaining lines having a higher units digit, for example units digit 0, are delayed the maximum extent of 9.37 $\mu$s. Likewise the lines are grouped according to their tens digit, and are connected to the respective tens grouping circuit 109 which also may consist of a series of individual delay lines of successively greater delay. Thus all lines having the #1 tens digit are represented by the #1 pulse which is undelayed, and so on for the remaining tens digits, so that lines having the 0 tens digit have their pulses delayed by 9.37 $\mu$s. By this means therefore, each one of the entire one-hundred lines is represented by two pulses, one pulse representing the units digit, and the other pulse representing the tens digit; and the time-position of the pulses within the corresponding sub-frame will be in accordance with the value of the respective digits (see Fig. 1B). In other words, each line has at the output of its code grouping circuits a different and distinct double pulse time-position code in each sub-frame of 10.416 $\mu$s. By means of the tens and units physical groupings of the conductors 106, 107, the line identifying code can be considered as made up of a composite physical portion, namely by the physical interconnection of the tens and units conductors to the respective line circuits; and by the double pulse time position code.

The double pulse calling line identifying code is then recorded in an electronic storage circuit 110. When the calling subscriber receives the dial tone from the register sender over the dial tone wire 111, he proceeds to dial the number of the called line, which latter number is registered in the seized register sender by way of the calling-to-called gates amplifier 112, which of course is common to all calling lines. When the called number has been registered, it is translated by the sender into a double pulse time-position code representing the units and tens digits of the called line. It becomes necessary, therefore, to translate this double pulse time-position code into a physical existence of a pair of simultaneous pulses on the appropriate units and tens wires which lead to the called line circuit. For this purpose, and in order to release the sender, the time-position code pulse markings from the units and tens conductors leading from the sender are then stored in the called numbers storage circuit 113. The stored units coded pulse is then applied to a respective called units separating circuit 114; and the stored tens time coded pulse is applied to the tens called number separating circuit 115. The output of separating unit 114 includes ten units buses 116 multipled to the corresponding ten units wires 106. Likewise the output of tens separating circuit 115 comprises ten tens buses 117 which are multipled to the wires 107 of the line circuits. By means of suitable coincidence gates, when the appropriate double pulse code representing the called line is applied to the proper conductors in groups 116 and 117, the circuit to the called-to-calling gates amplifier 118 is opened and the conversational connection is established. The system is arranged so that of the twelve simultaneous channels which are available, eight may be allotted to subscriber-to-subscriber connections, while four may be used for subscriber-to-toll connections.

The register sender also connects to an appropriate hundreds or toll digit storage unit in the called numbers storage circuit 113. This particular unit is also connected at its output to a respective toll or hundreds digit separating circuit 119. The pulse from the separating circuit 119 causes the appropriate time-position pulse to be applied to the particular line circuit which is connected to the appropriate one of the four outgoing toll trunks.

In order to suppress on the start wire 105 the particular 8 kc. train of time-position pulses seized by a calling line from being seized by any other line, it is necessary that the particular time-position double pulse code of the calling line which has been stored in the calling numbers storage circuit 110, be transmitted back and applied to the particular units and tens wires of the calling line. For this purpose the calling line storage circuit 110 is connected at its output to a corresponding tens separating circuit 120, and also to a corresponding units separating circuit 121. The output of circuit 120 has ten buses 122 which are multipled to the corresponding lines having the respectively ten different tens digits. Likewise the output of circuit 121 has ten buses 123 which are multipled to the respective lines having the respectively ten different units digits. Thus when a call is initiated, the 8 kc. pulse train which is seized is also applied back over the calling numbers separating circuits 120, 121, to open a three-way coincidence gate whereby the seized pulse train is used exclusively for that particular calling line. The probability of double seizure on the same 8 kc. train, that is, the probability of two calling lines seizing the same time-position, is very small because the unguarded interval is in the order of one microsecond.

While the foregoing description has necessarily been seriatim for simplicity of description, it will be understood that the called-to-calling gates amplifier 118 is rendered effective at substantially the same time as the calling-to-called gates amplifier 112. In the called line circuit a ringing voltage is sent out to the called line when the stored called line code is applied to the called line circuit. When the called subscriber answers, the ringing current automatically ceases. Both the ringing and the ringing cut-off are controlled at the line circuit.

The final two-way talking path is established as an amplitude modulation of the time-position pulses on a four-wire circuit (see Fig. 1C). This four-wire circuit goes through a conventional hybrid junction or four-wire to two-wire terminating transformer at the interconnected line circuits, so that a two-way conversation can be carried out. It will be understood, of course, that the voice frequency signals generated at the calling and called stations correspondingly amplitude-modulate the seized 8 kc. pulses, and suitable integrating circuits are used at each end of the connection to detect and integrate the voice frequency modulations to produce the voice frequency signals for use at the respective subscribers' stations, as is well-known in the art of pulse amplitude and demodulation systems. The final talking path from the calling to the called subscriber goes through the calling subscriber's line hybrid coil or equivalent bridge circuit, thence to the calling-to-called amplifier 112, thence to the called subscriber's line hybrid coil or equivalent bridge circuit, to the called subscriber's station. The talking path from the called subscriber likewise goes through his local hybrid circuit, thence through the called-to-calling amplifier 118, and thence through the bridge circuit of the calling line to the calling subscriber's station, as schematically illustrated in Fig. 1C. As shown in Fig. 1C, the amplifiers 112 and 118 are common to all lines, and the four gates to and from these amplifiers are opened at precisely the same interval of time by the calling and called double pulse codes stored in the storage circuits 110, 113, and which codes are delivered simultaneously to the calling and called subscribers' line circuits at the rate of 8 kc.

The release of the established talking connection may be under control of either the calling subscriber or the called subscriber. When either subscriber releases the connection, the amplitude-modulated 8 kc. pulse train in the engaged time-position used for the conversation, will cease at the output of amplifier 112. This will cause the release circuit 124 to send blanking pulses, in the seized time-position which is now to be cleared, to the storage circuits 110, 113. The stored calling and called line pulses are then cleared for the storage circuits, and the 8 kc. time-position is thereupon made available for other calls.

When the calling subscriber has finished dialing, and just after the complete called number is registered in the sender, a busy test is made by sampling all the tens and units digits set up in the storage circuits 110, 113 and comparing them with the temporarily stored digits in the register of the register sender. If the called line is busy, either as a result of being a called line connected with another calling line, or as a result of it being a calling line engaged in establishing another connection, a busy tone is sent back over the wire 111 to the calling subscriber, in the form of a characteristic busy tone amplitude-modulation on the seized 8 kc. time-position pulse train; and thence to the input of amplifier 118 from which the busy tone modulated pulses find their way to the incoming calling gates of the line circuit which is placing the call. These busy-tone modulated pulses are demodulated and applied to the calling subscriber's loop. The circuits are so arranged that the seized register sender is prevented from sending to the storage circuit 113 any number which is busy. The system is also arranged to connect a calling station to an idle one of a series of P. B. X trunks leading to a P. B. X exchange.

In general therefore, the system actually shown in the drawing and to be described, has the following features with respective circuitry:

(1) 100-line system
(2) 8 simultaneous local calls
(3) 4 simultaneous toll calls
(4) 12 simultaneous total calls
(5) Ringing
(6) Dial Tone
(7) Busy Tone
(8) Hunting on toll trunks, busy given if all trunks are used
(9) P. B. X service; hunting over idle trunks, busy if all trunks are used
(10) 3 digit system
(11) For any local number dial a 5 for first digit and then two more digits which identify the local number
(12) For toll calls dial "0"
(13) For P. B. X dial the local pilot number (3 digits)
(14) For special services dial first digit only except 1, 5, 0
(15) Toll trunks for one-way and for two-way service
(16) Release controlled by calling party or by called party

Over-all operation of the system

Referring to Figs. 2A, 2B, 2C, 2D, there is shown in more detailed schematic form the complete system which was described hereinabove somewhat generally. Fig. 2E shows the manner in which the sheets of drawing incorporating Figs. 2A–2D should be arranged to provide a single composite drawing. With the sheets arranged as in Fig. 2E, there are shown four of the one hundred subscriber stations, for example stations having the calling numbers 11, 12, 13, and 95. Each station is connected over its respective tip and ring conductors 125, 126, to its respective line circuit. There are also shown four outgoing toll trunks 127–130, each connected to its respective trunk circuit. All the line circuits are identical, and one of them is shown in detail in Fig. 6. Likewise all the outgoing trunk circuits are identical, and one is shown in detail in Fig. 12. Each line circuit has an "Out" tens wire (calling) and an "In" tens wire (calling), an "In" units wire (calling), and an "Out" units wire calling. These four wires are effective to control the calling-to-called gates amplifier 112. The outgoing tens wires from the various stations are multipled to respective buses in the group 107 comprising the ten buses 131–140. Likewise the outgoing units wires from the various stations are multipled to respective buses in the group 106, comprising buses 141–150. Thus all subscribers' lines having the same tens digit, for example lines 10–19, have the outgoing tens wires connected to bus 131; lines 21–29 have their outgoing tens wires connected to bus 132; and so on for the remaining lines 01 to 09 which are connected to bus 140. Likewise all subscribers' lines having the same units digit, for example lines 11, 21, 31 . . . 01 have their outgoing units wires connected to bus 141; lines 02, 12, 22 . . . 92 have their "Out" units wires connected to bus 142; and likewise for the remaining "Out" units wires for the different line circuits. The buses 131–140 connect to a network 109 comprising a series of delay lines of different delays which constitute the "Calling Identification Grouping Circuit (tens)". Similarly, the buses 141–150 connect to a network 108 comprising a series of delay lines of different delays which constitute the "Calling Identification Grouping Circuit (units)". One of these identification grouping circuits is illustrated in detail in Fig. 16. As will be seen in Fig. 16, on the units or input side, bus 141 connects to a resistor 151 which provides zero delay; bus 142 connects to a 1.0416 μs. delay line. Likewise each of the remaining buses 143–150 connects to a respective delay line as indicated, so that the maximum delay is provided on bus 150, namely 9.3744 μs. The output ends of these delay lines are connected to a common and appropriate terminating resistor 152 to ground. The non-grounded end of resistor 152 is connected to the input of a suitable pulse amplifier 153. Similarly, the tens bus 131 is connected to a resistor 154 to produce zero delay; and the remaining tens buses 132–140 are connected to respective delay lines as indicated, and thence to ground through the common terminating resistor 155 whose grounded end is connected to a suitable pulse amplifier 156. As explained above in connection with Fig. 1B, the total time duration between pulses of successive time channels is 10.416 μs. Thus the output conductor 157 from device 109 will carry ten time-displaced pulses, each pulse identifying in time-position the respective one of the tens buses 131–140; likewise the output conductor 158 will carry ten time-displaced pulses, each pulse identifying in time-position the respective one of the physical units buses 141–150.

As mentioned above in connection with Fig. 1, when a call is initiated on a calling line, the "start" pulse is seized by that line, and a pulse with a similar timing to the "Out" tens wire (calling) of the associated line circuit, and another pulse with a similar timing are delivered to the "Out" units wire (calling) of that line circuit. These pulses are then applied simultaneously to the inputs of the respective grouping circuits 108, 109, but the pulses at the output conductors 157, 158, are displaced in time-position and therefore identify respectively the units and tens digits of the calling line.

The output of the tens grouping circuit 109 is fed to a storage circuit 159 for storing the coded time-position pulse representing the tens digit of the calling line. Similarly, the output of the units grouping circuit 108 is fed to a storage circuit 160 for storing the coded time-position pulse representing the units digit of the calling line. Each of these storage circuits comprises a 125 μs. recirculating delay line and associated circuits. One of these storage circuits is shown in detail in Fig. 9. It should be observed that one coded time-position pulse corresponding to the units digit of the calling line, and one coded time-position pulse corresponding to the tens digit of the calling line, are sent to their respective storage units, since the recirculating delay line in each of the storage units requires only a single pulse to start it continuous recirculating. Thereafter the pulse is continuously recirculated in their respective storage unit in a closed loop which includes the 125 μs. delay and associated regenerating circuits. The coded time-position pulse thus captured in the respective storage unit retains its correct relative timing position in the frame of 125 μs. (see Fig. 1A). Each storage unit has an output circuit which will deliver to the output utilization conductor thereof, whatever stored sequence exists at any time in the associated storage circuit, and without affecting the stored sequence.

*The code storage circuits and the code separating circuits*

As will be seen from Fig. 2A, there are five storage circuits all of which are of similar circuitry and one of which is shown in detail in Fig. 9. Two of these storage circuits, namely 159 and 160, are used to store the coded time-position pulses representing the tens and units digits of the calling line as above described. The storage circuit 161 stores the coded time-position pulses representing the tens digit of the called line; storage circuit 162 stores the coded time-position pulses representing the units digit of the called line; storage circuit 163 stores the coded time-position pulses representing the special distinguishing hundreds digits for toll connection. In the case of toll connection, only the digit 0 is dialed. For special services there is dialed only the first digit with the exception of digits 1, 5 and 0. The outputs of the calling tens storage circuit 159 is applied to the corresponding tens code separating circuit 120; the output of the calling units storage circuit 160 is applied to the corresponding units code separating circuit 121. Similarly, the called tens digit storage circuit 161 is connected to the corresponding tens code separating circuit 115; the called units digit storage circuit 162 is connected to the corresponding units code separating circuit 114; and the called hundreds digit storage circuit 163 is connected to a corresponding code separating circuit 119. The separating circuits function in an inverse manner to their corresponding grouping circuits. Thus a separating circuit will take a pulse occupying a particular time-position on a single input conductor, and will deliver at its output a corresponding pulse on a particular one of the ten buses connected thereto. Thus any particular coded time-position pulse from unit 159, for example, to unit 120, will result in a corresponding timed pulse at one of the buses of the group 122. The buses of group 122 are multipled to the various line circuits as shown, in accordance with the tens digits of those lines. Similarly, the ten buses 123 from separating circuit 121 are likewise multipled to the various line circuits in accordance with the units digits of those line circuits and as shown. All the line circuits which have the same tens digit, have their "In" tens wires (calling) multipled to the same one of the buses in group 122. On the other hand, all the line circuits having the same units digit, have their "In" units wires (calling) multipled to the same one of the ten buses in group 123.

Fig. 3 is a code matrix diagram showing that each bus connects to ten line circuits, and each line circuit also connects to two buses, which therefore provides unique line identifications. In addition to the "In" tens (calling) and "In" units (calling) wires, each line circuit has an additional pair of tens and units wires (called) which function to open the called line gate, as will be described hereinbelow. The important feature of each code separating circuit is that when a units pulse of a given time-position in the 10.416 μs. time interval (see Fig. 1B) is placed on the output buses 123 from circuit 121 with a count corresponding to that time-position, the tens pulse of any other time-position in the same 10.416 μs. interval will be placed on one of the output buses 122 from circuit 120 with a count corresponding to that time-position; and both pulses will occur on the two buses simultaneously. Thus while ten line circuits are connected to the same units bus in group 123, only that line circuit will respond which is also connected to the simultaneously pulsed bus in the group 122, and all other line circuits will not be responsive to these two particular simultaneous pulses. The manner in which this coincidence of the two pulses on a tens bus and a units bus renders a particular line circuit responsive, will be described in detail hereinbelow in connection with Fig. 6. This principle of opening the gate to a line applies whether the line circuit is to a calling line, or to a called line, except that when a line circuit is being called, its response to the pair of coincident coded pulses is effected over the "In" tens wire (called) and over the "In" units wire (called).

Detailed description of a storage unit (Fig. 9)

It will be assumed, by way of example, that a pulse is received at the storage circuit 159 from the calling line tens identification grouping circuit 109. The action is the same for all the storage units except that in the case of units 161, 162, 163, the pulse to be stored is received from the register sender 101, 102, as a result of the registration of the dialed impulses from the calling line. Thus the input conductor 164 (Fig. 9) will represent either that conductor or conductor 165 (Fig. 2), while conductor 166 (Fig. 9) will represent either conductor 166, 167 or 168 (Fig. 2). The input pulses to conductor 164, for example, are of one microsecond duration, and are amplified by grid-controlled amplifier tubes 169, 170. These tubes are shown in Fig. 9 as pentodes, each having a cathode, an anode and three successive intervening grids, the grid nearest the cathode being the input control grid, the next being the shield grid, and the next grid being the usual suppressor grid. Since the action of such tubes in amplifying input pulses is well-known, detailed description thereof and detailed description of the interstage coupling and electrode biassing circuits need not be given herein. Suffice it to say that since the system is dealing with pulses, the interstage coupling between successive tubes should preferably be by means of a suitable condenser. The amplified pulse output from tube 170 is coupled to the control grid of tube 171 which acts as a gating tube. Tube 171 has its cathode normally biased positively to such an extent that the tube will not pass pulses to its output circuit unless its suppressor grid 172 has a positive-going pulse impressed thereon. These gating pulses of 960 kc. rate and ½ μs. duration, are delivered from the timing generator 103 (Fig. 2D), and are applied over conductor 173 and coupling condenser 174 to the suppressor grid 172. When tube 170 is gated on, it passes ½ μs. pulses whenever pulses are applied to its control grid from tube 170. The gated pulse output of tube 171 is amplified in the next tube 175 whose amplified pulse output acts to drive a delay line 176. Preferably, although not necessarily, line 176 is of the magnetostriction kind, comprising a length of magnetostrictive rod or wire 177 such as nickel, with an input coil 178 electromagnetically coupled to it at one end, and an output pick-up coil 179 electromagnetically coupled to the line at the opposite end. The ½ μs. pulses from the output of tube 175 are applied as driving pulses to coil 178, and in traveling along line 176, they spread to about 1 μs. The total delay of a pulse between the input and output ends of the line is 125 μs. The pick-up coil 179 will have these delay pulses induced into it. The pulses from coil 179 are amplified in the cascaded amplifier tubes 180, 181 and the amplified pulse output is applied through condenser 182 to the coincidence gate 183. This gate may be of any well-known type and may comprise, for example, a pair of suitably-biassed rectifiers 184, 185, which are positively biassed through the common load resistor 186. Rectifier 184 is driven by the pulse output of tube 181, and rectifier 185 is driven by a 960 kc. ½ μs. pulse over the conductor 187 from the timing generator 103 (Fig. 2D). When only one of the rectifiers 184, 185 is driven by its respective pulse input, insufficient drop occurs in resistance 186 to render the additional rectifier 188 conductive. However when the pulses applied to rectifier 184 from tube 181 are coincident with the 960 kc. pulses applied to rectifier 185, both rectifiers 184, 185, conduct and render rectifier 188 conductive.

The output of gate 183 as applied to conductor 189, will therefore consist of accurately timed and shaped code pulses of ½ μs. duration. These pulses are fed to the cascaded amplifier tubes 190–194. The pulse output of tube 194 is applied over conductor 195, in parallel with the output of tube 169, so that tube 194 recirculatingly feeds the delay line 176. A single pulse impressed on the control grid of tube 169 suffices to start the circuit recirculating continuously so that thereafter the delay pulses will enter the line 176 by way of tube 194, and will continue to recirculate indefinitely and with the time-position determined by the time-position of the original pulse applied to the control grid of tube 169.

It will be observed that the output of tube 191 is also applied over conductor 196 to a cathode follower tube 197, the output conductor or utilization lead 198 being connected to the cathode load resistor 199. The conductor 198 leads to the corresponding code separating circuit (see Fig. 2A). When it is desired to stop the recirculating storage action, pulses from the release circuit 124 (Figs. 2C and 10) are applied over conductor 200 to the control grid 201 of tube 202 which produces corresponding negative-going pulses on conductor 203 connected to the suppressor grid of tube 192. Tube 192 is biassed so that it will not pass to its output the pulses from tube 191 whenever negative-going pulses are simultaneously applied to the suppressor grid of tube 192. Thus the recirculation storage action is stopped if it is suppressed by a single pulse received over conductor 200. Thereby the original coded time-position pulse either from the calling line identification grouping circuit, or from the register sender, is removed from storage, and that time-position which is thus freed, is made available to other calling lines. The register feeds into lead 166.

The code separating circuits

The code separating circuits of which there are five (see Figs. 2A, 2C), are of identical construction. Their function is to receive the coded pulses in time sequence from the respective storage circuit and deliver the coded pulses simultaneously on a set of buses, namely buses 116, 117, 122, 123, or the single output bus 205. The code separating circuit functions in a manner which is exactly the opposite of the associated grouping circuit described hereinabove in connection with Fig. 16. One of these code separating circuits is shown in detail in Fig. 17 which, for example, may represent the code separating circuit 120 (Fig. 2A). Referring to Fig. 17, pulses from the associated storage cricuit received over conductor 198, are amplified in pulse amplifier 206 whose positive pulse output drives the delay line 207 having a total delay of 9.37 μs. The line has ten taps with a delay of 1.0416 μs. between successive taps. Each tap is connected to the control grid of a respective one of the ten amplifier tubes 208–217 which preferably are of the pentode type. The suppressor grids of these tubes are connected together by conductor 218 which is supplied through condenser 219 with 96 kc. pulses over conductor 220, these pulses being of 2 μs. duration and being delayed 9.37 μs. by a suitable delay line 221. As explained hereinabove in connection with Fig. 16, for any particular digit the #1 digit is not delayed in the grouping circuit. Since the delay in the storage circuit (Fig. 9) is exactly 125 μs., this will not make any difference, because with such delay of 125 μs. the pulses are kept in the same relative time position of their respective channels, although they may occur in a different frame (see Fig. 1A). If there is a pulse corresponding to the #1 digit in the separating circuit, it will travel down the line 207, and when it reaches the last or tenth tap 222 which is connected to the control grid of tube 217, it renders that tube effective to pass plate current since at that instant a positive pulse is also being supplied over conductor 220 to the suppressor grid of tube 217. It should be noted that the tubes 208–217 are normally biassed to plate current cut-off, but a positive pulse of a predetermined amplitude applied to the suppressor grid of any tube will render that tube plate current conductive. Therefore the keying pulse from conductor 220 which has a delay of 9.37 μs., will cause tube 217 to pass a negative pulse on to the #1 bus of group 122 if at that instant there is a positive pulse on tap 222 because the delay at tap 222 is $9 \times (1.0416$ μs.$) = 9.37$ μs.

As explained in connection with Fig. 16, the grouping circuit will delay the #2 pulse of a digit by 1.0416 μs. If a pulse with this delay enters line 207, it will arrive during the time of keying by the positive 96 kc. pulse from conductor 220 at the ninth tap 223 because the delay at that tap is 8×(1.0416 μs.)=8.33 μs. This delay in the line 207, plus the delay provided by the grouping circuit for the digit #2, namely 1.0416 μs., is 9.37 μs. Therefore, if there is a pulse corresponding to the #2 pulse of the digit, it will appear at the same time as the above-described #1 digit pulse, but in this case it will appear on bus #2 of group 122. In a similar manner, pulses corresponding to the other digits, will be keyed to their respective buses. Thus the #10 or 0 pulse will arrive at the first tap 224 when a keying pulse from conductor 220 occurs coincidentally therewith since the latter pulse is already delayed by 9.37 μs. in line 221. All code pulses will appear on the output buses simultaneously but with a delay of 9.37 μs. These pulses at the buses are used to operate coincidence gates at the calling and called line circuits, as will be described hereinbelow. Preferably, each of the buses is connected to its respective delay line tap through a respective amplifier tube 225-234, and the associated well-known amplifier circuits (not shown).

The line circuit

When a line circuit receives the 9.37 μs. delayed calling code on the buses 122 for example, it sends out identically timed pulses through the outgoing calling gate which forms part of the line circuit. All the line circuits are identical and one is shown in detail in Fig. 6. Merely for explanatory purposes, it will be assumed that the line circuit shown in Fig. 6, is connected to the subscriber's station whose number is 95, which station can be of conventional design including the usual subscriber's loop circuit and standard hand set, and with standard impulsing dial and ringing equipment. The application of ringing current to the line when it is being called is controlled by a grid-controlled gas tube or Thyratron 235 over the ringing supply conductor 236, which is connected in common to all line circuits. When the subscriber wishes to make a call he removes the hand set from the cradle or switch hook to close the subscriber's loop in the conventional manner. 24 volt talking battery is connected to conductors 237, 238, and talking current flows around the subscriber's loop, traceable from −24 v. battery, resistor 239, winding 240 of the voice frequency transformer 241, selenium rectifier 242, ring conductor 243 of the subscriber's loop, returning thence through the subscriber's hand set to the tip conductor 244, selenium rectifier 245, transformer winding 246, resistor 247 to ground, it being understood that the positive terminal of the talking battery is grounded in the conventional way. The voltage on conductor 248 will therefore swing relatively in the positive direction and remain at its more positive value as a result of closure of the subscriber's loop. This is due to the voltage drop across the winding 240 of transformer 241, and resistor 239. Condenser 249 will, upon closure of the subscriber's loop therefore, deliver a relatively wide pulse, for example 1000 μs. This pulse is applied to crystal rectifier 250 which forms with similar rectifier 252, a two-way coincidence gate for controlling the application of the starting pulses from the start wire 253 to the "Out" units calling line identifying wire 254 and the "Out" tens calling line identifying wire 255. Rectifier 252 will receives time position or channel pulses from the start wire 253 as will be described hereinbelow. Pulses however, will not pass through this gate to conductor 256 and conductors 254, 255 unless positive voltage is applied simultaneously to the inputs of the two crystal rectifiers 250, 252. Since the duration of the pulse on the start wire 253 is 1 μs., the duration of coincidence of the pulses to the two rectifiers 250, 252, will be 1 μs. As pointed out hereinabove the rectifier 250 receives its positive pulse from the closure of the calling subscriber's loop and over conductor 248. Rectifier 251 is steadily biased positively by the divided +150 volts applied over conductor 257 through voltage dividing resistors. In the absence of the double coincidence, there will be insufficient voltage developed across resistors 258 and 259, to render crystal rectifiers 251 and 260 conductive. However, when the pulse coincidence does occur, rectifier 260 becomes conductive and a pulse will be transmitted through that rectifier and condenser 261, through rectifier 262 and rectifier 263, to the units and tens calling line identification wires 254 and 255. The rectifiers 262, 263, prevent back-flow from the common circuits into the calling line circuit. The pulses from conductor 254 go to the units calling identification grouping circuit 108 (Fig. 2A, Fig. 16), wherein the #5 count pulse is delayed 4.1664 μs. as described in connection with Fig. 16. Since it has been assumed that the calling line is #95, this units identifying pulse will be applied over bus 145 (see Fig. 2C, Fig. 16). Similarly, the tens identifying pulse from conductor 255 will be applied over bus 139 to the tens grouping circuit 109, and the tens identifying pulse will be delayed 8.3328 μs. Then each of the pulses goes to the corresponding storage circuit 159, 160 described above in connection with Fig. 9, and from these storage circuits the tens and units identifying pulses go to the respective tens and units code separating circuits 120, 121, described above in connection with Fig. 17. As already described, each storage circuit has a total delay of 125 μs., and the separating circuit delays a #1 count pulse by 9.37 μs. The delay through a corresponding pair of separating and grouping circuits in series is however constant and +9.37 μs., consequently the total delay +134.37 μs. The particular line circuit #95 under consideration which sent out its calling identification pulse code on its wires 254, 255, will receive the same code back on its incoming calling identification conductors 264, 265. The crystal rectifiers 266, 267 therefore, receive simultaneous identifying pulses from the conductors 264, 265, and those rectifiers form a coincidence gate. Normally rectifier 268 is non-conductive. However, when the simultaneous calling line identification pulses occur on conductors 264, 265, sufficient voltage appears at rectifier 268 to render it conductive. Thus rectifier 268 passes an 8 kc. series of pulses with each pulse of about 2 μs. duration. The 8 kc. pulse rate is obtained from the recirculating delay line in the storage circuit (Fig. 9). The pulses passed by rectifier 268 are filtered by its associated filter circuit and develop voltage across resistor 269 which is transferred as a bias over conductor 270 to rectifier 260, which thereupon ceases to conduct and immediately prevents pulses from going out over conductors 254, 255. Coincidences can occur in gate 250—252 at intervals of 125 μs. as long as the above-described switch hook control pulse over conductor 248 persists. Double seizure by two line circuits has a very low probability because of the shortness of the time intervals involved. Also, the pulse finder at the start lead will prevent double seizure of two pulse trains. The time-position that is actually seized cannot be seized later by any other line circuit because the seized pulses are suppressed at the start wire 253 by the line circuits start lead pulse suppressor which will be described hereinbelow. Since the rectifier 260 remains conductive until the line circuit receives back its appropriate double pulse identifying code, this assures that the storage circuit has received and has stored the calling line identification pulse code.

The seized 8 kc. pulses which are received on conductors 264, 265, also pass by way of conductor 271, condenser 272, rectifier 273, through the equal resistors 274, 275, and thence to rectifiers 276, 277, to the calling-to-called gates amplifier 112. Crystal rectifier 273 is biased positively by the resistor 278 connected between the common junction point 279 and ground. Junction point 279 is connected through the resistor 280 and thence to the +150 volt conductor 257. The ring side of the subscriber's loop is connected over conductor 281, resistors 282, 283, conductor 284, resistor 285 and thence to the junction point 279 through resistor 275. As above-mentioned, this ring side of the subscriber's loop is also connected to conductor 248 whose voltage rises positively when the said loop is closed. This will raise the voltage at the input to crystal 277 to modify the bias thereon. The 8 kc. pulses from conductor 271 pass through rectifier 273. These add to the bias from the ring side of the subscriber's line and the greater amplitude will pass through 277. This would not be the case if the loop were open and the voltage on conductor 248 were relatively negative. The outgoing speech voltages at the secondary of transformer 241 are applied over conductor 286, and also over conductor 287 and thence through resistors 285 and 288 and respective rectifiers 276 and 277 in opposite phase to the amplifier 112A which transforms from a push-pull input to a single ended input. Thus the seized 8 kc. pulses will be delivered at the output of amplifier 112A with speech modulations. The audio frequency modulations are clipped by rectifiers 276, 277 and the speech amplitude-modulated 8 kc. pulses in the seized time channel pass in push-pull to amplifier 112A, and thence single ended to calling-to-called PAM amplifier 112. When the calling subscriber dials, the loop continuity is interrupted and for each break there is a lowering of the envelope of the 8 kc. pulses at the conductors 288, 289. Thus, the 8 kc. seized time channel pulses have dialling modulations thereon. This constitutes the outgoing calling and dialling code.

When the gate comprised of rectifiers 266, 267 was opened, the 8 kc. seized time-position pulses were also applied over conductor 271, condenser 290, to the rectifier 291. These pulses are summated with those coming in at the PAM-in lead at circuit point 293. Only the seized train of 8 kc. pulses from the called party out of the possible 12 trains, which may be applied at the incoming calling gates will get through to the line circuit, since these seized pulses coincide in time with the pulses coming from the PAM-in lead. The amplitude-modulated pulses get through rectifier 294 by way of conductor 293. Peak rider 294 is normally biased positively to prevent non-coincidence pulses at 293 from entering. The resistance 296 associated with condenser 298 is sufficiently high in value so that when the pulse is not driving, the network formed by condenser 298, resistances 296, discharges slowly so long as rectifier 294 is effectively open-circuited. This peak riding action will increase the duty cycle of the pulses into the twin amplifier tube 299 and hence the power output thereof will increase. The elements 294—299 and filter condenser from the plate of the last section of 299 to ground thus constitute a demodulator-amplifier for the modulated 8 kc. pulses which are transmitted from the called station through the called-to-calling amplifier 118.

The output of amplifier 299 is coupled through condenser 300 to the ingoing winding 301 of the speech transformer 241 and thence over the calling subscriber's loop. This winding has a balancing network constituted of condensers 302, 303, 304 and resistance 305 connected as a Wheatstone bridge which matches the subscriber's line impedance and acts similarly to the usual hybrid coil. When the calling subscriber hangs up, there is a sudden drop in the current going through the windings 240, 246 and the voltage on circuit point 240 drops, and likewise the pulses going out to the outgoing calling gate rectifier 277 drop out. This will operate the release circuit as will be described hereinbelow in connection with Fig. 10 which will act to stop the flow of pulses through the rectifiers 266, 267. The line circuit is thereupon restored and available for another call.

The above description explained the operation of the line circuit when a call originates thereon. When a call is being received by the line circuit as a called line, for example line #95, the register senders 101, 102, which had been seized by the associated calling line, causes the sending of the appropriate pair of coincident pulses characteristic of the called line number, to the "In" tens wire (called) and to the "In" units wires (called) see Fig. 2. If for example, the called station is #95, these coincident pulses will be applied to conductors 306, 307, (see Fig. 2B). These pulses are applied to a coincidence gate formed of rectifiers 308, 309, whose output is applied over conductor 310, condenser 311, resistors 312, 313, 314, and rectifier 315, to the control grid 316 of the gas tube or Thyratron 235. This biases the said control grid sufficiently positive to cause tube 235 to fire and allows ringing current from conductor 236 to pass through tube 235, rectifier 320, and to the tip side of the called subscriber's loop. This ringing voltage will cause the called subscriber's bell equipment 319 to respond, since it is connected at the subset, from the tip side of the loop to ground via a gas tube at the subset. When the called subscriber answers, the voltage on the tip side will swing negatively. This tip side is connected to the return circuit of control grid 316 via a resistor connected to the junction of 326 and 312. The control grid 316 is caused to swing negatively under answer conditions, thus 235 ceases to conduct and stops the ringing. As is well known in grid-control gas tubes alternating voltage on the plate will permit the grid to regain control every cycle. Rectifier 320 prevents the cathode of tube 235 from swinging negatively, which if it did, would cancel the negative swing on the grid 316 of the same tube.

When gas tube 235 is conducting because of ringing, a portion of its output on the cathode is fed to rectifier 321 through filter resistor 322 and its associated shunt filter condenser. This produces a positive bias which is applied to the rectifier 260 to prevent start pulses from entering conductors 254, 255, during a called condition. The pulses from the gate constituted of rectifiers 308, 309, are also applied through condenser 327 to crystal rectifier 328 which is a decoupler and operates in a manner similar to crystal 273 as above described. Supervisory voltages are applied in a push-pull manner from the tip conductor over conductor 329, resistors 330, 331, resistor 333, rectifier 334, to one side of the balanced input to amplifier 118A. The ring side of the line is connected by conductor 281, resistors 282, 283, resistor 336 and rectifier 337, to the other side of the balance input to amplifier 118A. Resistors 330, 331 and 282 and 283, and the associated bridge condensers 281A, 282A, partly filter dialing impulses to prevent complete release of the connection due to interruption between dial impulses and maintain supervision of the connection. Voice frequency voltages are applied from the bridge network to resistors 336, 333. Pulses from rectifier 328 summate with the voice voltages applied at the inputs of rectifiers 334 and 337. The latter rectifiers clip the resultive summated voltages and allow the PAM pulses to go through amplifier 118A.

Pulses from the rectifiers 308, 309 are also applied to condenser 338, rectifier 339 and a resistor. The result is summated with the PAM pulses from the calling party coming in on the called PAM-in conductor. A coincidence for summation occurs only with the PAM pulses coming from the calling party because they are in the same time positions. The result of the summation is applied over conductor 293, and can then override the bias of rectifier 294 and thence go through the demodulator amplifier combination 294—299 as above described. The release by the called subscriber will cause the voltage on the ring side of his loop, to go relatively negative, thus lowering the amplitude of the pulses at the input of the biassed crystal rectifier 337 which prevents pulses from going out over the called gate to amplifier 118A. This will start the function of the release circuit (Fig. 10) to be described hereinbelow, provided that release circuit is wired for called-party release control. It is obvious from the foregoing descriptions therefore, that depending upon whether the line is calling or being called, in the line circuit there will be either the called gates (334, 337) operating or the calling gates (276, 277) operating, but not both. When the line is a calling line, the gate (276, 277) is open. When the line is a called line, the gate (334, 337) is operating. The same applies to the code selection gates. When the line is calling, the gates 266, 267, are opened only. When the line is a called line, only the gates 308, 309 are opened. The voice currents which go out from transformer 241 cannot modulate any pulses which find their way back to the same transformer on its incoming side, thus the subscriber's side tone is that which is provided by his subset only. No additional side tone is introduced by the central office.

The pulses going through the coincidence gate 308, 309, and the coincidence gate 266, 267, and through gate 334, 337, and through gate 276, 277, can be about 2 μs. duration, while the gate 262, 263, will handle only 1 μs. pulses. Back ring is provided by capacitive coupling through rectifiers 245, 242 and thence coupling through transformer 241, and to PAM called outgoing modulator, to 118A, and to 118. Some of the rectifiers such as 242, 245, can be of the selenium kind, but in general all the remaining rectifiers schematically illustrated in Fig. 6 are of the Germanium crystal kind.

The pulse finder

The main function of the pulse finder, referred to hereinabove, is to seize and lock to an 8 kc. series of pulses which together with many other such series may be present on its input side. The pulse finder will seize the first of such series of pulses which happens to enter it. In certain cases such as 105a (Figs. 1 and 2C), a single pulse finder (shown in detail in Fig. 7) is required; in other cases a series of pulse finders connected in a chain circuit (Fig. 8) are required, so that when a pulse finder in the chain is finished using a pulse series, it will release it and make it available for seizure by any other pulse finder in the chain circuit.

The detailed wiring of one of the pulse finders is shown in Fig. 7. Referring to Fig. 7, the input conductor 343 represents the input to the pulse finder, and is applied to a coincidence gate 344. This gate comprises two coincidence crystal rectifiers 345, 346, and an additional rectifier 347 which does not conduct unless both rectifiers 345 and 346 receive time coincident 8 kc. pulses. When such coincident 8 kc. pulses are applied to the gate 344, gate 344 will operate and allow a pulse to go through it. When gate 344 passes a pulse, it constitutes seizure by the pulse finder. The opening of gate 344 is controlled by the action of the start circuit which supplies a pulse to rectifier 346 while another pulse is supplied to rectifier 345. The start circuit is controlled by a rectifier gate 790, comprising rectifier 791 which is normally biased against conduction until both the associated rectifiers 792 and 793 are coincidently conductive. The rectifier 793 receives a 7.3 kc. 1 μs. pulse from the timing generator, and the rectifier 792 receives the input pulses from conductor 343 after passage through the pulse inverter tube 784 and amplifier tube 785. Thus, a given 8 kc. series of pulses on the conductor 786 will beat with the 7.3 kc. pulses and will produce coincidences in the gate 790 at the rate of 0.7 kc. During these coincidences there will be an output positive pulse delivered by gate 790 to the control grid of tube 795. The output of tube 795 drives the pulse inverting tube 365 whose positive output feeds the rectifier 346 of gate 344. Therefore, gate 344 will operate and will allow a pulse to go through it. The seized 8 kc. train passed by gate 344 is also applied to the control grid of tube 796 whose output is applied to tube 784 for quick suppression of the seized 8 kc. train.

The pulse which is passed by gate 344, is applied to a delay circuit of any well-known type, such for example as a pentagrid tube 348 which is connected in circuit to act as a phantastron which operates in a known and standard manner to produce a predetermined delay between its input pulses and its output pulses. For a detailed description of the operation of such a phantastron, reference may be had to "Principles of Radar" by the members of the staff of the radar school, Massachusetts Institute of Technology, Second Edition, chapter II, article 16. The cathode 349 of phantastron 348 has on it a negative pulse whose leading edge coincides with the pulse delivered by gate 344 and whose trailing edge has the required delay, in this case 62.5 μs. This trailing edge is differentiated by the network consisting of a condenser 350 and resistor 351. The negative pulses of the chain are suppressed by the rectifier 352. The positive-going differentiated pulse from cathode 349 is applied to the #3 grid of a second phantastron delay tube 353 which in the known manner produces an additional delay of 62.5 μs. The output of tube 353 at the cathode thereof also connects to a differentiating network comprising the condenser 354 and resistor 355 and a negative pulse suppressing rectifier 356. The two phantastrons 348 and 353 therefore produce a total delay of 125 μs., so that the pulse which is fed to the control grid of the pulse amplifier tube 357 is delayed by that amount with respect to the pulse delivered by gate 344 to tube 348. The output of amplifier 357 is coupled to a pulse inverting tube 358. The plate or output circuit of tube 358 is connected to an additional coincidence gate 359 comprising coincidence crystal rectifiers 360, 361, and rectifier 362. The pulse at the plate or output anode of tube 358 is integrated so that it has a duration of about 5 μs., and this 5 μs. pulse is applied to the rectifier 360 as one of the inputs of the gate 359. The other input of this gate to rectifier 361 is supplied with 96 kc. 1 μs. pulses over conductor 363 from the timing generator 103. The gate 359 therefore serves as a pulse regenerator, and establishes accuracy in timing. The gate 359 is responsive only during the coincidence of a portion of the 5 μs. pulse from tube 358 with the 1 μs. pulse from the timing generator. The output of gate 359 must be exact both in duration and in timing, even if the timing through the phantastrons 348, 353, is inaccurate by five parts in one-hundred and twenty-five, or four percent. The output of gate 359 passes through rectifier 362 to pulse amplifier tube 364, whose output is then coupled to the pulse inverting tube 365. This latter tube also feeds the rectifier 346 of the gate 344. Since the pulse from gate 359 and from tube 365 has a delay of 125 μs. with respect to the pulse which drove the phantastron 348, the delayed pulse will be just in time to coincide with the next pulse into gate 344, in the seized 8 kc. train of pulses. The next coincidence will cause a further pulse to be passed by gate 344 to the phantastrons, thus repeating the cycle of operations. The seized pulse series will be present at the output of gate 344, which is connected by way of conductor 366 to the control grid of cathode follower tube 367 whose output circuit at the cathode load resistor 368 is connected to the 8 kc. utilization output conductor 369.

Part of the seized 8 kc. output is applied to the start pulse suppressor, which comprises a rectifier 797 and filter 798 to apply a negative voltage to the suppressor grid of tube 795 and also to conductor 760 which is one of the trunk hunting control conductors as will be described hereinbelow in connection with Figs. 8, 11 and 13. This negative voltage on the suppressor grid of tube 795 cuts that tube off and thus prevents other start pulses being delivered to tube 365 after the pulse finders has seized an 8 kc. train of positive pulses. The rectifier 797 and filter 798 are designed to operate as quickly as possible to prevent the seizure by the pulse finder of more than one time position of 8 kc. pulses during a call.

As will be explained hereinbelow in connection with Fig. 8, for certain purposes it may be necessary to have a series of pulse finders connected in chain circuit. In that event, each pulse finder is provided with an additional tube 782 which operates to prevent the seized train of pulses from being fed to the next pulse finder in the chain. Thus, a portion of the above-described positive pulse output of tube 365 is applied over conductor 781 to the control grid of pulse inverting tube 782, whose negative output is applied to the suppressor grid of tube 784. Thus, tube 782 prevents the seized 8 kc. train from being passed on to the next pulse finder in the chain, as will be described hereinbelow in connection with Fig. 8. Thus, it will be seen that the start suppressor prevents the start circuit from delivery start pulses once the action is started. The start circuit delivers the start pulses at a slow rate to prevent double seizure. Likewise, the start circuit action is suppressed to prevent seizure of more than one 8 kc. pulse train.

It will be understood, of course, that the pulse finder circuit shown in Fig. 7 may use any other type of delay line in place of the series-connected phantastrons. Two phantastrons are used instead of one, because the conventional phantastron circuit takes considerable time to restore to normal after the time that it has given its accurate delay. If phantastron 348 were called upon to start its delay operation immediately after it has delivered a pulse to the differentiating network 350, 351, it would not operate accurately, because it requires considerable time to restore. By employing two such phantastrons, not only is the restore time reduced, but while one phantastron is operating, the other can be restored fully before the time of the next operation.

The application of the pulses to the input conductor 343 of the pulse finder is under control of the timing generator pulse suppressor 371, when the pulse finder is located in the register-sender. A separate pulse finder 105a is used in the start lead circuit after the line circuit start lead pulse suppressor. Other similar pulse finders are used for P. B. X and toll trunks, as will be described hereinbelow in connection with Figs. 8, 11 and 13.

The register sender

The register sender has been referred to generally hereinabove in connection with the schematic block diagram of Figs. 1 and 2. In order that the functioning of the register sender may be clearly understood, it will be described first in connection with the simplified block diagram of Fig. 4, taken in conjunction with Fig. 2. That will be followed by a detailed description of the register sender in connection with Fig. 5.

Referring to Fig. 4, the pulse finder 370 which was described in connection with Fig. 7, receives pulses at a maximum rate of 96 kc. from the timing generator 103 (Fig. 2D) through the timing generator pulse suppressor 371 (Fig. 2C) which will be described in detail hereinbelow. As explained above, out of that series, the pulse finder will seize and lock to an 8 kc. series of pulses, and that particular series cannot be seized by any other pulse finder in the other register senders. This latter action is controlled by a pulse finder chain circuit which will be described hereinbelow in connection with Fig. 8 and Fig. 8A. The seized 8 kc. output of the pulse finder on its utilization conductor 369 (Fig. 7) goes to the input of the line circuits start pulse suppressor 372 which will be described hereinbelow in connection with Fig. 14. These pulses on utilization conductor 369 also go to a gate 373. This gate will permit pulses from the calling-to-called gates amplifier 112 (Figs. 2 and 6) to go on to the output of the gate if they have the same timing as the 8 kc. series of pulses seized by the pulse finder, which insures that the register sender will operate on those pulses from the line circuits which were seized originally by its pulse finder 370. The output of gate 373 feeds the dial tone circuit 374, which is connected to dial tone audio-frequency supply conductor 375, and circuit 374 sends out dial tone-modulated 8 kc. pulses on conductor 111 and of the same timing as pulses from the output of gate 373. The gating output is also connected to the dialling pulse circuit 377 whose chief function is to be responsive to the dialling impulses controlled by the calling subscriber, so as correspondingly to set up the register 378 to which the dialling circuit is connected. After the first digit is dialled, the dialling circuit sends a voltage back to the dial tone circuit 374 to cut off the dial tone pulses.

The 10-position register 378 is then set up to correspond with the number in the dialled digit. If the first digit is a five, the register will automatically restore after that digit is gated out through the appropriate one of the gates 379 to the hundreds bus 168, and that gate is opened after the dialling of the first or hundreds digit. If the call is a toll call, the first digit dialled is not a five, the hundreds gate is opened and the appropriate pulse is sent out to the storage circuit 163 (Fig. 2A), thereupon the entire register sender is restored by the release circuit 124 to be described hereinbelow. This release circuit sends a pulse to the pulse stretcher 381 which interrupts a pulse train to the timing generator pulse suppressor 371 (Fig. 2) which thereupon suppresses the 8 kc. pulse series from being seized by any pulse finder since it is now engaged by the calling subscriber in a toll call. If the first digit dialled is a five, the register will be restored, but the register sender as a whole will not be restored and no pulse will be sent to the pulse stretcher 381. This operation is effected jointly by the dialling and release circuits.

After the dialling of the second digit, the tens gate of the gates 379 is opened and a pulse is sent out on the tens bus 166 to the tens storage circuit (Fig. 2) with a dialling in the 10.416 $\mu$s. time interval which corresponds to the number dialled for the second digit (see Fig. 1B). The register is thereupon restored and the dialling circuit is ready for the last or units digit. When the units digit is dialled, the register is set up the same as for the hundreds and tens digits. However, in this case, the units gate of 379 is opened and a pulse of the appropriate timing is sent out on the units bus 167 to storage. Then the register and the entire register sender are restored by the release circuit 124 which sends a pulse to the pulse stretcher 381 for interrupting the train of pulses to the timing generator pulse suppressor 371, to start the suppression action on the seized pulse series. The timing generator pulse suppressor is of such circuit design that only one pulse from the pulse stretcher 381 is required to start the suppression action which is thereafter maintained through the calling-to-called gates amplifier 112 whose output also connects to the timing generator pulse suppressor. Once a pulse series is suppressed, the pulse finders have no access to that series and hence will search out or seize a pulse series that is not suppressed, and which is available for other calls.

The register sender then executes the busy test to determine whether the called line is being called by some other calling line, or whether the called line is itself engaged in calling to some other line. This busy test circuit will be described in detail in connection with Fig. 5. Each of the tens and units positions of the register 378 is connected to the busy test circuit 384. When the calling or called tens and units busses have pulses which correspond to active positions in the register, the busy tone circuit 386 will send out busy tone-modulated pulses over conductor 387 having the same timing as that of the seized 8 kc. pulses. These busy tone-modulated pulses feed to the 9.37 $\mu$s. delay line 388 (Fig. 2) and thence to the called-to-calling gates amplifier 118. When a busy test condition is established in the register sender, the busy test circuit 384 prevents the gating out of a pulse to the units bus, thus preventing the call from reaching the called line. The busy test circuit 384 also prevents, during a busy condition, the release circuit 124 from releasing the register sender. The register sender is held by the calling subscriber during the busy test condition. When the calling subscriber releases, the pulses from the calling gates, in turn, cause the register sender to restore. Since the suppression action by the seized train of pulses on the start lead suppressor is terminated, this same train of pulses is thus made available for any other subscriber who wishes to make a call.

*Detailed description of register sender*

Figs. 5A through 5H when assembled as shown in Fig. 5I show in detail one of the register senders. When the pulse finder 370 seizes an 8 kc. time-position series of pulses as described, that series is applied to the utilization conductor 369 (see Figs. 2 and 7). These pulses are also applied through the condenser 388, to the suppressor grid 389 of a pentode amplifier tube 390. Tube 390 also will have impressed on its control grid 391, pulses through the 115.63 μs. delay line, and from the calling-to-called gate amplifier 112, when seizure and storage has taken place, and these pulses will be amplified by tube 390 and passed on to twin-triode tube 392, but only if the pulses on grids 389 and 391 are in time coincidence. It will be noted that throughout Figs. 5A–5H, a considerable number of triodes are schematically shown. In many cases, two triodes can be embodied in a single evacuated envelope to constitute what is known in the art as a twin triode tube although obviously separate triode tubes may be employed.

Thus the pulses with the timing of the 8 kc. series seized by pulse finder 370 are accepted by the register sender after having gone through the line circuit (Fig. 6) in which the train of pulses, with this particular timing, was seized. As explained above, in connection with Fig. 6, the pulses coming from amplifier 112 and reaching grid 391 will have dialling impulse modulations in the form of PAM or pulse-amplitude modulations. The pulses will go from a maximum to minimum value when the dial at the calling subscriber's station interrupts the continuity of his loop circuit. The minimum value of the pulses will not be zero but will be of sufficient amplitude to maintain holding functions for certain circuits as will be described. The tube 392 acts to invert the amplified pulses impressed on its control grid from the output of tube 391.

The output of tube 392 feeds over conductor 393, a number of circuits of which the dial pulse circuit 377 is one. Circuit 377 includes an input tube 394 for inverting the phase of the pulses from conductor 393. The output of tube 394 goes through a rectifier combination consisting of a "forward" crystal rectifier 395, and a "clamping" crystal rectifier 396, and then through a low-pass filter 397 whose filter action is such that the 8 kc. PAM pulses are filtered and smoothed, but the modulation in the form of dial impulses will be passed on.

The function of clamping diodes is well-known in the art and for a detailed explanation, reference may be had to the above-noted book entitled "Principles of Radar," chapter II, article 10. Preferably, the filter 397 should cut off frequencies above approximately 500 cycles per second. The dial impulses then pass through a differentiating network consisting of condenser 398 and resistor 399 to differentiate the dial impulses leaving the filter. The term "differentiating" is used herein in its well-known significance in the art to mean the production of sharply peaked pulses from relatively rectangular waves or other wave forms having sudden jumps in them as explained in "Principles of Radar," chapter II, article 7. Thus the differentiating network produces a pair of sharp pulses corresponding to the leading and trailing edges of the square-topped impulses from the filter. Condenser 400 has a low impedance to ground and does not affect the differentiation. The differentiating action is such that when the dialling impulse is in the process of changing from its maximum negative value to ground, a positive differentiation pulse is delivered to the control grid of tube 401. The negative differentiation pulses are absorbed by a crystal rectifier 402 connected between the control grid 403 and ground. The output of the filter also goes to a resistor 404, condenser 405, and another resistor 406, which connects to the grounded grid return of 399. This latter combination of resistors and condensers acts as a further filter to smooth out the dial impulses, and to cut off frequencies of one cycle per second or higher. When the pulses are applied through the filter before any dialling takes place, the control grid 403 is raised positively to the point where the tube 401 is rendered plate current conductive; otherwise tube 401 would normally be at plate current cutoff. The last-described filter for the one cycle per second frequency prevents a preliminary impulse during the 8 kc. seizure, from being transmitted by tube 401, since the resistance-capacity filter takes a certain length of time to charge up, and it is before the network is fully charged and before tube 401 becomes conductive that the impulses, preliminary to said seizure, occurs.

As a result of the dialling operation by the calling subscriber, there will be pulses passed by tube 401, one pulse for each dialling impulse. The pulse output of tube 401 is fed to tube 407 for pulse inversion, and tube 407 drives the cathode follower tube 408, whose cathode load resistor 409 has corresponding pulses developed therein for driving the register 378 over conductor 410. The output of tube 408 also feeds tube 411, whose output drives a filter comprising condenser 414 and resistor 415 and 2 rectifiers which cuts off frequencies higher than about one cycle per second. This filter will smooth out all the dialling impulses representing a digit, and will convert such series of dialling impulses into one negative rectangular pulse. The output of the filter is fed to tubes 416 and 418 and is differentiated by the network consisting of the condenser on the output of tube 418 and resistance to ground, and the differentiated pulses alone are fed to the control grid of tube 419. The negative differentiated pulses are absorbed by the crystal diode rectifier 420 which is connected to ground.

Thus at the end of each train of dialling impulses in a digit, the negative rectangular pulse formed by the filter 414—415, will go from its maximum negative value to ground. This causes a positive differentiated pulse to be applied to the control grid of tube 419. Tube 419 has its plate or anode coupled by condenser 421 to the control grid of another tube 422 which has it plate or anode likewise coupled through condenser 423 to the control grid of tube 419. The cathodes of tubes 419 and 422 are returned to ground through a common load resistor 424. By applying suitable bias potentials to the anodes and grids of these tubes 419 and 422, they operate in the well-known manner as a single stability flip-flop quantizer or multi-vibrator for producing on output rectangular pulse of predetermined duration. For a detailed description of such a device, reference may be had to "Principles of Radar," chapter II, article 13.

The output of the multivibrator drives a cathode follower tube 425 which has its cathode load resistor 426 connected over conductor 427 to drive the digit control or change-over circuit which comprises four grid-controlled gas tubes or Thyratrons 428—431 and associated circuits. Tube 428 is normally biased so as to be plate current conductive for the start condition, while for that condition tubes 429–431 are not conducting. Assuming tube 428 to be conducting, then if a series of dialling impulses representing the first digit are started, upon the ending of the series, a pulse will be sent by tube 425 over conductor 427 and through respective condensers 432-434 to the control grids of the respective tubes 429–431. Since tube 428 is conducting, its cathode will be at a positive potential. This positive potential is applied through a voltage divider comprising series resistors 435 and 436, and thence through resistor 437 to the control grid of tube 429, which positive voltage however is not enough to cause tube 429 to become conductive. However, the coincidence of the latter positive voltage on the grid of tube 429 and the positive voltage applied to that grid under control of tube 425, will cause tube 429 to fire and conduct. Tubes 430 and 431 also receive the positive pulse on their grids from conductor 427, but they have no positive bias from the cathode of tube 428; hence tubes 430 and 431 will not fire. When tube 429 fires, as above described, a positive pulse is sent to the cathodes of tubes 428 and 430. This latter pulse will extinguish tube 428 so far as conductivity is concerned, and nothing will happen to tube 430. Tube 429 now being conductive, will by means of voltage divider resistors 438, 439 and coupling resistor 440, bias positively the control grid of tube 430, and tube 430 will become conductive when the next pulse is delivered over conductor 427. Similarly, when tube 430 becomes conductive, it biases positively the control grid of tube 431 by means of voltage divider resistors 441, 442 and coupling resistor 443. A further pulse will fire tube 431 and extinguish tube 430. The cathode of tube 431 like the cathodes of the preceding tubes in this set is returned to ground through its respective voltage divider resistors 444, 444a. Therefore, tube 428 is conductive only for start; tube 429 is conductive only after the first digit is dialled; tube 430 is conductive only after the second digit is dialled; and tube 431 is conductive only after the third digit is dialled. The purpose of these tubes is to control certain switching functions which are required after each digit. These functions will be described in detail subsequently herein.

As will appear from the foregoing, the output of tube 408 will be a pulse for each distinct dialling impulse in a digit. Thus, if a five is dialled, there will be five pulses delivered to conductor 410 which feeds the register. This register consists of a set of eleven grid-controlled gas tubes or Thyratrons 445–455 and associated circuits. These tubes operate in a manner similar to that already described for tubes 428–431 except that in the register there are eleven such tubes responsive to a maximum of ten distinct pulses from tube 408. The first tube 445 of this series is the start tube and the remaining ten tubes 446–455 are responsive to the respective number of dialled impulses. It will be observed that each of the tubes has a cathode load resistor connected between its cathode and ground. In the case of tube 445, this resistor 456 is a single resistor and is coupled to the control grid of tube 446 by coupling resistor 457. On the other hand, the cathodes of the digital tubes 446–455 have their cathodes connected to ground through voltage divider resistors such as resistors 458, 459, and through coupling resistor 460 to the control grid of the next suceeding digital tube. Assuming that the call is a local call then the first digit dialled is a five, and five pulses from tube 408 will cause tube 445 to extinguish while the next tube in line, namely tube 446 fires, and in turn tube 446 will extinguish while a next tube 447 fires and so on until tube 450 fires at the end of the fifth dialling impulse. Tube 450 will therefore remain conductive until it is extinguished by other circuits to be described. It will be understood of course, that the tube 445 being the start tube, is normally biased to conduct as was described above in connection with tube 428.

Returning now to tube 425, when a digit has been dialled, a pulse will be delivered by that tube to tubes 429, 430, 431. If the first digit is dialled, tube 428 will extinguish and tube 429 will conduct. The pulse from tube 425 over conductor 427 is also fed to the suppressor grid 461 of a pentode amplifier tube 462. The control grid of tube 462 is supplied with pulses from tube 392 over conductor 393 as above described. Tube 462 is normally biased to plate current cutoff, but the receipt of a positive pulse over conductor 427 will cause tube 462 to pass pulses that may be present on its control grid. Therefore, when the first digit is dialled, tube 429 will fire, tube 428 will extinguish, and tube 462 will pass on the 8 kc. pulses from tube 392. The output of tube 462 is fed to the control grid of a pentode pulse inverter tube 463, and tube 463 will deliver at its output positive going pulses to the phantastron delay tube 464. This tube may be similar to phantastron tube 348 described above in connection with Fig. 7 so as to produce 1000 μs. delay between the input pulses applied to its #3 grid from the output of tube 463 as compared with its output pulses taken off its cathode load resistor 465. The pulses applied to the #3 grid of tube 464 are preferably applied through a 1 μs. delay network or line 466. The cathode of phantastron 464 is also coupled through a condenser 467 back to the suppressor grid 468 of tube 463, the purpose of which is to prevent other pulses entering the phantastron 464 while it is working to produce the required delay. The 1 μs. delay insures that when the phantastron starts to delay it does not suppress the pulse which started the delay.

The output pulse at the cathode resistor 465 is an approximate negative-going square wave whose trailing edge has the necessary delay. This edge is differentiated in the network comprising condenser 469 and resistor 470 to pass on the positive differentiated pulse to the control grid of pentode tube 471. The negative differentiated pulse is absorbed by the crystal rectifier 472. The positive pulse applied to the control grid of tube 471 is widened to about 25 μs. by integration. Tube 471 acts as a gating tube and its suppressor grid 473 receives the 8 kc. seized pulses of 1 μs. duration from conductor 393 through condenser 474. The gated output of tube 471 feeds a pulse inverter tube 475 which in turn feeds a cathode follower tube 476. This insures accurate timing of the pulse into tube 475 and into the 10.416 μs. delay line 477, even if the phantastron 464 should have a rough tolerance of delay of 25 parts in 250 or 10%. The output of tube 476 is connected over conductor 478 to the input terminal 479 of the delay line 477 which has ten taps successively spaced by 1.0416 μs. and numbered respectively 479–488. Taps 479–488 will receive the 1 μs. pulse from tube 476 insuccession. For example, at (4×1.0416) μs. after the pulse leaves tube 476, it will arrive at tap 483. Each one of the ten taps on the delay line 477 is connected through a respective condenser line 490–499, to the control grid of a respective cathode follower tube 500–509. When any one of these cathode follower tubes receives a pulse from its corresponding delay line tap, its cathode will rise in positive voltage by reason of the corresponding drop through its respective cathode load resistor 510–519.

The cathode of each of the tubes 500–509 is connected in circuit with a corresponding coincidence gate 520–529. Each of these gates may consist of a pair of crystal rectifiers having a common load resistor such as the resistors 530–539 and an additional crystal rectifier 540–549 which does not conduct until both of the associated rectifiers of the gate are simultaneously conductive. One electrode of each of the rectifiers 540–549 is coupled to the associated bias resistors 530–539 and to respective condenser and resistor coupling combinations 550–559. The other electrodes of the rectifiers 540–549 are connected in common to the conductor 560 for purposes to be described.

If, as assumed above, the hundreds digit #5 has been dialled, the gas tube 450 in the register is passing current, and as the pulse passes tap 483 on the delay line, the coincidence gate 524 will pass a pulse to conductor 560 which is connected to the control grid of a pulse amplifier tube 561 whose output is coupled to the pulse inverting tube 562. The timing of the pulse at the output of tube 562 would correspond to the #5 digit, although the timing frame is displaced 4×125 μs. frames away because of the 1000 μs. delay in the phantastron 464. This however makes no difference. The output pulse from tube 562 is connected in parallel to the respective control grids of three gating tubes 563, 564, 565. If this pulse is due to the pulse from tube 425 as above described, and representing the first digit to be dialed, then tube 429 will be in the fired condition and the positive voltage on the cathode of tube 429 is applied over conductor 566 to the suppressor grid of tube 563. Since coincident positive pulses are now applied to the control grid and to the suppressor grid of tube 563, this tube becomes plate current conductive. It will be understood, of course, that the tubes 563, 564 and 565 are normally biased to plate current cut-off and they require coincident positive pulses on their respective control grids and suppressor grids to render them plate current conductive. Neither tube 564 nor tube 565 at this time is conductive, since no positive pulse appears on the corresponding conductors 567 or 568.

The pulse output of tube 563 is amplified in the successive pulse amplifiers 569, 570, to produce a corresponding positive pulse on the input conductor 163 to the corresponding hundreds digit storage circuit (see Figs. 2 and 9). As the above-described first digital pulse travels down the delay line 477, no other coincidence gates subsequent to gate 524 will be opened, since as above described, only one gas tube in the register can conduct at any one time. Pulses cannot travel down the delay line from terminal 479 to terminal 488 while the register gas tubes are stepping, because tube 462 acts as a closed gate, and opens only when the stepping action in the register ceases and when the last register tube to be fired, stays on.

The pulse goes through the delay line, and finally reaches the last tap 488, whence it is applied over conductor 571 to the control grid of a pulse amplifier tube 572. The output of tube 572 is connected to a multivibrator or single stability flip-flop circuit consisting of tubes 573, 574, connected in the conventional manner to produce an output square wave of longer duration than the pulse which drives it and timed with the negative impulse from the tube 572. These two tubes 573 and 574 function in a manner similar to tubes 419 and 422 described above. The pulse output of tube 574 is applied to the control grid of a pentode amplifier tube 575 of the cathode follower type whose cathode load resistor 576 is coupled through condenser 577 and rectifier 578 to the primary winding 579 of a pulse transformer. The secondary winding 580 of this transformer is connected in circuit from the positive anode D. C. potential supply tap 581 which supplies the anode potential over conductor 582 to the anodes of the gaseous register tubes 446–455. Thus when tube 575 receives a positive pulse on its control grid, the secondary winding 580 will give a negative-going pulse in the reverse direction to the positive plate voltage from terminal 581, thus momentarily lowering the plate voltage on tubes 446–455. Any tube that was previously in the conductive condition in the register, will thereby become extinguished. The output pulse from tube 572 is also connected over conductor 583 and thence through condenser 584, rectifier 585, condenser 586, to the plate or anode of tube 445.

The positive pulse from the output of tube 574 is applied over conductor 588, through condenser 589 and resistor 590, to the control grid of tube 445, to render tube 445 conductive when the register has been cleared by the pulse over conductor 582, as described above. Thus the register is placed in start condition to receive the next digit.

The action for the second dialed digit is similar to that for the first dialed digit, except that on the second dialed digit, tube 430 is in the conductive condition instead of tube 439. As a result, tube 430 applies a positive bias over conductor 567 to the suppressor grid of tube 564. If it is assumed that the tens digit is, for example, 7, gas register tube 452 will be conductive, and when the pulse reaches tap 485 of the delay line, the coincident gate 526 will be opened and will apply a pulse over conductor 560 to the control grid of tube 564. The gated pulse passing through tube 564 is amplified in corresponding tubes 591, 592, to the corresponding input conductor 166 of the tens storage circuit (see Figs. 2 and 9). Thereafter the register is restored by a negative pulse over conductor 582 as above described, and the start tube 485 is again rendered conductive as described above.

For the third and last digit, tube 431 is conductive, and applies a positive bias over conductor 568 to the suppressor grid of gating tube 565. If the units digit, for example is 0, register tube 455 will be conductive, and when the pulse is applied to tap 488 of the delay line, gate 529 is opened and applies a positive pulse over conductor 560 to the control grid of tube 565. This pulse is amplified in subsequent amplifier tubes 593, 594, and is applied to the corresponding conductor 167 which connects to the units storage circuit (see Figs. 2 and 9). Thereupon the register is again cleared by the negative pulse over conductor 582, and start tube 485 is again rendered conductive. After the dialing of the units or third digit, there is a pulse which goes from the end of the delay line 477 over conductor 595, to the control grid of a gating tube 596 of the pentode type. This tube is normally biassed so as to be plate current non-conductive until its suppressor grid swings positively. At the time when the "units" gate tube 565 is ready to pass pulses, tube 596 is also ready because its suppressor grid is connected by way of conductor 568 to the suppressor grid of tube 565, and both these suppressor grids are connected by conductor 568 to the cathode circuit of units controlling gas tube 431. Consequently, when a pulse arrives at the control grid of tube 596, it will pass a negative pulse from its anode through condenser 597, to the control grid of amplifier tube 598. Tube 598 drives a multivibrator or single stability flip-flop circuit comprised of tubes 599 and 600 to stretch the pulse making it suitable for release. This flip-flop circuit delivers through the condenser 601 a positive stretched pulse to the control grid of cathode follower tube 602 whose cathode load resistor 603 is coupled to the primary winding 604 of a pulse transformer through rectifier 605. Thus a negative reset pulse is applied from the secondary winding 606 over conductor 607 to the plates or anodes of the gas tubes 429–431, so that any one of these tubes is conductive, will now be rendered non-conductive. At the same time, the pulse from tube 600 is applied over conductor 608 through resistance 609 and condenser 610, to the control grid of start tube 428 which is thereby rendered conductive. Thus the set of tubes 428–431 is placed in condition for the next call.

A negative stretched pulse from the flip-flop 599–600 is applied over conductor 611 to the suppressor grid of a pentode tube 612 which renders that particular tube plate-current non-conductive. It should be observed that tube 612 is normally conductive to the original seized 8 kc. series which was applied to its control grid at the same time that it was applied to the suppressor grid of tube 390. As a result of the cessation of plate-current in tube 612, the said train of 8 kc. pulses is prevented from going on to its plate circuit, and prevented from going through the succeeding amplifier tubes 613, 614, to the timing generator pulse suppressor. This interruption of pulses will cause the timing generator pulse suppressor to suppress the pulses that were seized by the pulse finder 370, thus stopping this particular seized series at the utilization conductor 369. This action will completely stop the train of pulses which were passed by tubes 612–614, even when the above-noted suppression pulse over conductor 611 from flip-flop 599, 600, ceases. The pulse finder 370 is then free to seize a different train of 8 kc. pulses, and to place these on the utilization conductor 369 available for another call.

If the calling subscriber should release before he completes the call, the various gas tubes must be restored. For this purpose the output of tube 394 is connected over conductor 615 to the control grid of pulse amplifier tube 616. The output of tube 616 drives a rectifier-filter circuit comprising the rectifiers 617, 618, resistors 619, 620, 621, and condensers 622, 623, 624. This filter is designed to have an upper frequency cut-off of about one-quarter cycle per second. The filter generates a negative voltage but its return circuit is connected through resistor 625 to a positive terminal 626 on the D. C. supply source. When there are no dial pulses, the output conductor 627 of the filter is at relatively positive potential. This conductor is connected to the control grid of the start gas tube 445 and also to the control grid of the start gas tube 428. Consequently, these start tubes will conduct when there are no pulses on the input of tube 394. The presence of pulses at the output of tube 616 will thus create a negative voltage on conductor 627 to cancel the effect of the above-mentioned relatively positive potential on the control grids of the start tubes 445, 428. In that condition the tubes will not fire except when required by other circuit operations.

The output of tube 392 is also applied over the conductor 393 to the control grid of a pentode pulse amplifier tube 628 whose suppressor grid is maintained at a positive value sufficient to render tube 628 plate current conductive, and thus to pass on pulses to the control grid of a pulse amplifier tube 629. It should be observed that the positive potential for the suppressor grid of tube 628 is derived over conductor 630 from the cathode load resistor 435 of the start tube 428. The output of tube 629 is fed to the control grid of a pentode modulator tube 631 whose suppressor grid is connected through condenser 632 to conductor 375, which in turn is connected to a source of audio frequency dial tone. The pulse amplitude-modulated 8 kc. pulse signal is then amplified in successive amplifier stages 633, 634, the latter amplifier being of the cathode follower type, and having its cathode load resistor 635 connected to the conductor 111 which supplies the outgoing dialing tone to the calling subscriber. Since the positive voltage on the suppressor grid of tube 628 is controlled by the start tube 428, this insures that dial tone will be heard by the calling subscriber before dialing starts. After the first digit is dialed, tube 428 is extinguished, thereby rendering tube 628 non-conductive and cutting off the dial tone.

As described hereinabove, the operation of the sender when controlling a local call, requires that the numeral "5" be dialed as the hundreds digit, and then the tens and units digits of the local call lines are dialed. For other types of calls, special service calls, toll calls, the first of hundreds digit will be some digit other than "5". Accordingly, provision must be made to prevent the restoration of the sender when the first hundreds digit dialed is "5". For this purpose the #5 gate 524 is connected by conductor 636 to the cathods of a blocking tube 637. Consequently when the #5 gate 524 is opened, as a result of dialing the hundreds digit "5", the cathode of tube 637 is biased positively to a sufficient extent, over conductor 636, to maintain tube 637 non-conductive. Therefore at the end of the dialing of the hundreds digit, the pulse on conductor 595 is applied to a coincidence gate 638 consisting of rectifiers 639, 640, 641. While at the end of the hundreds digit a positive pulse is applied over conductor 566 to rectifier 640, and a positive pulse is applied over conductor 595 to rectifier 639, thus rendering rectifier 641 conductive, at this time the tube 637 is at plate current cut-off and the opening of gate 638 has no effect in restoring the sender.

However when any other hundreds digit besides "5" is dialed, the register sender must restore. Since only the #5 gate 524 is connected to the cathode of tube 637, the dialing of any other hundred digit besides "5" will not bias the cathode of tube 637 to cut-off. Consequently, at the end of the dialing of the hundreds digit, the positive pulse on conductor 595 and the positive pulse on the hundreds conductor 566 open the gate 638 and a reset pulse is thereupon applied to the control grid of tube 637. This tube feeds the pulse amplifier tube 598, which in turn controls the application of a negative pulse to conductor 607 to restore the gas tubes 429-431 to non-conductive condition, as was described hereinabove in connection with the resetting at the termination of the units dialing, and also the negative pulse on 611 will restore the register sender as a whole.

If the subscriber releases prematurely, the potential on lead 627 will swing positively as was explained above. This will cause tubes 428, 445, to conduct if they are non-conducting. In doing this, a negative pulse of large amplitude will be generated on the plate by the inductance and shunt rectifier connected directly to the plates of tube 428 and tube 425. The negative pulse, in the case of tube 445 over conductor 583, is fed to the flip-flop 573–574 to cause the forced release of any gas tubes in the series 446–455. The rectifier 585 will pass this negative pulse. The shunt rectifier prevents positive voltage build-up. Similarly when tube 428 conducts, a negative pulse is sent over conductor 428A to the junction of the two resistors on the plate circuit of tube 599 to cause the flip-flop 599–600 to start the release of tubes 429–431 and the register sender as a whole.

The busy test

The register sender is arranged to test the desired called line to determine its busy condition. This called line may be busy as a result of having been previously seized by another calling line, or it may be busy as a result of it being itself a calling line engaged in establishing a conversational connection to some other line. The busy test portion of the register sender comprises four sets of coincidence gates 642, 643, 644, 645, each set comprising a series of ten gates corresponding to the digits 1 to 10. Each gate in the set comprises three rectifiers 646, 647 and 648. Similarly, each gate in the set 643 comprises three rectifiers 649, 650, 651. The gates of set 644 comprise rectifiers 652, while the gates of set 645 comprise three rectifiers 653, 654, 655. Each of the corresponding gates in sets 644 and 645 are associated by another rectifier 656 whose function will be described hereinbelow.

Each pair of rectifiers 646, 647, in the set 642 has a common load resistor 657, these load resistors being connected to a common biassing conductor 658 connected to a +15 volt battery terminal 659. Likewise each pair of rectifiers in the set 643, such as rectifiers 649, 650, has a common load resistor 660 which is also connected to the biassing conductor 659. The third rectifier in each gate of the set 642, such as rectifier 648, is coupled through a condenser 661 to its associated rectifiers 646, 647. The corresponding third rectifiers in the set 642 are connected to a common output conductor 662, which in turn connects to a pair of cascaded pulse amplifier tubes 663, 664. In a similar manner, the third rectifier of each gate in the set 643, for example rectifier 649, 650, by a coupling condenser 665. The outputs of all these third rectifiers in the set 643 are connected to a common output conductor 666, which in turn is connected to the cascaded pulse amplifier stages 667, 668. When the coincidence pair, such as 646–647, or 649–650, have voltage applied to them simultianeously a pulse is transmitted through condenser 661 or 665 to the associated rectifier 648 or 651 and a pulse is transmitted to the respective conductor 662 or 666. In other words, the third rectifier of each gate transmits this positive pulse only when both the associated coincidence rectifiers of the gate are simultaneously positively pulsed. The rectifier 646 of each gate in the set 642 is connected by a corresponding conductor 669–678 to the corresponding cathode load resistor in the corresponding gas tube in the register. Consequently, if any such gas tube is conductive as a result of a dialed digit as above described, it biasses the corresponding rectifier, for example rectifier 650 to prepare it for concidence with rectifier 649.

Each of the rectifiers 649 of the set 643, is connected to a corresponding one of the ten buses in the set 116 (see Figs. 2 and 17), leading from the code separating circuit ("units") of the respective called numbers "units" digit storage. Consequently, if a called line is engaged in a called storage position, there will be corresponding identifying pulses on the corresponding buses in the set 116, 117. The corresponding 'units" gate in the set 643 will be opened, and a series of positive pulses all corresponding to the same unit in any time-position will be transmitted over conductor 666. However these pulses will have no result unless the above-described "units" gating voltage is applied to conductor 568 as above described. This voltage is applied to the control grid of a gating tube 706. Tube 706 is normally biased so as to be non-plate-current conductive. However, when it receives the "units" gate control bias from conductor 568, and simultaneously receives the pulses from conductor 666 above described, it becomes plate current conductive, and it applies pulses to amplifier 707 and thence over conductor 708 to the control grid of another gating tube 709. Tube 709 is biased so as to be normally non-plate-current conductive, and requires a positive pulse both on its control grid and on its suppressor grid before it becomes conductive. The positive pulses on the suppressor grid of tube 709 is controlled by the pulses from one of the rectifiers in the set 645, as will now be described. A "tens" pulse is delivered to storage by the register sender after the "tens" digit is dialed. The conductivity of rectifier 656 is controlled by the coincident conductivity of the associated rectifiers 653, 654 in the set 645. Each of the rectifiers 653 in the set 645 is connected to a corresponding one of the buses in the set 117 (see Figs. 2 and 17). On the other hand, each of the rectifiers 654 in the set 645 is connected to a common input conductor 685 which is connected to the cathode load resistor of a pulse amplifier tube 686. Tube 686 has its control grid supplied over conductor 687 with the seized 8 kc. pulses described above and available at the output of tube 392.

Consequently, when the 8 kc. seized pulses are applied to rectifier 654, there will also be a coincident pulse applied to rectifier 653 from the stored called "tens" pulse in the same seized time-position. There will be voltage developed therefore and passes through rectifier 656. Rectifier 655 is normally biassed positively to maintain it open. A voltage is developed across resistor such as 684, and thereupon rectifier 655 becomes conductive and applies positive pulses corresponding to all the "tens" engaged called positions to the pulse amplifier tubes 711, 712 and also to the suppressor grid of tube 709. If the called number code exists in storage, a coincident pulse is also present on the control grid of tube 709 in any timed position that is engaged of the busy "tens" and "units" pulses. When tube 709 becomes conductive, it applies a pulse which is not necessarily in the seized time-position over conductor 691 to the suppressor grid of a gating tube 692. Tube 692 is biased so that it is plate current conductive when the positive pulse from conductor 691 is applied to its suppressor grid and when its control grid is not receiving a negative voltage from tube 693. As will be explained hereinbelow, this latter negative voltage is applied only under certain conditions of P. B. X operation. The pulse from the output of tube 692 is then applied to a single stability flip-flop arrangement or multivibrator comprising tubes 694, 695, connected similarly to tubes 419, 422, as hereinabove described. The square pulse output of tube 695 is applied over conductor 696 to the control grid of gas tube or Thyratron 697, causing it to fire. The cathode load circuit of tube 697 comprises two sections 698, 699, the junction point between these sections being connected to the suppressor grid of a gating tube 700 whose control grid also receives the seized 8 kc. pulses over conductors 701 and 393. The coincident application of an 8 kc. pulse to the control grid, and the application of positive bias to the suppressor grid, renders tube 700 plate current conductive to pass a pulse at the seized 8 kc. rate to pulse amplifier 702. This amplified pulse at the seized 8 kc. rate is then applied to the control grid of modulator tube 703 whose suppressor grid is supplied with audio frequency busy tone over conductor 387. Thus the output of tube 703 is an 8 kc. pulse in the seized time-position, and which is amplitude-modulated by the busy tone and transmitted over conductor 705 to the control grid of tube 633 and thence to the control grid of tube 634 whose cathode load output is connected to conductor 376 leading to the called-to-calling gates amplifier 118. Summarizing the above, whenever the called line, for example line #95, is engaged in the called storage circuit, the tubes 680 and 682 will be conductive to control the sending back of the busy tone to the calling line. The sending out of the called "units" code by the register is stopped as described hereinbelow. Of course, the "tens" code is sent out to cause the gates 645 to operate as described above.

If the called line, for example line #95, is already engaged in a calling storage position on a conversational connection, the above-described busy test is somewhat similar, except in this case the gates of set 642 come into play, instead of the gates in set 643 for the "units." Thus the "units" buses of group 123 are connected respectively each to a rectifier 647 in the set 642, and since the "units" digit of the called line is "5," the corresponding rectifier 646 will be positively biassed by reason of the #5 gas resistor tube being conductive. Therefore a pulse is transmitted over conductor 662 and through the amplifiers 663, 664, to apply a positive pulse to the suppressor grid of gating tube 679. Tube 679 functions similarly to tube 706, and does not become plate current conductive unless it receives the positive bias over conductor 568 as described above. The pulses from tubes 679 are amplified to tube 680 whose output is applied over conductor 681 to the control grid of coincidence gating tube 682. Tube 682 is similar to tube 709 above described, and does not pass plate current unless it receives a positive pulse on its control grid and a coincident positive pulse on its suppressor grid. The application of this last-mentioned pulse is controlled over the conductor to the grid of tube 689 which conductor is connected in common to all the rectifiers such as rectifier 652 of the set 644. Rectifier 652 is normally biassed to be opened. When the appropriate gate in set 645 is opened as a result of the application of the seized 8 kc. signal to rectifier 654, and since the corresponding rectifier 653 is connected to corresponding tens bus in the group 117 which has the called tens pulse stored in the same timing, delivered to storage after the tens digit is dialed, positive bias is applied to rectifier 652 and pulses will pass through amplifiers 652, 689 and 690 to the suppressor grid of tube 682. It should be observed that all the rectifiers 655 are biassed by the positive D. C. potential on the common supply conductor 713 through resistor 714. It will also be observed that the gating rectifiers 653, 654 of each set are normally positively biassed +15 volts through their respective resistors 688 from a supply conductor similar to the biassing of the gating rectifiers 646, 647 and 649, 650 above described.

When tube 682 becomes conductive, it applies the requisite positive pulse to the suppressor grid of tube 692 which controls the conductivity of gas tube 697 as above described and busy tone is returned as described hereinabove. When the gas tube 697 becomes conductive as a result of the busy condition, the conductor 717 has a positive voltage thereon as a result of being connected to the cathode of tube 697. This latter voltage positively biasses the cathode of tube 471, which thereupon ceases to pass plate current and therefore preventing any release of the register sender until the calling subscriber releases. It should be observed that the tube 697 receives its normal anode potential over conductor 718 from the secondary winding 606 of the pulse transformer. As will be described hereinbelow, when the calling subscriber releases, a negative pulse is induced in the secondary 606 which lowers the anode potential of tube 697 to render it non-conductive. At the same time this negative pulse is applied to the anodes of all the remaining gas tubes in the register sender, restoring them to normal. Likewise when the calling subscriber releases, the termination of the pulse train increases the bias positively on the gas starting tubes 428, 445, as above described, thus restoring the whole register sender. The pulse finder will hold on to the same 8 kc. series of pulses, or may seize another series for another call. If a calling subscriber dials his own number, it is treated the same as dialing any number which is stored in the calling positions, and thus busy tone is returned as described above.

Release of the connection

The established connection is arranged to be released under control of the switch hook of either party. The release control circuit 124 (Fig. 1) is shown in detail in Figs. 10 and 10A when arranged side-by-side, as shown in Fig. 10B. Referring to Figs. 10 and 10A, release is not effected so long as negative pulses are being applied to the suppressor grid of tube 719. These negative pulses are derived from the output of coincidence gating tube 720, the control grid of which is supplied with positive pulses at the seized 8 kc. rate from the calling line circuit (Fig. 6) after passage through amplifier 112 and after passage through the 115.63 $\mu$s. delay line 721. So long as the calling subscriber does not restore his switch hook, these pulses are received at the release circuit. Likewise the suppressor grid of tube 720 receives a similar series of positive pulses over conductor 722 from the timing generator pulse suppressor 371 to be described hereinbelow. Therefore until the calling subscriber releases, there is an 8 kc. negative pulse at the output of tube 720 and on the suppressor grid of tube 719. The control grid of tube 719 is supplied with 96 kc. "clock" positive pulses over conductor 723 from the timing generator. However, because of the negative pulses on the suppressor grid of tube 719, that tube does not pass plate current. When the calling subscriber replaces his switch hook, the negative pulse applied to the suppressor grid of tube 719 ceases, and that tube produces negative pulses in its output at the 96 kc. rate. These negative pulses are amplified and inverted in tube 724. However they are not effective immediately to restore the storage circuit, since they are applied only to the control grids of coincidence gating tubes 725, 726. Neither of these tubes can pass plate current so long as the suppressor grids thereof receive a negative voltage. The 96 kc. series of "clock" pulses from the timing generator is amplified in pentode amplifier 727 and controls a 48 kc. flip-flop circuit comprising pentodes 728, 729, connected to produce at the anode of tube 728 a negative-going square wave, while producing at the anode of tube 729 a positive-going square wave. For a detailed description of the connection and operation of such a flip-flop or multivibrator, reference may be had to "Principles of Radar" hereinabove referred to.

Since the anodes of tubes 728 and 729 are connected respectively to the suppressor grids of tubes 725 and 726, the latter tubes alternately become plate current conductive at a 48 kc. rate. In order to make sure that the release pulse is effective over the entire seized time channel, it is necessary to pass it through a suitable delay line. Preferably, although not necessarily, a phantastron delay device is used for this purpose. However, because of the characteristic of such a device that it requires a rest period before it can repeat its delay, it is necessary to employ two such devices. Thus the output of coincidence tube 725 is amplified in amplifier 730, and controls a pentagrid phantastron tube 731 which is connected for operation to produce a total delay of 10.416 $\mu$s. Likewise the output of coincidence tube 726 is amplified in pulse amplifier 732, and controls a similar phantastron delay device 733 which likewise produces a total delay of 10.416 $\mu$s. However since the two phantastrons 731, 733, are rendered alternately effective under control of the positive and negative square waves from the multivibrator 728, 729, they produce alternate negative square waves of 10.416 $\mu$s. duration succeeding each other without any delay. The negative wave from device 731 is applied through a rectifier 734 to the control grid of a cathode follower tube 735. Likewise the 10.416 $\mu$s. negative square wave from device 733 is applied through rectifier 736 also to the control grid of tube 735. Tube 735 is normally biased to pass plate current, but ceases to pass plate current when the 10.416 $\mu$s. square wave is applied thereto from either of the phantastrons. Thus there is produced at the cathode load resistor 737 a release pulse which is transmitted to the storage circuits suppressor over conductor 200 (see Fig. 9). This pulse acts to release the storage circuit as hereinabove described in connection with Fig. 9.

It should be observed that by reason of the application of the positive pulses from the timing generator pulse suppressor to conductor 722, release of the originally seized 8 kc. time-position during seizure and dialing is prevented until the register sender has sent the called line identification code to the respective storage circuits. Just as soon as the dialing operation is completed, the calling code is set up, and the receipt of code pulses by the called line circuit and the start of ringing voltage will cause outgoing pulses to appear on the input of PAM amplifier 118. The output of this amplifier is fed to the 115.63 $\mu$s. delay line and to the suppressor grid of coincident tube 720. The pulses on the suppressor grid of tube 720 which are derived from the timing generator pulse suppressor, are terminated in the seized time interval and are replaced by the pulses from the called line. Therefore, there will still be a coincidence on the input of 720 to produce the negative suppression pulse on its output to prevent release. Thereafter, if either the calling or called party releases, one of the set of pulses on the input of 720 will disappear and the coincidence will cease. This in turn will allow tube 719 to pass pulses and cause suppression in the released channel. Ringing in the line circuit will cause rectifier 321 and associated circuit to produce a positive bias which is applied through resistor 335 to 336 and rectifier 337 of the PAM called modulator. The pulses from the called code gates will be delivered to 118A. When ringing ceases, the answer condition of the line will raise the voltage at point 240 to still maintain the PAM pulses. When the called party answers, the pulses cease, and release is effected as described above.

At the register sender the release pulse to lead 611 is delayed by a condenser 332 on the plate of tube 598. Pulses to the grid of 598 will charge this condenser. The time constant in association with the plate resistor is chosen so that the delay of delivery of an effective voltage to the flip-flop 599—600 is sufficient to permit the timing generator pulse suppressor to continue sending pulses of the seized timing until the called party ringing voltage has had time to send a voltage through resistor 335 to cause PAM outgoing pulses to appear to amplifier 118, delay line, and the suppressor grid of tube 720. The said pulses will appear before those from the timing generator pulse suppressor disappear. Hence a false release is prevented.

Line circuits start-pulse suppressor

As mentioned hereinabove in connection with the functioning of the line circuit, at a certain stage it is necessary to suppress the seized 8 kc. time-position from going to the line circuits start conductor 253 (Fig. 6). Fig. 14 is a detailed diagram of the start pulse suppressor circuit. The seized 8 kc. time-position pulses from the utilization conductor 369 of the register sender (Figs. 2 and 5A) are applied over that conductor to the control grid of pentode tube 738. Tube 738 will normally pass these pulses to pulse-inverting tube 739, which in turn would normally pass them as positive pulses to the control grid of the cathode follower 740, and that tube likewise would pass the positive pulses to conductor 343 and pulse finder (see Fig. 2C), to conductor 369 and to line circuits start conductor 253. Since the pulses in the outgoing PAM calling-to-called gates amplifier 112 (Fig. 6) are delayed by 9.37 μs. from pulses in the same frame, or in other frames separated by 125 μs., it is necessary to bring these pulses into phase with the pulses which are delivered by the pulse finder 370 (Figs. 2, 5A and 7) of the register sender. This is done by delaying the pulses by 115.63 μs. in the delay line 721 which is connected in the output of amplifier 112 (see Fig. 2). This provides a total delay of 9.37 μs.+115.63 μs.=125 μs. This brings the pulses into the next frame, but in the same time-position or channel. The control grid of tube 741 is fed by these delayed pulses. Tube 741 inverts the pulses and applies them as negative voltages to the suppressor grid of tube 738, thus preventing 8 kc. pulses in the same seized time-position from going to the line circuits start conductor 253.

Timing generator pulse suppressor

As mentioned above, when an 8 kc. time-position series has been seized, it becomes necessary to suppress that particular time series, and for this reason a special timing generator pulse suppressor 371 is employed, this suppressor being shown in detail in Fig. 15. The 96 kc. pulses from the timing generator 103 (Fig. 2) are fed into the timing generator pulse suppressor 371 over conductor 743, and thence to the control grid of tube 744, and thence to the pulse inverting amplifier tube 745 and to the cathode follower tube 746, which, at its cathode load resistor 747, furnishes over conductor 748 the positive pulses to the pulse finder 370 of the register sender (Fig. 5A). The register sender sends back pulses of the same timing on conductor 749 from the cathode load resistor of tube 614, as described hereinabove in connection with Fig. 5. These latter pulses are applied to the control grid of pulse amplifier tube 750, which inverts the pulses and applies them as negative pulses to the suppressor grid of tube 751. The control grid of tube 751 has positive pulses applied thereto over conductor 752 from the 115.63 μs. delay line 721. When these positive pulses arrive at the control grid of tube 751 of the same timing as the pulses over conductor 749 from the register sender, tube 751 cannot pass these pulses to its output circuit because of the negative pulses applied to the suppressor grid of tube 751 from the output of tube 750 which is fed from the register sender.

As long as the register sender is engaged with a time-position or channel, the pulses of that channel can pass from the timing generator to the register sender. At the end of the dialing operation, the pulses from the register sender to tube 750 are interrupted. This allows tube 751 to pass the pulses so that the anode of tube 751 has negative pulses which are applied over conductor 753 to the suppressor grid of tube 744, which thus prevents pulses from the timing generator from going from conductor 743 through to conductor 748 and thence to the register sender. The pulse finder in the register sender will seize pulses in another time-position or channel. The suppression of the originally seized channel pulses at tube 744 continues as long as the calling line circuit is held up by the calling subscriber, which maintains suppression pulses in the seized channel, which pulses are going steadily to tube 751, and suppressing pulses through tube 744 at the seized time intervals. In this manner no pulses of the same timing as those of an engaged time channel can be seized by the pulse finders in the register senders.

Toll and P. B. X hunting and busy circuits

When making a toll call, the subscriber dials "0." The register sender will place a pulse in the time channel or position that was originally seized. That pulse will have a time position, in the 10.416 μs. interval corresponding to the number "0" (see Fig. 1B), and will actually be the last position in that interval. If more than one subscriber is dialling "0" for the first or hundreds digit, the same relative time position will be seized by the subscribers' lines but in different time channels or sub-frames. The "0" digit is stored in the recirculating delay line storage circuit 163 as described in connection with Figs. 2 and 9, which storage circuit has associated therewith the respective code separating circuit 119 (Figs. 2 and 17) corresponding to each time channel which has such a "0" digit stored in the hundreds storage circuit. This same time position has the calling number identification code set up in the calling number tens and units digits storage circuits 159, 160, for normal operation of the calling-to-called amplifier of the line circuit as described above in connection with Fig. 6.

The "0" output bus 205 (Fig. 2C) is connected to the input of a pulse finder chain which consists for example of a series of four separate pulse finders in a chain circuit which chain circuit will be described hereinbelow in connection with Fig. 7A and Fig. 8. These pulse finders individually may be similar to the pulse finder 370 of the register sender. However, since there are four pulse finders 754, 755, 756, 757 available for toll trunk hunting, they are interconnected in a chain arrangement which is schematically illustrated in Fig. 11 and which will be described in detail in connection with Fig. 8. In Fig. 11, the four pulse finders each will seize the pulses from "0" hundreds bus 205 in a manner similar to that already described in connection with Fig. 7. Each of the pulses going to the pulse finders corresponds to a respective subscriber calling the "0" operator. A free pulse finder will seize an unattached pulse and will deliver a pulse with the same timing to its 8 kc. utilization conductor similar to utilization conductor 369 (Fig. 7) which, in turn feeds the pulse to a corresponding operator's trunk circuit. Each of these trunk circuits will be described in detail in connection with Fig. 12. Suffice it to say, for the present, that each trunk circuit acts in the nature of a line circuit similar to Fig. 6. Thus, as many as four simultaneous calls can be made to the toll operator, and these calls may occupy any of twelve time channels or time positions that may be free and available. If all four pulse finders are busy, and a fifth pulse attempts to get through, it will be sent to the common return conductor 758 of the pulse finder chain, that conductor being connected to the control grid of pentode amplifier tube 759. Whenever a pulse finder is busy, it will have a negative voltage on its respective trunk hunt conductor 760–763. When all the pulse finders are busy, all these trunk hunt conductors will therefore have a negative voltage thereon, and these voltages are applied to respective rectifiers 764–767 which constitute a four-way coincidence gate. Consequently, the voltage on common load return conductor 768 of the gate will rise negatively, and this raised negative voltage is applied to the control grid of tube 769, whose plate or anode will correspondingly rise positively. This positive swing at the plate of tube 769 is transmitted undiminished in incremental value to the suppressor grid of tube 759 through the two-electrode gas tube 770.

Tube 759 is biased normally to plate current cutoff, but when its suppressor grid swings positive, it passes plate current. In other words, it will pass plate current only when all the pulse finders are busy. The output of tube 759 feeds the modulator tube 771 whose control grid is fed by busy tone over the conductor 772, and when positive pulses are applied to the modulator grid of that tube, these pulses will appear at the plate circuit of tube 771 with superimposed audio frequency busy tone. The audio component is clipped by a rectifier 773 and the output thereof is busy-tone-modulated PAM which is applied over conductor 774 leading to the input of the called-to-calling gates amplifier 118. Since the timing of these pulses is the same as that of the time position channel which was seized by the calling line circuit, the said line circuit will receive the busy tone PAM on its incoming gates and it will be demodulated to transmit the busy tone to the calling subscriber as hereinabove described.

P. B. X operation

For this class of call there are also provided a series of pulse finders one for each P. B. X trunk. These finders are substantially the same in circuitry and function to the finders 754–757 of Fig. 11 and are shown schematically in Fig. 13. The elements of Fig. 13 which have the same circuitry and function as the corresponding parts of Fig. 11, bear the same designation numerals as in Fig. 11 but with the suffix "P." However, the input conductor 205P, instead of coming directly from the code separating circuit 119 (Fig. 2), comes from the P. B. X pilot number busy test suppressor and code selection circuit 775 such as shown in the lower half of Fig. 13, and connects to the input of the first pulse finder 754P–756P in the P. B. X hunting and busy circuit 776. Merely for illustration, it will be assumed that the system is arranged to connect to three P. B. X trunks, for that reason only three pulse finders are necessary. The pulse finders are connected through their respective utilization leads 760P–762P to the respective line circuits which in turn lead to respective P. B. X trunks. The P. B. X trunks therefore correspond to subscriber's lines and the P. B. X line circuits correspond to the individual line circuits already described in connection with Fig. 6. Thus, each P. B. X trunk is identified by a corresponding three-digit pilot number which causes the calling line to be connected to such a trunk in exactly the same manner as described above for a connection from a local calling subscriber to another local calling subscriber, with the exception that the line circuit instead of terminating in a subscriber's line, terminates in a P. B. X trunk. For the P. B. X number the above described busy test in the register sender is suppressed and the busy test is given by the P. B. X hunting and busy circuit 776 which is similar in circuitry function to the trunk hunting and busy test circuit for toll operation (Fig. 11).

In order to suppress the normal busy test in the register sender, reference should be had to Figs. 5A–5H and Fig. 13. As mentioned hereinabove in connection with the operation of the register sender, the normal busy test is effected by the register sender so long as negative pulses are being applied to the suppressor grid of tube 693 (Fig. 5G). However, when a three-digit P. B. X pilot number is dialled, a negative pulse will appear on conductor 777. The appearance of this negative pulse on the suppressor grid of tube 693 therefore prevents associated tubes 692, 694, 695 and 697 from being plate current conductive, and therefore prevents the above describer register sender busy test.

When the called code of the P. B. X pilot number is delivered to the units and tens busses 306, 307 (Fig. 13) that code is impressed upon a coincidence rectifier gate 778, comprising rectifiers 308P, 309P and 315P which functions similarly to rectifiers 308, 309 and 315 of the line circuit (Fig. 6). In the case of P. B. X operation, pulses from more than one time position or channel may go through the gate 778 all with the same code. This is made possible by the busy test suppression at the register sender. For this purpose, the output of gate 778 is applied over conductor 779 to the common amplifier 780 whose output therefore applies negative voltage to the conductor 777 leading to the register sender (Fig. 5G). Since the normal busy test in the register sender is thus suppressed, this allows more than one set of P. B. X pilot number codes to appear at the same busses in the groups 116, 117, leading from the called numbers separating circuits 114, 115 (Fig. 2). These code pulses however, will occupy different time positions or channels. The output of gate 778 also goes to the P. B. X pulse finders over conductor 205P as mentioned above, these pulse finders being connected in a chain circuit and there being one pulse finder for each P. B. X trunk. The action of this chain circuit in seizing a free pulse finder will be described in connection with Fig. 8. Thus, for outgoing calls the P. B. X trunk picks its own time position the same as for a subscriber's line circuit above described.

Pulse finder chain circuit

Where more than one pulse finder is used, for example in connection with toll trunks or in connection with P. B. X trunks, it is necessary to employ a chain control between the various pulse finders so that no two pulse finders seize the same 8 kc. time position. The single pulse finder was described above in connection with Fig. 7. Fig. 8 shows how a series of such pulse finders can be interconnected by respective chain control circuits to prevent double seizure of the same time position. In Fig. 8, the first pulse finder is shown in detail and the portion included within the upper dotted rectangle is identical with the pulse finder shown in Fig. 7, and reference may be had to the prior description for an explanation of the manner in which the pulse finder seizes an 8 kc. time position. The input conductor 343 is connected to the first pulse finder in the chain circuit and the parts of the pulse finder shown within the dot-dashed line in Fig. 8 which are identical in function with the corresponding elements of Fig. 7, bear the same designation numerals. As explained above, preparatory to the seizure of an 8 kc. time position the coincidence gate 790 comes into operation by the beat frequency pulses from the 7.3 kc. conductor and the return pulses on conductors 787. A pulse is sent to tube 795, to pass to tube 365, and to coincident gate 344. At this instant, the positive output of 344 is applied over conductor 366 to the pulse inverting tube 796, whose output is connected over conductor 783 to the suppressor grid of pentode tube 784. As a result of this negative pulse applied to the suppressor grid of tube 784, that tube becomes non-plate-current conductive and the seized 8 kc. input on conductor 343 which is coupled to the control grid of tube 784 is prevented from being passed to the next pulse amplifier tube 785 and to the chain control conductor 786. The succeeding pulse finders and their respective chain control circuits are identical with the #1 pulse finder and its chain control circuit. All the pulse finders have a common return conductor 787. Recirculated pulses will be fed from the output of 365, to 782 and to the suppressor grid of tube 784 to continue the above operation.

The chain control circuit output conductor 786 of one pulse finder serves as the input conductor for the next succeeding pulse finder #2 and corresponds functionally to the input conductor 343 of pulse finder #1. This also applies to the remaining pulse finders each of whose chain control output conductors 786 serves as the input conductor for the next succeeding pulse finder. The corresponding output conductor 786(4) of the last pulse finder connects through the cathode follower tube 789 to the common return conductor 787 which feeds all the pulse finders. The chain control circuit of each pulse finder has a three-rectifier coincidence gate such as gate 790, comprising rectifiers 791, 792, 793. Coincidence rectifier 792 is fed from the common return conductor 787. The other coincidence rectifier 793 is fed by 7.3 kc./µs. pulses over conductor 794 from the timing generator. The 8 kc. pulses at the common input to gate 790 will beat with the 7.3 kc. pulses, producing coincidences at gate 790 at the rate of 0.7 kc. During these coincidences, there will be an output positive pulse delivered by gate 790 to the control grid of pentode tube 795. The output of tube 795 drives pulse inverting 365 in the pulse finder whose positive output feeds one of the inputs to the pulse finder gate 344 as described in connection with Fig. 7. Therefore, gate 344 will operate and allow pulses to go through if the pulse on the input conductor 343 has succeeded in passing all the pulse finders in the chain and is then fed to the common return conductor 787.

When a pulse finder has seized an 8 kc. time position, tubes 784 and 785 prevent passing on that particular 8 kc.

position to the next pulse finder. In other words, tubes 784 and 785 are blocked against plate current conduction only during the seized 8 kc. position. If there are any other non-seized 8 kc. positions, the tubes 784 and 785 during those positions, are plate current conductive and thus enable the unseized positions to pass through the successive pulse finders until they are seized by another calling subscriber.

The seized 8 kc. pulses, of course, are also present at the output of gate 344 which over conductor 366 feeds the control grid of pentode 796 whose output like that of tube 782 is applied to the suppressor grid of tube 784 for quick suppression of the seized time position.

It should be observed that the cathode follower tube 367 which supplies the seized 8 kc. time position pulses to utilization conductor 369, also drives a rectifier 797 and associated filter network 798 to apply negative voltage to the trunk hunt conductor 760 (see Fig. 11) and also to the suppressor grid of pentode 795. This latter negative voltage presents start pulses being delivered to tube 365 after the pulse finder has seized a time position train of pulses. These rectifiers 797 and filter 798 are designed to operate as quickly as possible to prevent the seizure by the pulse finder of more than one time position during a call. The negative voltage at the trunk hunt conductor 760 also is used in the toll trunk and P. B. X trunk busy test circuits hereinabove described in connection with Figs. 11 and 13.

*Operator's trunk circuit*

The several operator's trunk circuits shown in block diagrammatic form in Fig. 11 are all the same and one is shown in detail in Fig. 12. Calls cannot originate from the operator over this trunk because it is an outgoing trunk only. For incoming service use incoming trunks on a circuit of Fig. 6. Referring to Fig. 12, pulses from one of the pulse finder utilization conductors (Fig. 11) are fed to the peak rider rectifier 799 and its associated circuit. This places a positive direct current voltage on the control grid of triode 800 which is normally biassed to plate current cutoff. The direct current plate voltage for tube 800 is supplied in the well-known manner over the ring conductor 801 of the toll line from the operator's board, through the inductance 802. When plate current flows through the tube 800 as a result of the positive pulse from rectifier 799, well-known signal equipment (not shown) is operated at the operator's board and the operator answers the call.

The incoming pulses from the pulse finder also go to rectifier 803 which is also connected through a suitable resistor 804 to the outgoing winding 805 of transformer 806. Speech voltage out of this winding arising at the operator's switchboard will produce outgoing PAM similar to the condition already described for rectifiers 334 and 337 of the subscriber's line circuit of Fig. 6. In Fig. 12, the pulses from the pulse finder also supply the coincidence gate 807, comprising the three rectifiers 808, 809, 810. Thus, gate 807 will let in incoming PAM pulses from the calling suscriber who is making an outgoing toll call. The PAM pulses are from the calling-to-called amplifier 112, and have the same timing as those from the pulse finder. These PAM pulses are also fed over conductor 811 to the peak rider rectifier 812 and to the control grid of triode 813, and thence to transformer 806 by way of the audio frequency filter 814. Demodulated audio frequnecy signals are thus placed on the trunk leading to the toll operator. From the toll switchboard, speech voltages modulate the pulses going out on the PAM outgoing gate. When the calling subscriber hangs up, the pulses from the pulse finder cease and tube 800 becomes non plate-current conductive. This gives rise to a suitable disconnect signal at the operator's switchboard by the opening of the direct current circuit through tube 800 indicating that the calling subscriber has released his connection.

While I have described above the principles of my invention in connection with specific apparatus, it is to be clearly understood that this description is made only by way of example and not as a limitation to the scope of my invention.

What is claimed is:

1. In a system for effecting a plurality of separate simultaneous non-interfering telecommunications between pairs of lines connected to a common transmission medium which carries the telecommunications, the combination, a switching control center, means at said center for generating a series of pulses corresponding to channels of the pulse-timed kind, means for seizing a free one of said channels and for associating it with an originating line while locking out said one channel from seizure by the remaining lines, means for identifying each of said lines by a plurality of decimally related digits, groups of conductors connected to said lines, there being one such group for each decimal digit of the line designations, each group having a corresponding conductor which is multipled to all lines having the same decimal digit in their designation, and means including pulse grouping circuits and pulse separating circuits to apply simultaneously to respective conductors in each group a set of coded pulses in the seized channel.

2. In a system for effecting a plurality of separate simultaneous non-interfering telecommunications between pairs of lines connected to a common transmission medium which carries the telecommunications, the combination, a switching control center, means at said center for generating pulses corresponding to a series of channels of the pulse-timed kind, means for seizing a free one of said channels and for associating it with an originating line, means for identifying each of said lines by at least a tens digit and by a units digit, a tens group of conductors connecting to said lines, a units group of conductors connected to said lines, all lines having the same tens digit being multipled to the same conductor in said tens group, all lines having the same units digit being multipled to the same conductor in the said units group, means responsive to the seizure of one of said channels by said originating line to apply a pulse in the seized channel to the corresponding tens conductor and simultaneously a pulse to the corresponding units conductor, means to convert said simultaneous pulses into a corresponding pair of time-position modulated gating pulses, one having a time-position modulation coded to identify the calling line the other having a time-position modulation coded to identify the called line, and means including respective tens and units pulse separators to apply said pair of time-position coded pulses respectively to said tens and units groups of conductors.

3. A system for effecting a plurality of separate simultaneous non-interfering telecommunications between pairs of calling lines and called lines connected to a common transmission medium which carries the telecommunications, comprising in combination means for generating pulses corresponding to a series of channels of the pulse-timed kind, means responsive to a calling line to seize one of said channels and produce according to the timing of the seized channel a digital designation for said calling line in the form of coded time pulses, a set of tens conductors each multipled to lines of the same tens digit, a set of units conductors each multipled to lines of the same units digit, a first storage device for storing coded timed pulses representing the tens digit of a calling line, a second storage device for storing coded timed pulses representing the units digit of a calling line, means including a tens pulse separator connected between the said tens conductors and said tens storage device for applying a coded pulse to the particular tens conductor which is multipled to the calling line, means including a units pulse separator connected between the said units conductors and said units storage device for applying simultaneously a coded pulse to the particular units conductor which is multipled to the calling line, a normally non-conductive electronic gate for each line and circuit connections for applying said coded pulses over said conductors to render conductive the electronic gate for the calling line and to open the electronic gate for the called line.

4. A system for effecting a plurality of separate simultaneous non-interfering telecommunications between pairs of calling and called lines connected to a common transmission medium which carries the telecommunications, comprising in combination, means for generating pulses corresponding to a series of channels of the pulse-timed kind, means responsive to calling line to seize one of said channels and produce according to the timing of the seized channel a digital designation for said calling line in the form of coded time pulses, a set of tens conductors each multipled to lines of the same tens digit, a set of units conductors each multipled to lines of the same units digit, a first storage device for storing coded timed pulses representing the tens digit of a called line, a second storage device for storing coded timed pulses representing the units digit of a called line, means connected between the said tens conductors and said tens storage device for applying a coded pulse to the particular tens conductor which is multipled to the called line, means connected between the said units conductors and said units storage device for applying simultaneously a coded pulse to the particular units conductor which is multipled to the called line, and a normally non-conductive electronic gate for each called line which is responsive to render conductive in the presence of respective simultaneous coded pulses.

5. A system for effecting a plurality of separate simultaneous non-interfering telecommunications between pairs of calling and called lines connected to a common transmission medium which carries the telecommunications, comprising in combination means for generating pulses corresponding to a series of channels of the pulse-timed kind, means responsive to a calling line to seize one of said channels and produce according to the timing of the seized channel a digital designation for said calling line in the form of coded time pulses, a first set of tens conductors each multipled to calling lines of the same tens digit, a first set of units conductors each multipled to calling lines of the same units digit, first storage means for storing coded timed pulses representing the tens and units digits of a calling line, means connected between the said storage means and said tens and units conductors for applying simultaneously a pair of coded pulses to the particular tens conductor and to the particular units conductor which are multipled to the calling line, a second set of tens conductors multipled to called lines, a second set of units conductors multipled to called lines, a second storage means for storing coded times pulses representing the tens and units digits of a called line, means connected between said second storage device and said second sets of tens and units conductors for applying simultaneously a set of coded pulses to the particular tens and units conductors which are multipled to the called line, transmission gates for the calling and called lines which are normally non-conductive, and circuit connections for applying said coded pulses to render conductive the electronic gate at the calling line and to open the electronic gate at the called line.

6. A system for effecting a plurality of separate simultaneous non-interfering telecommunications between pairs of calling and called lines connected to a common transmission medium which carries the telecommunications, comprising in combination means for generating pulses corresponding to a series of channels of the pulse-timed kind, means responsive to the originating of a call on a calling line for seizing a free one of said channels, means for identifying each of said lines by at least a tens digit and by a units digit, a first set of tens conductors each conductor of which is multipled to all lines having the same tens digit, a second set of tens conductors each conductor of which is also multipled to lines of the same tens digit, a first set of units conductors each conductor being multipled to lines of the same units digit, a second set of units conductors each conductor being multipled to lines of the same units digit, means for storing pulses representing the tens digit of said calling line under control of a corresponding particular conductor in said first set of tens conductors and for simultaneously storing pulses representing the units digit of said calling line under control of a corresponding particular conductor of said first set of units conductors, a register-sender seizable by any calling line for registering the tens and units digits of a called line, a first pulse separating means separate from said sender to store the tens digit of the called line, second pulse separating means separate from said sender to store the units digit of the called line, and means connected to said first and second pulse separating means to apply simultaneously coded time position pulses to individual respective conductors in said second set of tens conductors and said second set of units conductors and thereby to selectively complete a communications circuit to the called line.

7. A system of the kind described comprising in combination, means to generate pulses corresponding to a plurality of channels of the pulse-time-position kind, a register-sender common to a plurality of lines and seizable by any one of the calling lines, means including a pulse finder associated with said sender to seize a free one of said channels, means to seize said sender and to seize said one channel for use by the calling line, normally closed transmission gates for the calling and called lines, first means to store the digital designation of a calling line in the form of coded time-position pulses in said seized channel, second means controlled by said register-sender for storing the digital designation of a called line, means connected respectively to said first and second storage means for opening said gates, and means in said sender to release it for seizure by another calling line when a connection has been established between the first mentioned calling line which seized said sender and the desired called line.

8. A system of the kind described, comprising in combination, a timing pulse generator for generating pulses corresponding to a plurality of pulse-time position channels, a plurality of register-senders, means to temporarily connect an idle register sender with a calling line while a connection is being established to a called line, pulse finders for said senders for supplying them each respectively with a free one of said channels, means to supply said channels to calling lines, means to seize one of said senders and the free channel supplied thereto for exclusive use by the calling line, means connected in said seized sender to record coded impulses received from said calling line, and pulse controlled time coincidence gates connected to said calling and called line and to said recording means to complete a communication circuit to a called line on said seized channel.

9. A system of the kind described, comprising in combination, a register-sender having means to register digit impulses dialed by a calling line, an electronic gate having a pair of double coincidence gate elements for controlling said register-sender, a timing generator for supplying time-position pulse channels for communication between calling and called lines, a pulse finder associated with said register-sender for supplying one element of said gate with pulses in a free channel, a pulse finder associated with said lines to seize a free pulse channel upon initiation of a call over one of said lines, means for supplying the pulses in the channel seized by the calling line to the other element of said gate, and means including said gate elements for rendering said register-sender effective to register said digit impulses only when the time channel pulses supplied to said gate elements are coincident.

10. A system of the kind described, comprising in combination calling and called lines connected to a common transmission medium for carrying communications therebetween, each of said lines having an individual line circuit, a plurality of register-senders common to said lines, a timing generator for generating pulses corresponding to a series of pulse-time position channels, a plurality of pulse finders for maintaining said senders supplied with respective free channels and for causing each of said senders to seize a different free channel from the remaining senders, and means to seize an idle one of said senders and the particular free channel which is supplied to said seized sender, for supplying the said free channel to the calling line, and release circuit means for releasing said sender for seizure by any other calling line.

11. A system of the kind described, comprising in combination, calling and called lines connected to a common transmission medium for carrying communications therebetween each of said lines having an individual line circuit, each line circuit having a double coincidence gate which is normally closed except when a predetermined pair of simultaneous coded time-position pulses are supplied thereto, a plurality of register-senders common to said lines, a timing generator for generating pulses corresponding to a series of pulse-time position channels, a plurality of pulse finders for maintaining said senders supplied with free channels and for causing each of said senders to seize a different free channel, means to seize one of said senders and the particular free channel which is supplied to such seized sender for connection with a calling line, the last-mentioned means including a common start circuit which is supplied with the free channels, means for suppressing at said start circuit the particular channel supplied to the seized sender, means to store the digital designation of the calling line, means connected to said storing means to operate the said double coincidence gate of the calling line circuit, means controlled by said seized sender to store the digital designation of the called line and for maintaining said storage after release of said seized sender, and means connected to the called line storage means to render conductive the double coincidence gate at the called line circuit.

12. A system of the kind described, comprising in combination, calling lines, called lines, each of said lines having an individual line circuit, a plurality of register-senders a free one of which is seizable by each calling line, a timing generator for generating pulses corresponding to a series of separate communication channel-defining time-positions, means to supply the pulses of said time-position channels to said line circuits, means to supply the pulses of said time-position channels to register-senders, pulse finder means for allotting to each sender a different free one of said time-position channels, means independent of said senders providing coded time-position pulses representing the digital designation of calling and called lines, means for storing the coded time-position pulses of a calling line, means to seize a free register-sender by a calling line, and feed-back check means from said storing means to the line circuit of the calling line to insure that the calling line seizes the same free time-position as that allotted to the seized register-sender.

13. A system according to claim 12 in which said means for storing the calling line digital designation includes pulse delay lines of the automatic pulse recirculating kind, and the said feedback checking means comprises pulse-separating circuits for routing the stored pulses.

14. A system according to claim 12 in which said means for storing the calling line digital designation includes delay lines of the automatic pulse recirculating kind, there being one such line for each digit of the calling line designation, and said feedback check means comprises a series of pulse grouping circuits one for each of said delay lines, a series of pulse-separating circuits one for each of said delay lines, groups of digital conductors one group for each of said grouping circuits and being multipled to all calling lines having the same second decimal digit, and electronic gate means which is normally non-conductive is rendered conductive when the same set of time coded pulses are applied to said grouping circuits from a calling line circuit and are simultaneously applied from said separating circuits to said calling line circuit.

15. An automatic telephone switching system, comprising in combination, a plurality of line circuits, a common start circuit for supplying said line circuits with the pulses of a series of free time-position pulse channels, means responsive to initiation of a call over one of said line circuits to seize one of said channels and produce according to the timing of the seized channel a calling line identification pulse code, each of said line circuits having a pair of incoming control conductors, a pair of outgoing control conductors, respective and normally non-conductive electronic gates connected to said incoming and outgoing conductors, calling line identification pulse code grouping circuits supplied from said outgoing conductors, calling line identification pulse code separating circuits for supplying said incoming conductors with coded time-position pulses of said identification pulse code, means to apply the same set of free time-position channel pulses which identify the calling line to said incoming and outgoing conductors to render conductive said gates, and means connected to said line circuit to seize an idle one of said pulse channels for the temporary use of the calling line in establishing a connection with the desired called line.

16. A system according to claim 15 in which all the line circuits are connected to a common outgoing amplifier for amplifying amplitude modulated pulses, and said amplifier is provided with an electronic gate which is rendered conductive when said idle channel is seized.

17. An automatic telephone switching system comprising in combination, a plurality of line circuits, a common starter circuit for supplying said line circuits with the pulses of a series of free time-position pulse channels, an amplifier common to all line circuits for amplifying received incoming pulses in a seized pulse time-position channel, another amplifier common to all lines for amplifying transmitted outgoing pulses in the said seized channel, each line circuit having connected between it and said amplifiers respectively normally non-conductive electronic gates of the pulse coincidence kind, pairs of calling line identifying conductors connected to each line circuit, means normally supplying to one pair of said identifying conductors the pulses of said pulse-time position channels, means for seizing one of said channels by a calling line, the last-mentioned means including calling line pulse identification means for applying to said other pair of line identification conductors coded time-position pulses in the same time position as those of seized channel, and means operable under the seized time-position pulses are applied coincidently to both sets of conductors to render conductive the electronic gate associated with the second-mentioned amplifier.

18. A system according to claim 17 in which means are provided for storing the digital designation of the line as a called line in said seized time channel and for applying respective coded time-position pulses to the electronic gate of the first-mentioned amplifier to render it conductive.

19. An automatic telephone switching system comprising in combination, means to generate pulses corresponding to a plurality of individual pulse time-position channels, a plurality of lines each having an individual line circuit, each line circuit having four normally non-conductive pulse gates, means responsive to the initiation of a call at a line circuit to seize a free one of said channels and to render conductive two of said gates, an electronic register sender common to all lines and seizable by any line as a calling line for receiving and registering impulses dialled from the calling line circuit by way of one of said conductive gates, and means connected to said sender for rendering conductive said other two gates at the called line circuit for completing a telephone communication both between the calling and called lines.

20. An automatic telephone switching system having in combination, means to generate pulses corresponding to a plurality of channels of the pulse-time position kind, a plurality of calling lines, means providing said calling lines with an individual predetermined coded time-position pulse, means to seize an idle one of said channels for connection with the calling line, and means to store the digital designation of said calling line, the last-mentioned means including an automatic pulse recirculating delay line, and means for automatically starting said line recirculating pulses at a time position determined by the coded time-position pulse of said calling line.

21. An automatic telephone switching system having in combination, means to generate pulses corresponding to a plurality of channels of the pulse-time position kind, a plurality of calling lines, means providing said lines with an individual predetermined coded time-position pulse, means to seize an idle one of said channels for connection with a calling line, and means to store the digital designation of said calling line, the last-mentioned means including a pulse delay line having an input and output, means to supply said input with a triggering pulse according to the coded time position individual to the calling line, a plural element coincidence gate connected to said output, one of said elements being connected to said channel generating means, means to supply the other element with the pulses from said line, and a pulse feedback path for applying a recurrent triggering pulse so long as both said gate elements are conducting.

22. An automatic telephone switching system comprising in combination, a plurality of line circuits each having normally non-conductive gates, a plurality of seizable and releasable register senders for controlling the automatic extension of a connection from calling line circuits to called line circuits, means to apply to a calling line circuit a pair of simultaneous time-position coded pulses for selectively rendering conductive the calling line gate, means for temporarily storing in a seized register sender dialled impulses from a calling line circuit representing the digital identification of a called line, means to transfer the registered information in the seized sender to electronic storage means for maintaining said identification stored subsequent to release of the seized sender, and means connecting said storage means to said line circuits to apply to the line circuit of the called line a pair of simultaneous time-position coded pulses for selectively rendering conductive the called line gate.

23. A pulse-time position code translator for automatic telephone switching systems comprising a first set of input conductors, a second set of input conductors, means to simultaneously impress on a predetermined conductor in each set a similar coded time-position pulse, a first set of delay lines of respectively different delay each connected respectively to one of the conductors in said first set of input conductors, a second set of delay lines also of respectively different delay each connected respectively to one of the conductors of said second set of conductors, an output circuit means for said delay lines for converting said simultaneous pulses into a corresponding pair of time-position modulated pulses whose respective time positions are correlated with the particular input conductors upon which said simultaneous pair of pulses are impressed.

24. A translating arrangement for automatic telephone switching systems of the pulse-time position kind, comprising a source for generating frames of channel-defining time-position pulses with the time spacing between successive channel pulses forming channel subframes, a first set of line identifying conductors, a second set of line identifying conductors, means connecting said conductors to said lines and to said source to impress on a pair of said conductors one in each set a corresponding pair of simultaneous time-position pulses whose time position in any subframe is distinctive of a particular line, and a plurality of pulse delay lines each connected respectively to one of said conductors for converting said simultaneous pulses into a corresponding pair of time-position modulated pulses whose time position is also distinctive of a respective one of said lines.

25. A translating and line identifying arrangement for automatic telephone switching systems of the pulse-time-position kind, comprising a source for generating frames of channel-defining time-position pulses with the time spacing between successive channel-defining pulses forming subframes, means responsive to initiation of a call to produce a line identification in the form of a coded pulse signal having tens and units digits, a set of tens conductors each multipled to lines of the said tens digit, a set of units conductors each multipled to lines of the said units digit, means to select an idle subframe of time-position pulses, means to supply said selected pulses to a tens conductor which is multipled to a calling line, means to apply said selected pulses to a units conductor which is multipled to said calling line, means connected respectively to said tens conductors and having a common output to subject the pulses from said tens conductors to respectively increasing delay, means connected respectively to said units conductors and having a common output to subject the pulses from said units conductors to respectively greater delays, and pulse storage circuits connected to said common outputs to store the delayed pulses in the respective coded time positions in said subframe.

26. An automatic telephone switching system comprising in combination, a timing generator to generate pulses corresponding to a plurality of electric channels of the pulse-time position kind, calling lines and called lines each terminating in a respective line circuit, means connected to a calling line to seize a free one of said channels, electronic means for storing the digital designation of a calling line in the form of recurrent coded time-position pulses in said seized channel, other electronic means for storing the digital designation of a called line also in the form of recurrent coded time-position pulses in said seized channel, a release circuit, normally non-conductive transmission gates for the calling and called lines respectively, means connected to both said storage means to render conductive the calling and called line gates in accordance with the stored designations, a channel release circuit, and means to apply a disconnect signal from a line to cause said release circuit momentarily to suppress the recurrence of the said stored pulses in said storage means and thereby to wipe out the stored designations and to render the said channel seizable for use in another call.

27. An automatic telephone switching system comprising in combination, a timing generator for generating pulses corresponding to a plurality of electric pulse channels of the pulse-time position kind, calling line circuits, called line circuits, transmission gates coupled to respective ones of said calling and called lines, means responsive to the initiation of a call by a calling line circuit to seize a free one of said channels, electronic storage means for storing the digital designation of the calling line and the digital designation of the called line in the form of automatically recirculating pulses in the seized time channel, means associated with the two said storage means responsive to the storage of the designations of a calling and called line to maintain conductive respective transmission gates at the calling and called line circuits, a release control circuit, a pulse suppressor connected to said timing generator and to said release control circuit, said release control circuit having a double-element coincidence gate, means to supply one of said gate elements with pulses in the seized time channel under control of a line circuit, means to supply the other of said gate elements with coincident pulses in the seized time channel under control of said suppressor, means effective when a line circuit receives a disconnect signal to cause said pulse suppressor to interrupt the supply of said pulses to said other gate element to render said coincident gate non-conductive, and means to release said seized time channel for use in another call when the said coincident gate is rendered non-conductive.

28. An automatic telephone switching system comprising in combination, a timing generator to generate pulses corresponding to a plurality of electric channels of the pulse-time position kind, calling lines, called lines, each of said lines terminating in a respective line circuit, means responsive to the initiation of a call by a calling line to seize a free one of said channels, normally non-conductive transmission gates in each line circuit, "n" groups of line identifying conductors where "n" is the number of decimal digits in line designations, each conductor group having "m" conductors where "m" is the maximum number of dial impulses per digit, a register sender seizable by a calling line circuit to control the extension of a connection to a desired called line, said register-sender having means to record the number of the called line, means responsive to the recording of the called line number in said register sender to supply a simultaneous set of coded pulses in the said seized channel to a corresponding set of said identifying conductors which are multipled to the called line, and thereby to render conductive and maintained conductive the called line gate, a release circuit, and means to transmit a disconnect signal from a line to cause the momentary suppression of pulses in the said seized channel and thereby to render conductive the said gates and to release the said seized time channel for use in another call.

29. An automatic telephone switching system having in combination, calling lines and called lines connected to a common transmission medium for carrying telephone communications therebetween, each of said line terminating in an individual line circuit, a plurality of register senders for said lines and a free one of which is seizable by a calling line, a timing generator for generating a plurality of pulse-time position channels, a common start circuit connected to said line circuits and supplied with all said free channel pulses, means to seize an idle register sender and an idle channel for use by a calling line, means to suppress at said start circuit the free channel which has been seized by the calling line, and means for preventing said suppression until said register sender has received and registered the complete designation code of the called line.

30. A register sender for automatic telephone switching systems and arranged to be seized by any calling line on a temporary basis for controlling the completion of a connection to a called line and thereafter to be released for seizure by any other calling line, said register sender having means producing pulses according to pulse-time position multiplexed channels, said sender comprising means to lock itself to a free one of said channels, means to effectively associate with a calling line said sender when it is free, a single ten point all-electronic register, an electronic change-over circuit, means for causing said change-over circuit to assume a plurality of different settings equal in number to the number of line designation digits to be successively dialled by the calling line, and automatic restoring means connected to said change-over circuit for causing said register to respond successively to the said successively dialled digits.

31. A register sender according to claim 30 in which a coincidence gate is provided with two coincidence elements, means to supply pulses in the channel seized by the sender to one of said elements, means to supply pulses in the same channel seized by a calling line to another element to render conductive said gate, said sender being connected to a source of dial tone, means to cause the pulses in said seized channel to be amplitude-modulated with the dial tone when said gate is rendered conductive, and means to transmit said dial tone modulated pulses to the calling line circuit, said calling line circuit having means to demodulate said modulations for transmission to the calling line.

32. A register-sender according to claim 30 having connected to it a source of audio frequency dial tone, means connected to said sender to cause the pulses in said one of said channels to be amplitude-modulated by said dial tone, means to transmit said dial tone to the calling line, said sender having a dialed-digit responsive circuit, and electronic means to cut off said dial tone from reaching the calling line on the termination of dialing of the first digit.

33. A register-sender according to claim 30 in which a coincidence gate is provided in the sender and which remains non-conductive until the pulses in the time channel seized by the sender are coincident with the pulses in the time channel seized by a calling line, a dial-pulse circuit in said sender for receiving pulses in the seized channel which are amplitude-modulated by a calling line dial and for converting them into low frequency register operating impulses, a digital storage control conductor leading from said register, and means connected to said register to apply to said conductor a time-position pulse whose time position in the said channel is determined by the number of said low frequency pulses transmitted to the register.

34. A register-sender according to claim 30 in which said change-over circuit comprises a series of grid-controlled gas discharge tubes one for each line designation digit, an additional grid-controlled gas discharge tube serving as a common start control for said series of tubes, and means responsive to the termination of each dialed digit for producing a characteristic impulse for causing said start control tube to render each tube in said series successively effective on said register.

35. A register-sender according to claim 34 in which said start control tube is normally conductive and is coupled to one of the electrodes of the first tube in said series, said series of tubes being connected in chain circuit so that when one tube in the series ceases to conduct at the termination of a dialed digit the next tube in the series becomes conductive, and means to apply said characteristic impulse to another electrode of each tube to control in conjunction with said start tube the successive conductivity of said series of tubes.

36. A register sender according to claim 30 having an electronic busy test circuit associated with said register for testing the busy condition of a called line and having means for transmitting back to the calling line pulses in the said seized channel which are amplitude-modulated by an audio frequency busy tone.

37. A register sender according to claim 36 having means to suppress said busy test when the register receives a preliminary digit of a predetermined value.

38. A register sender for automatic telephone switching systems of the kind employing pulses corresponding to a plurality of pulse time position multiplexed channels, means to supply said sender with a free one of said channels, said sender being seizable by a calling line and having an electronic register for registering dialed digits, said register including a first series of grid-controlled tubes, means to render said tubes successively conductive with a predetermined time succession according to the pulse time positioning in said free channel but independently of dialed impulses, a second series of grid-controlled tubes, means to render the tubes of said second series successively conductive in accordance with the number of impulses in each dialed digit, double coincidence gates and means to render said gates effective only when a pair of corresponding tubes in the first and second series are simultaneously conductive.

39. A register sender acocrding to claim 38 in which each of said series of tubes comprises ten separate tubes and ten corresponding respective coincidence gates.

40. A register sender according to claim 38 in which

47 the means for rendering the tubes of the first series successively conductive includes a tapped pulse delay line upon whose input the pulses in said one of said channels are impressed.

41. A register sender according to claim 38 in which the tubes of the first series are grid-controlled vacuum tubes and the tubes of the second series are grid-controlled gaseous discharge tubes.

42. A register sender according to claim 38 in which the tubes of the second series are grid-controlled gaseous discharge tubes and are provided with an additional common grid-controlled gaseous discharge tube which responds to dialed impulses to maintain a corresponding one of the tubes of said second series alone conductive at the cessation of a series of dialed digit impulses.

43. A register sender according to claim 38 in which each of said double coincidence gates comprises a set of three rectifiers one of which is biased to conduction by the plate current of the corresponding tube of the first series, another of which is biased to conduction by the plate current of the corresponding tube of the second series, and a third one of which is biased to conduction only when the first two rectifiers of the set are conductive.

44. A register sender according to claim 38 in which said coincidence gates are connected to a common output circuit wherein there is produced a pulse whose time-position in said channel varies with the particular coincidence gate which is conductive.

45. A register sender according to claim 38 in which said coincidence gates are connected to a common output circuit where there is produced a pulse whose time-position in said channel varies with the particular coincidence gate which is conductive, a change-over circuit for rendering the register successively responsive to successively dialed digits, and a set of pulse storage-supply conductors connected to said common output circuit.

46. A register sender according to claim 30 having means to restore the register to normal between the dialing of successive digits, and electronic means to prevent said register being restored when a predetermined preliminary digit is dialed.

47. A register sender according to claim 46 in which said register includes a set of ten grid-controlled vacuum tubes and a pulse delay line tapped therealong to respective ones of said vacuum tubes, said tubes being successively keyed-on under control of said tapped pulse delay line, a set of grid-controlled gas discharge tubes successively keyed-on in accordance with the value of a dialed digit, means to produce a pulse in the said channel whose time-position corresponds to the dialed digit when two corresponding tubes in said sets are coincidentally keyed-on, means controlled by the keying-on of the last tube in said first set to transmit a register restoring pulse, means for transmitting a sender restoring pulse upon the coincident keying-on of any pair of tubes except one predetermined pair in said sets, and a double coincidence gate energized by both said pulses to restore the entire register sender to normal.

48. A register-sender having means to supply it with pulses corresponding to a free pulse time position channel, means for coupling the register-sender to lines over which dialed pulse signals may be received, an electronic stepping register, circuit in said sender including means which responds to dialed pulse signals in the seized channel to selectively set said electronic stepping register, an electronic change-over circuit for causing said register to restore to normal after the receipt of all the pulses of a dialed digit but without restoring the sender as a whole, and electronic means effective when any first digit except a predetermined digit is dialed for automatically restoring the entire register-sender to normal.

49. A register-sender of the electronic kind having means to supply it with pulses corresponding to a free pulse time position channel, a register, a set of output pulse storage conductors leading from the sender, means for impressing upon one of said conductors under control of said register a distinctive time-position coded pulse in said channel representing a class-of-service for example, toll trunk service and the like, the remaining conductors in said set arranged to have impressed thereon distinctive time-position coded called-line-identifying pulses in said channel, means to set the register under control of dialed impulses from a calling line, means connecting said conductors to said register to impress said pulses thereon, said register having discriminating means responsive to a predetermined first register digit representing class-of-service to automatically restore the register between dialed digits to enable the register to impress the said line identifying coded pulses respectively on said other conductors.

50. A register sender according to claim 30 having a busy test circuit for testing the busy condition of a called line, said busy test circuit comprising a series of double-section gates one section of which is arranged to be energized by distinctive code time position pulses existing at the called line under test, means to energize the other section of each gate in accordance with the setting of said register, and means to control the transmission of said busy signal when the pulses at the said two sections are in the same time coded position.

51. A register sender according to claim 50, in which said busy test circuit comprises two separate series of said double-section gates, one series being multipled to the lines to test the busy condition of a line when it is a calling line in a previously established connection, and the other series being multipled to the lines to test the busy condition of a line when it is a called line engaged in a previously established connection.

52. An electronic register sender for automatic telephone switching systems, comprising an electrionic register having a series of electronic devices for registering dialled switching control impulses, and means in said sender for testing the busy condition of a line associated with said register, the last-mentioned means comprising a first series of double-element coincidence gates one for each of said electronic devices, means connecting one element of each gate to a corresponding electronic device in the register, means connecting the other element of each gate to a conductor which is multipled to all lines of the same corresponding decimal digit, for example tens digit, a second series of double-element coincidence gates one for each said electronic device, means connecting one element of each gate of the said second series to a corresponding device in the register, means connecting the other element of each gate of the said second series to another conductor which is multipled to all lines of the same decimal digit, for example units digit, and means to produce a busy signal when the corresponding double gates in the first and second series are simultaneously open.

53. A dial-controlled automatic telephone switching system having lines to be interconnected and supplied with respective pulse-time position channels, a plurality of sets of digitally coded conductors, there being one such set for each digit of the line designation and there being one conductor in each such set for each impulse in a dialled digit, means multipling the respective conductors of one set to all lines having the same initial identifying digit, means multiplying the individual conductors of a succeeding set to all lines having the same digit after said initial digit, an electronic register responsive to dialled digit impulses for controlling the completion of a connection between a calling line and a desired called line, said register having an electronic stepping circuit comprising a series of electronic tubes one of which is selectively rendered conductive for a respective dialled digit, a busy test circuit for testing the busy condition of called lines, said busy test circuit comprising first, second, third and fourth sets of coincidence rectifier gates, each gate comprising a pair of normally non-conductive rectifiers, means connecting the first rectifier in each gate of the first and second sets to a corresponding tube in said register, means connecting the second rectifier in each gate of the first set to the corresponding digital coded conductor in one of said sets of conductors multipled to the line being called, means connecting the second rectifier in said gate of the second set to a corresponding digital conductor in another set of said conductors which are multipled to the line being called, each of said gates having a third rectifier which is conductive only when the first and second rectifiers thereof are simultaneously conductive, and means effective when the third rectifiers of any gate in the first and second set are simultaneously conductive and when the third rectifiers of any gate in the third and fourth sets are simultaneously conductive to control the transmission of a busy signal to a calling line.

54. A busy test circuit for an automatic telephone switching system of the kind employing a register sender with a set of digitally controlled electronic tubes, and having at least two sets of line identifying conductors for example units conductors and tens conductors with each units conductor multiplied to lines of the same units digit and with each tens conductor multiplied to lines of the same tens digit, and with means to impress upon said conductors simultaneous time-position coded pulses distinctive of respective lines, said busy test circuit comprising two series of double coincidence, electronic gates there being one gate for each register tube, and means in said senders which responds to the simultaneous conduction of the corresponding gates in each of said series corresponding to a registered digit to control the transmission of a busy signal to a calling line.

55. A pulse finder for automatic telephone switching systems of the kind employing pulses corresponding to multiplexed pulse-time position channels, comprising a pulse delay circuit, a double pulse coincidence input gate coupled to the input of said delay circuit, a double pulse coincidence output gate coupled to the output of said delay circuit, a pulse feedback path between said input and output gates, means to impress upon one element of the input gate the pulses of a pulse-time position channel to be seized, means to impress the pulses of said channel upon one element of the output gate after passage through said delay circuit, means to impress on the second element of the output gate the pulses of all the available channels, said output gate geing rendered conductive only when the pulses of said channel to be seized are in time coincidence with the pulses of a corresponding available channel impressed on said second element of the output gate, and means including said feedback path to couple the pulse passed by said output gate to the said second element of the input gate.

56. A pulse finder according to claim 55 in which an output utilization conductor is connected to said delay circuit to receive only time-position pulses in the said seized channel.

57. A pulse finder according to claim 55 in which electronic means are provided to suppress at said second element of the input gate the pulses of all time-position channels except that seized by the pulse finder.

58. A pulse finder according to claim 57 in which said suppressing means includes a double grid electron tube gate which is biased to cut-off immediately when said channel is seized.

59. An automatic telephone switching system comprising calling lines, called lines, a timing generator for generating pulses corresponding to a series of pulse-time position channels useful for establishing a connection between a calling line and a called line, a plurality of seizable electronic register senders each of which when seized having means which responds to dialled impulses received over a calling line for controlling the said connection, a pulse finder for each sender for seizing and supplying thereto a free one of said channels, and a chain control circuit between the pulse finders in the senders to lock out the seizure by any of the remaining pulse finders of a channel which has been seized by another pulse finder.

60. An automatic telephone switching system comprising, calling lines, outgoing trunk lines, a timing generator for generating pulses corresponding to a series of pulse-time position channels, an electronic register-sender for said lines, means controlled by the setting of said sender in response to a characteristic digit signal received over a calling line to cause said calling line to be extended to an idle outgoing trunk, the last-mentioned means including a series of pulse finders one for each trunk, and means for causing a pulse finder to seize an idle trunk and an idle one of said time channels for use by said calling line and said trunk.

61. An automatic telephone switching system according to claim 60 in which said register-sender is connected to a pulse storage circuit to which the characteristic digit as registered in the sender is transferred for storage, and means connected to said storage circuit to release the sender without releasing said stored digit and without releasing the connection between the calling line and the said idle trunk.

62. An automatic telephone switching system according to claim 60 in which electronic means are provided responsive to all said trunks being busy to transmit to the calling line a busy signal.

63. An automatic telephone switching system comprising a timing generator for generating pulses corresponding to a series of pulse time position channels, a plurality of electronic register-senders, means to keep each sender supplied with the pulses of a separate free one of said channels, pulse time position storage means common to all senders for storing the digital designations of calling lines and for storing dialed digital information, means to seize an idle register-sender with its seized time channel for temporary use by the calling line in establishing a connection to a called line, electronic means for discriminating between local calls, P. B. X calls and toll trunk calls, and means responsive to dialed digits from the calling line for controlling said discriminating means and thereby to enable the register-sender to control the extension of a calling line selectively to a local line, a P. B. X line or a toll trunk.

References Cited in the file of this patent

UNITED STATES PATENTS

| | | |
|---|---|---|
| 2,387,018 | Hartley | Oct. 16, 1945 |
| 2,512,676 | Ransom | June 27, 1950 |
| 2,532,719 | Homrighous | Dec. 5, 1950 |
| 2,541,932 | Melhose | Feb. 13, 1951 |
| 2,548,661 | Feldmann | Apr. 10, 1951 |
| 2,570,274 | Ransom | Oct. 9, 1951 |
| 2,615,971 | Malthaner | Oct. 28, 1952 |
| 2,619,548 | Lesti | Nov. 25, 1952 |